United States Patent
Bricaud et al.

(10) Patent No.: US 6,761,575 B2
(45) Date of Patent: Jul. 13, 2004

(54) ERGONOMIC ELECTRICAL CONNECTOR FOR A SMART CARD

(75) Inventors: Hervé Guv Bricaud, Dole (FR); Yves Pizard, Dole (FR); Fabrice Valcher, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/219,648

(22) Filed: Aug. 15, 2002

(65) Prior Publication Data

US 2003/0022537 A1 Jan. 30, 2003

Related U.S. Application Data

(63) Continuation-in-part of application No. PCT/EP01/10640, filed on Feb. 14, 2001.

(30) Foreign Application Priority Data

Feb. 18, 2000 (FR) .............................................. 00 02006

(51) Int. Cl.[7] .............................................. H01R 13/62
(52) U.S. Cl. .................................................... 439/326
(58) Field of Search ........................ 439/326, 331–336, 439/327, 330, 630, 910, 259, 495, 260, 73, 325, 296, 52

(56) References Cited

U.S. PATENT DOCUMENTS

| | | | |
|---|---|---|---|
| 5,224,873 A | | 7/1993 | Duffet et al. |
| 5,603,629 A | * | 2/1997 | DeFrasne et al. ............ 439/331 |
| 6,048,221 A | * | 4/2000 | McCleerey et al. ......... 439/326 |
| 6,062,889 A | * | 5/2000 | Hyland et al. ............... 439/326 |
| 6,106,317 A | * | 8/2000 | Michaelis et al. ........... 439/326 |
| 6,129,558 A | * | 10/2000 | Kihira et al. ................. 439/66 |
| 6,227,893 B1 | * | 5/2001 | Kaneko ....................... 439/326 |
| 6,304,454 B1 | * | 10/2001 | Akamatsu et al. .......... 361/752 |

FOREIGN PATENT DOCUMENTS

| | | |
|---|---|---|
| EP | 0515897 B1 | 9/1996 |
| EP | 0959423 A2 | 11/1999 |
| WO | WO 98/13784 | 4/1998 |

* cited by examiner

*Primary Examiner*—Jean F. Duverne
(74) *Attorney, Agent, or Firm*—Roger C. Turner

(57) ABSTRACT

A smart card connector has a card-receiving cavity with a recess (194, FIG. 73) at the rear that receives the rear edge (152) of the card. A cover or flap is then pivoted down on the support element and slid forward to slide hooks (288, FIG. 27) at the front of the cover under shoulders (292) on the support element. The rear edge of the card extends along the length (A', FIG. 45) of the card, so the distance from the open front of the connector to the recess (194) and card rear edge is equal to about the smaller width of the card.

20 Claims, 85 Drawing Sheets

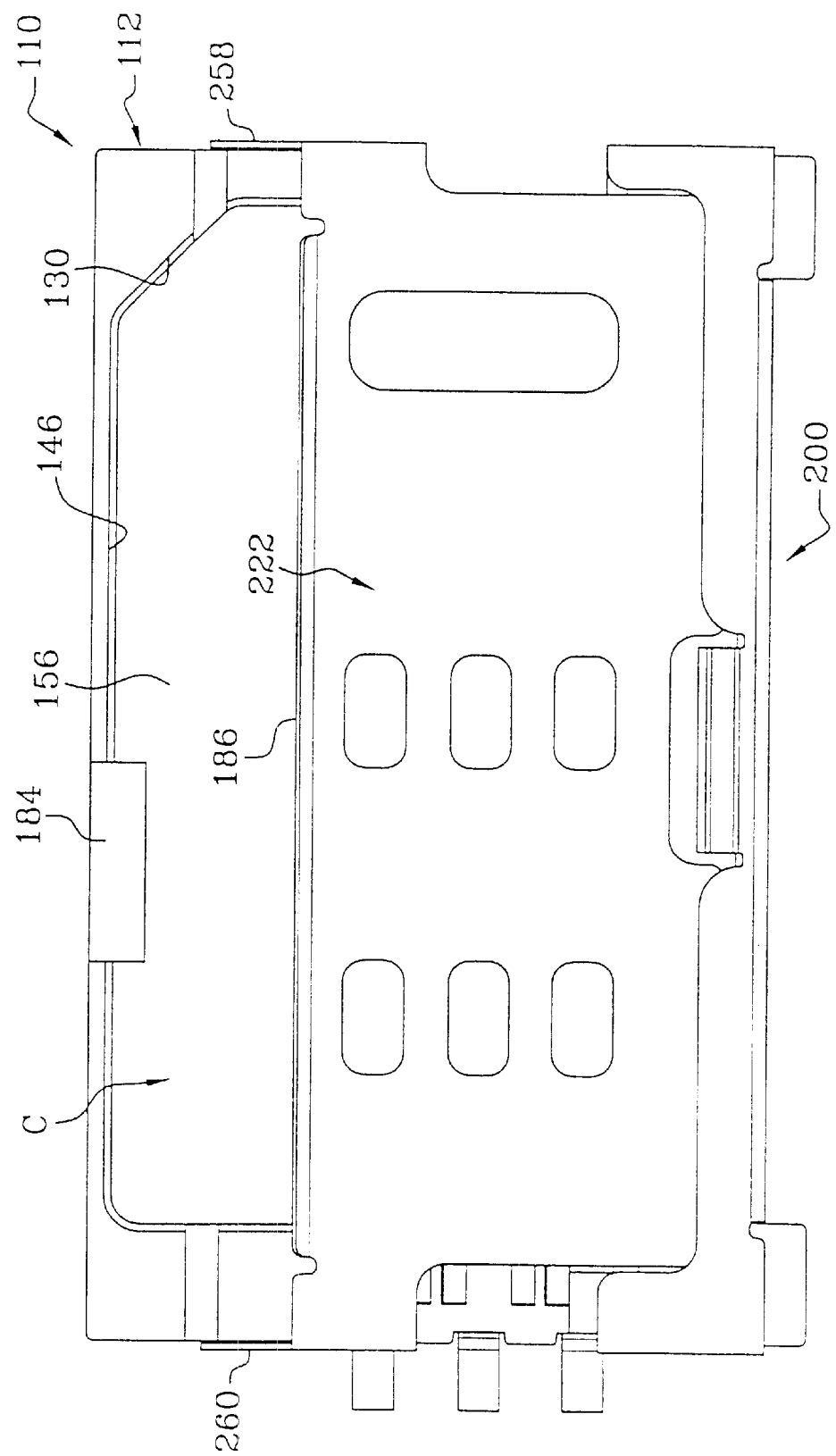

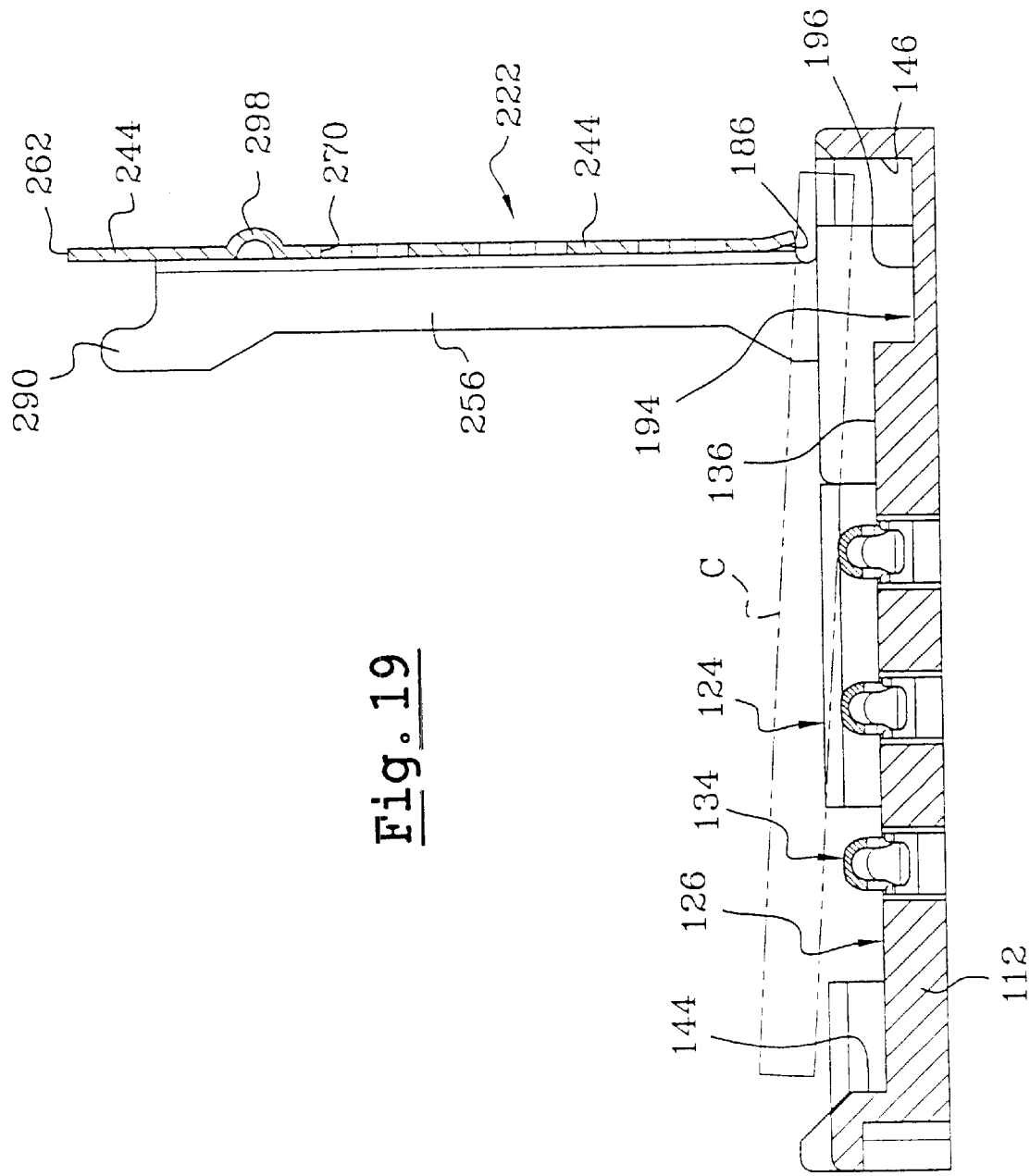

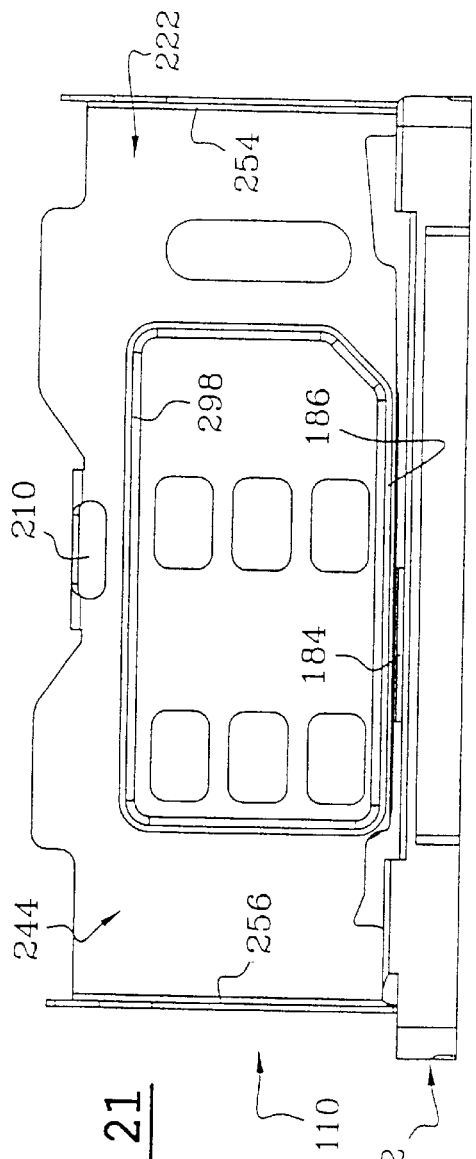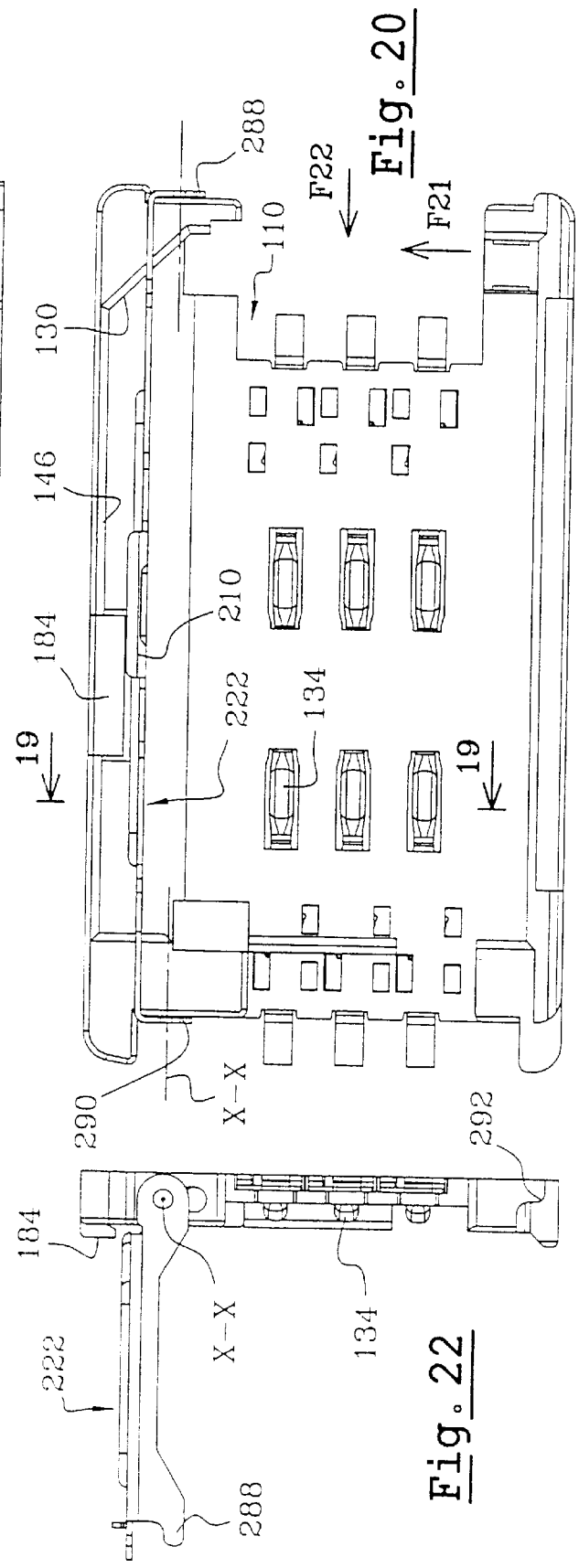

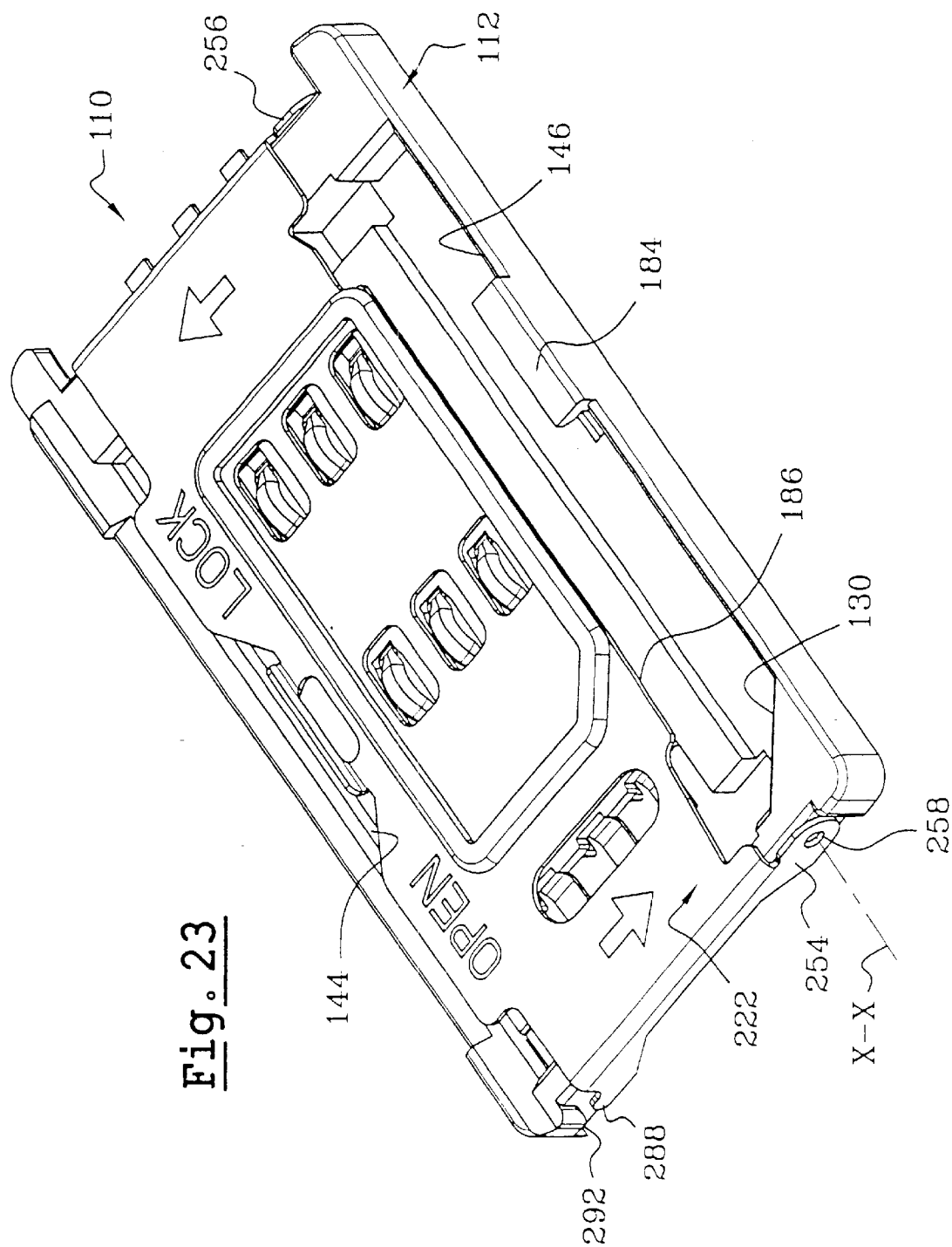

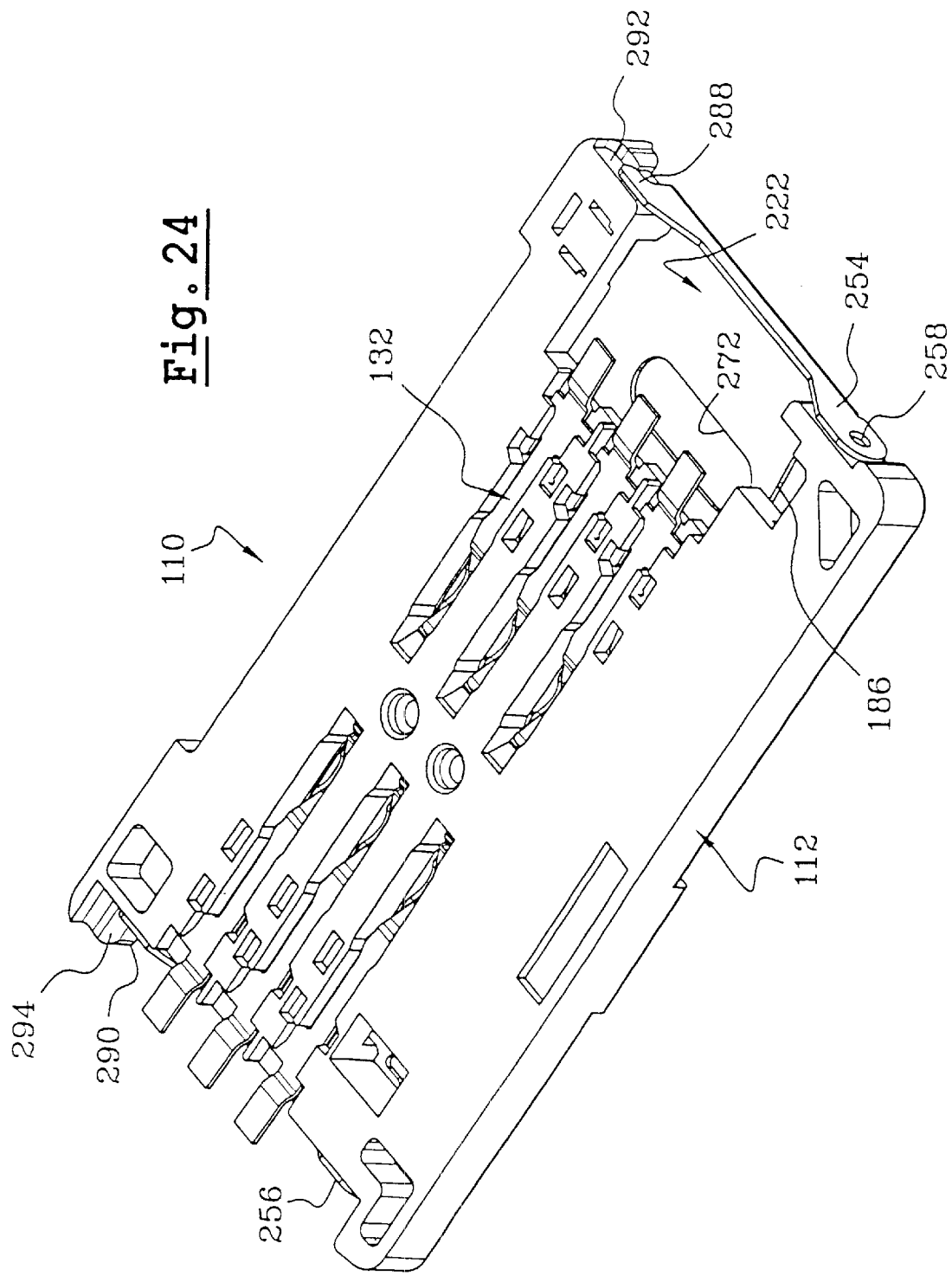

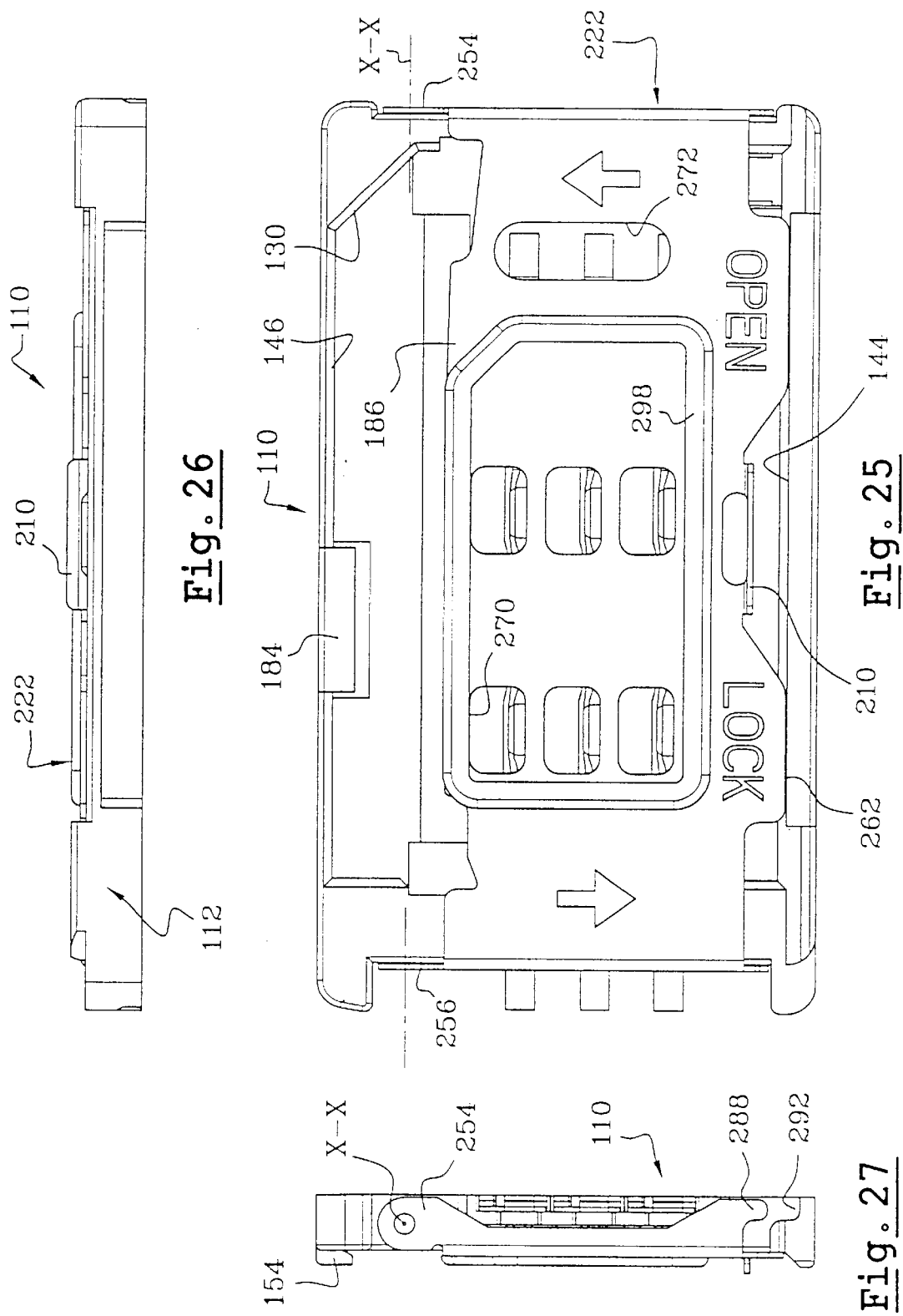

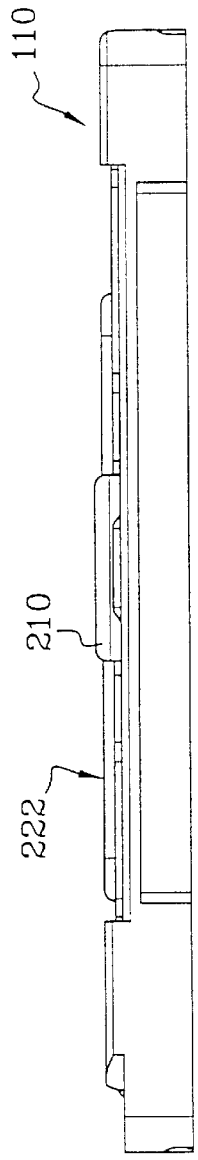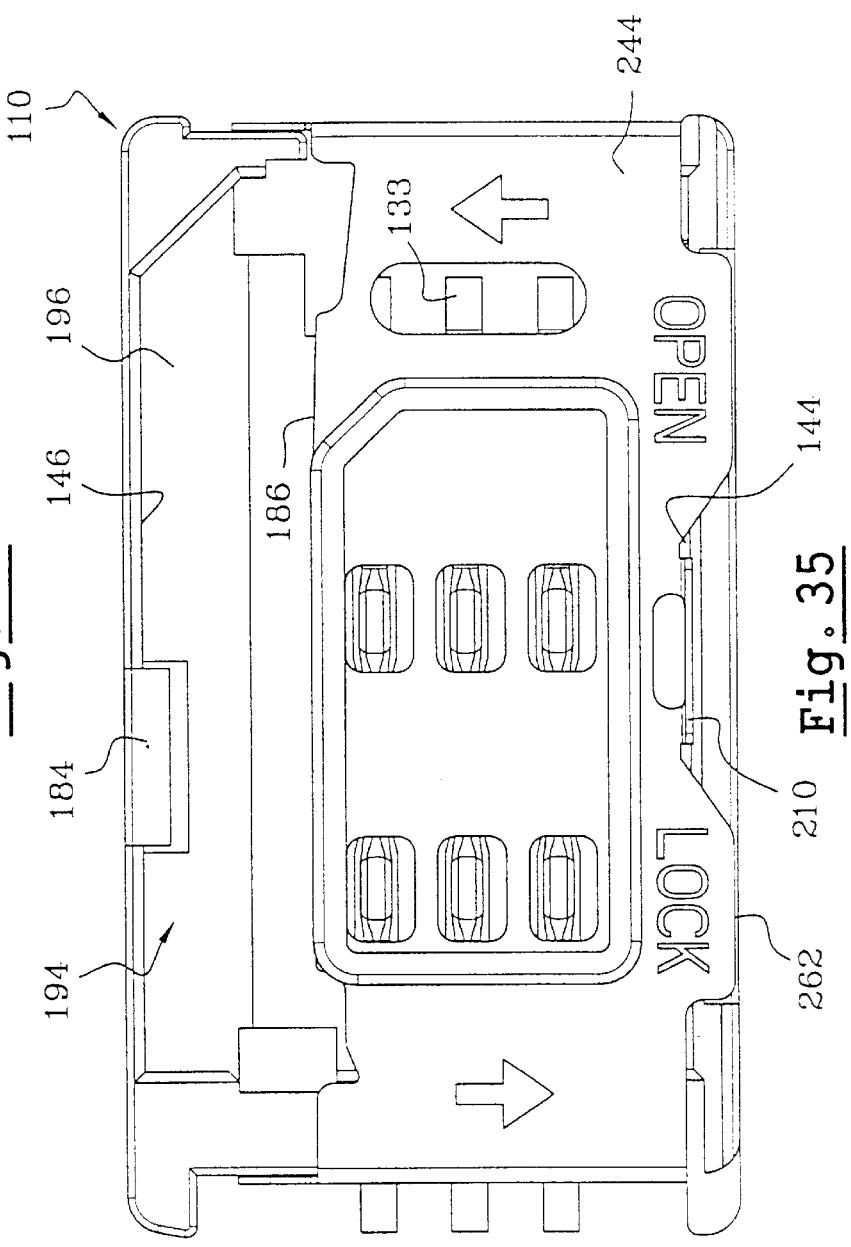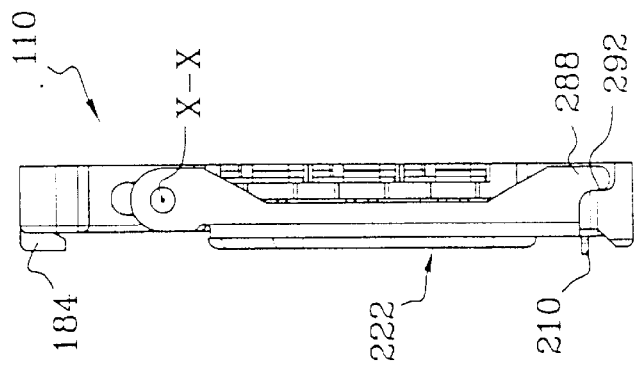

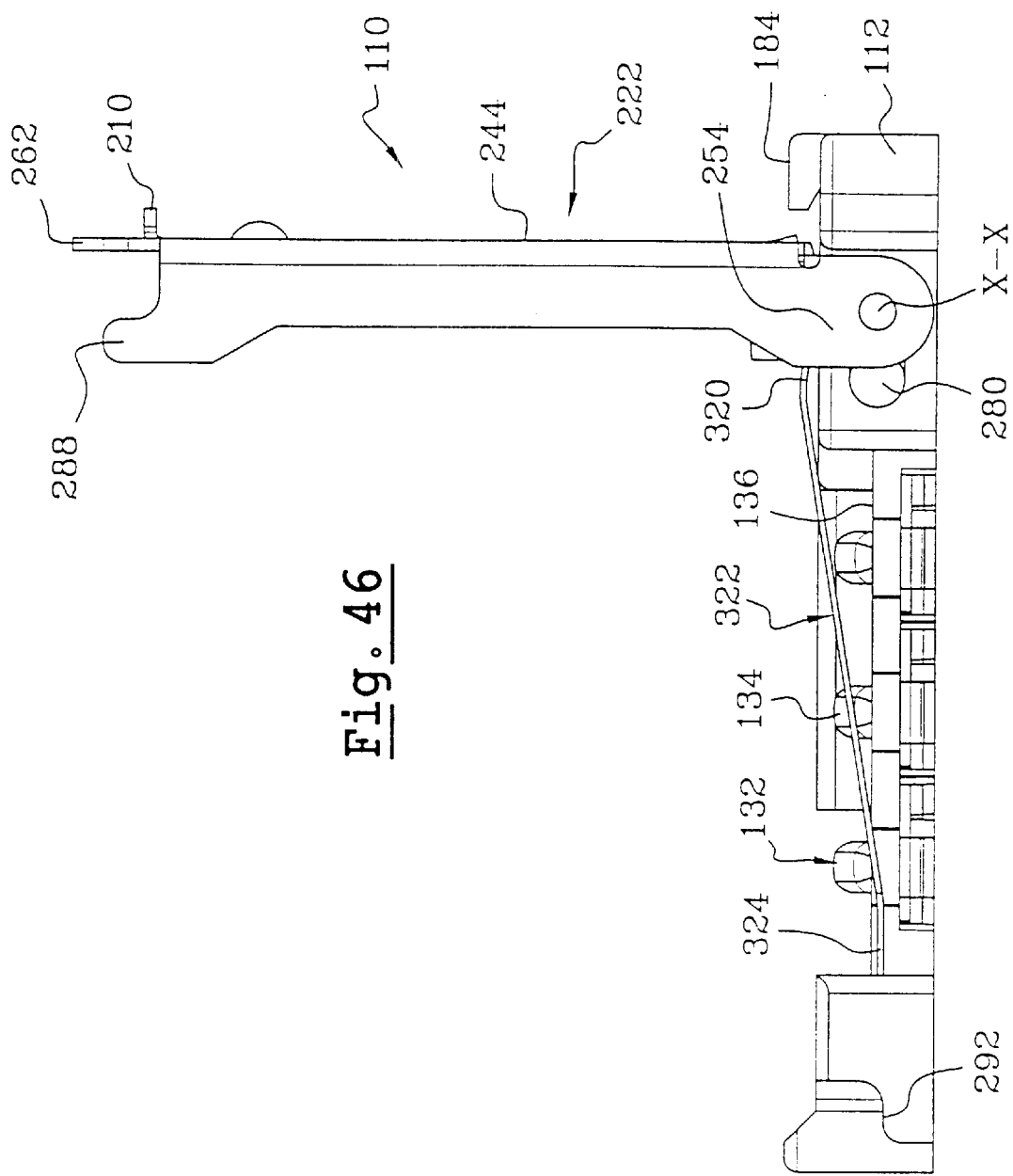

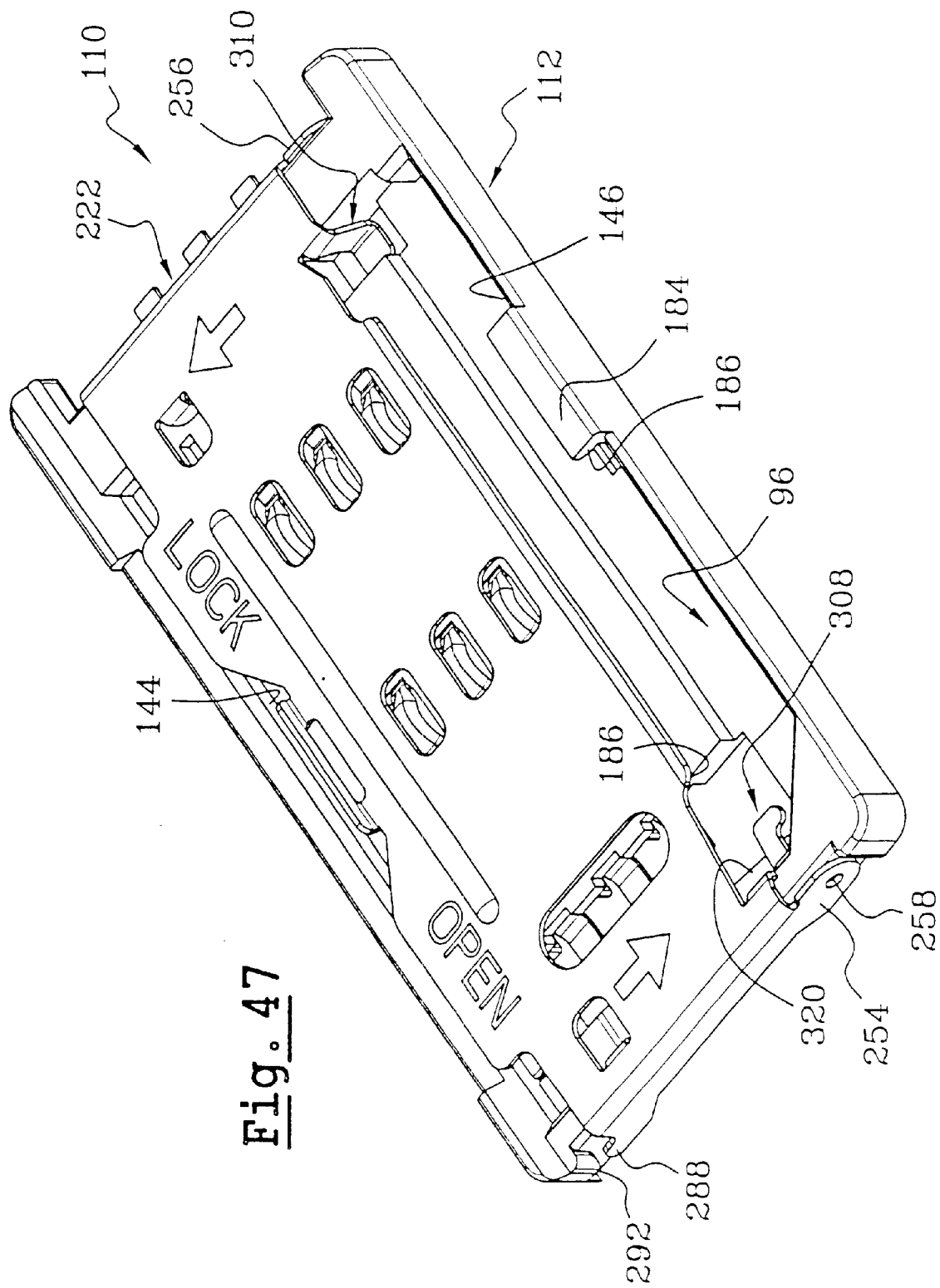

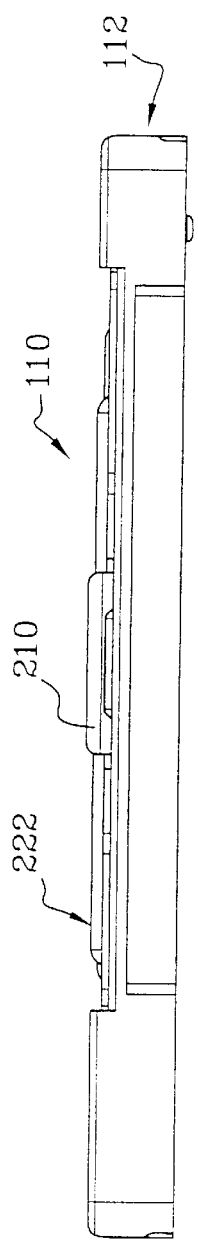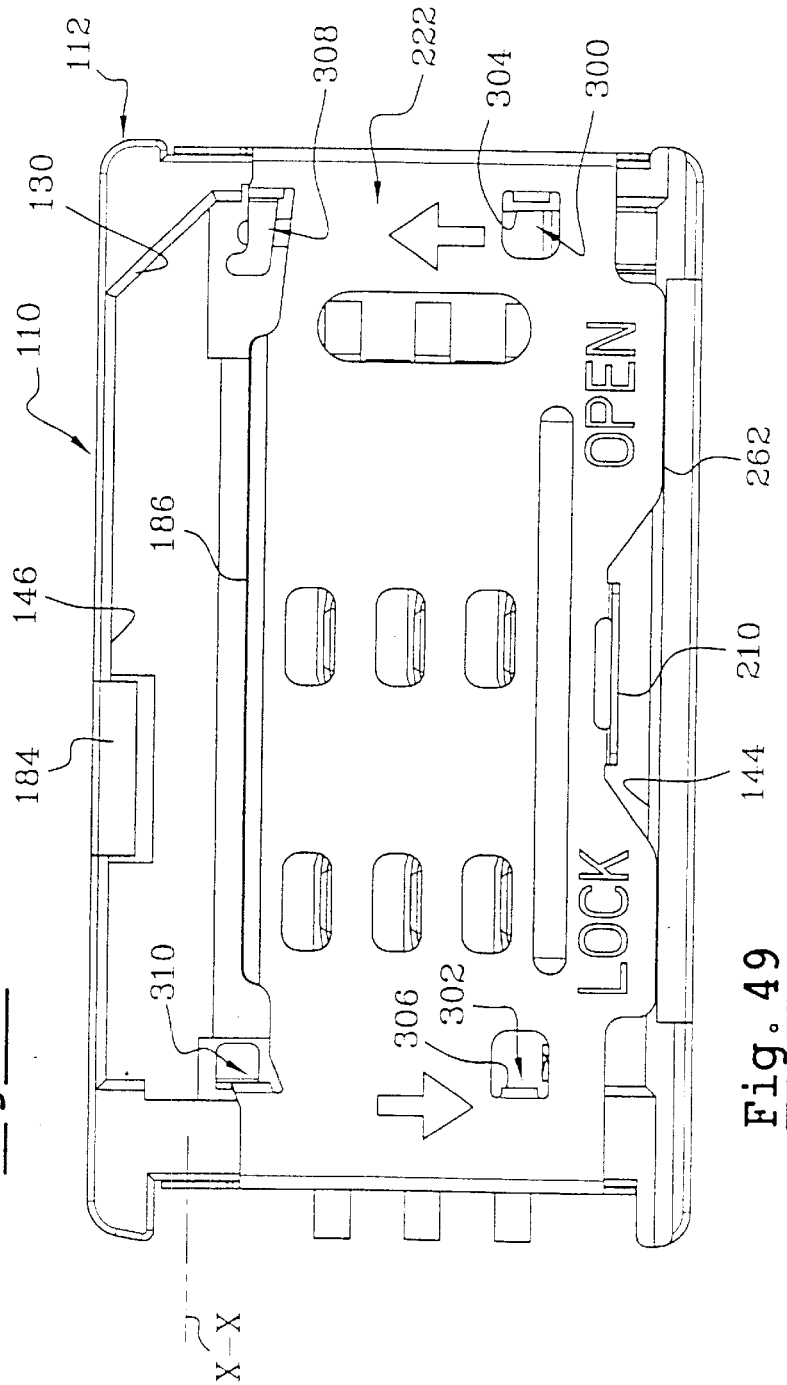
Fig. 50
Fig. 49

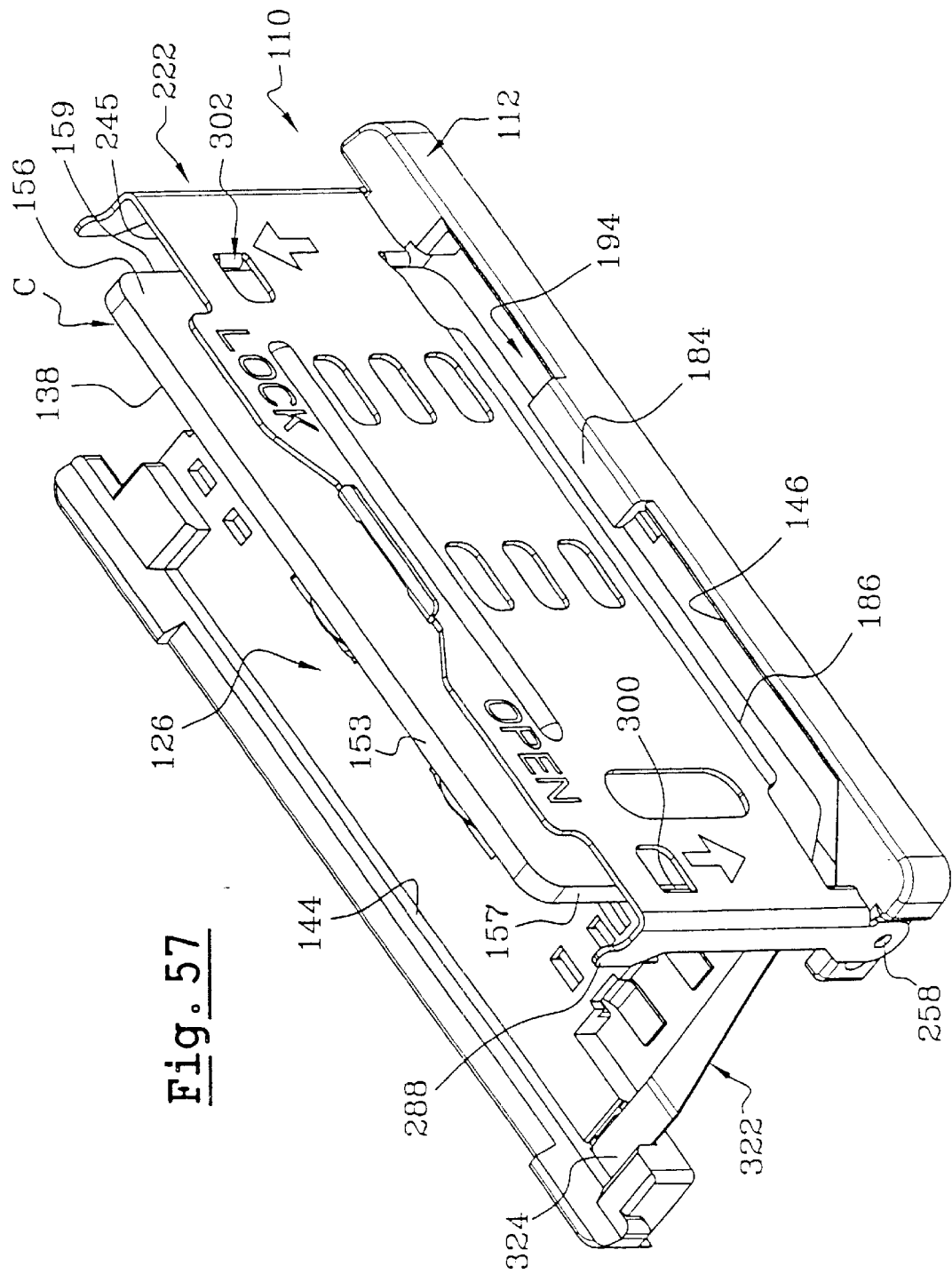

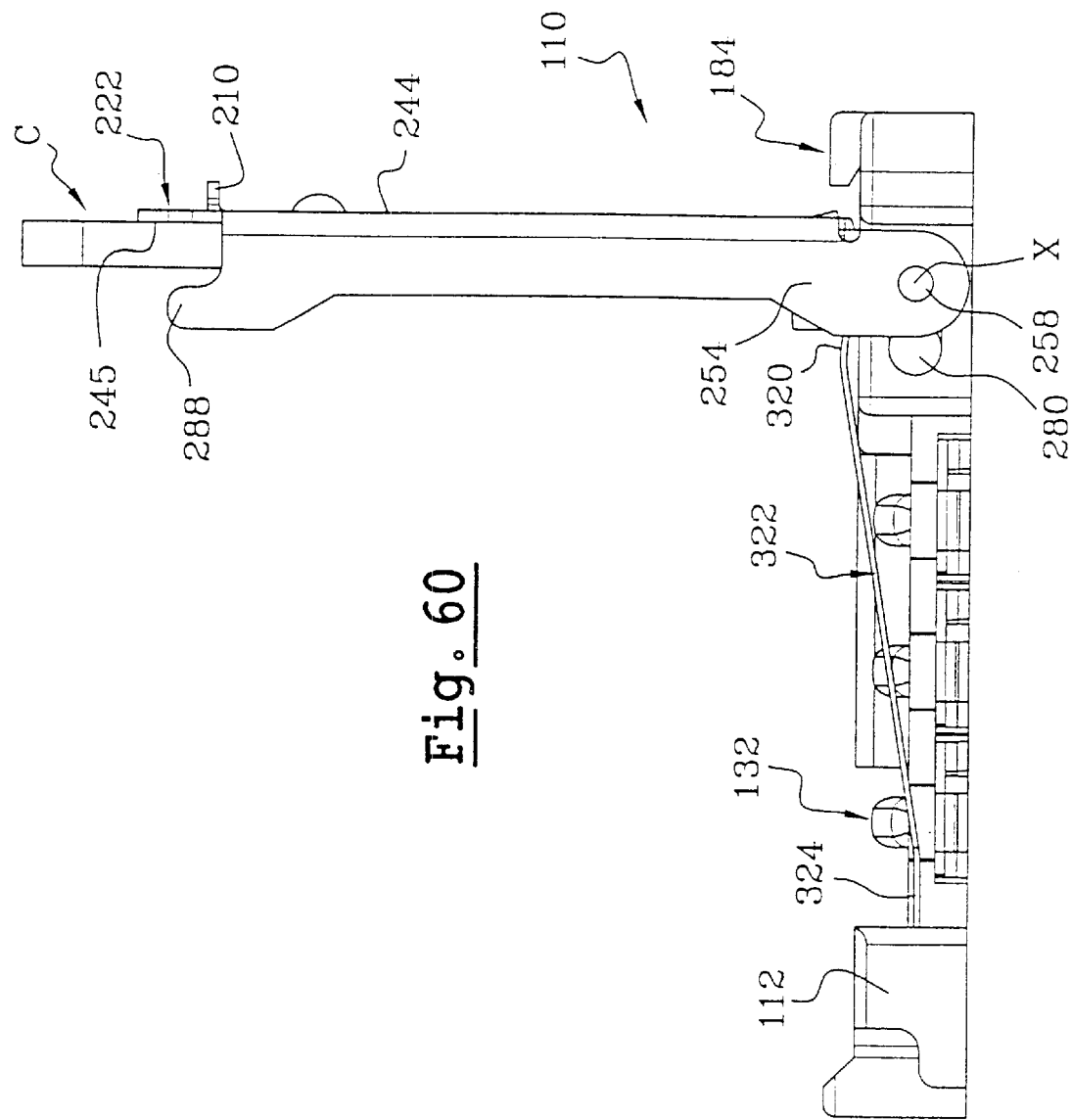

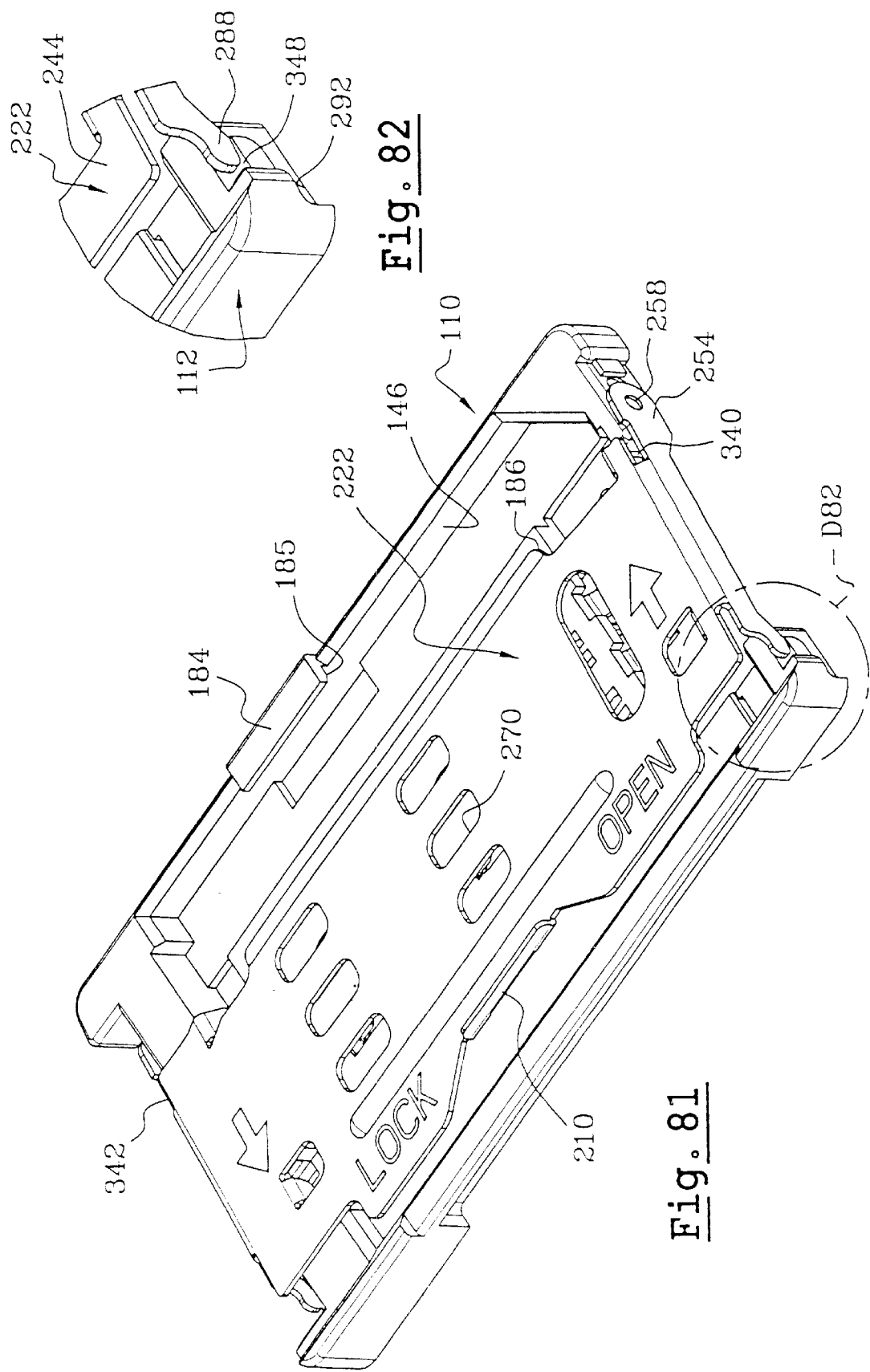

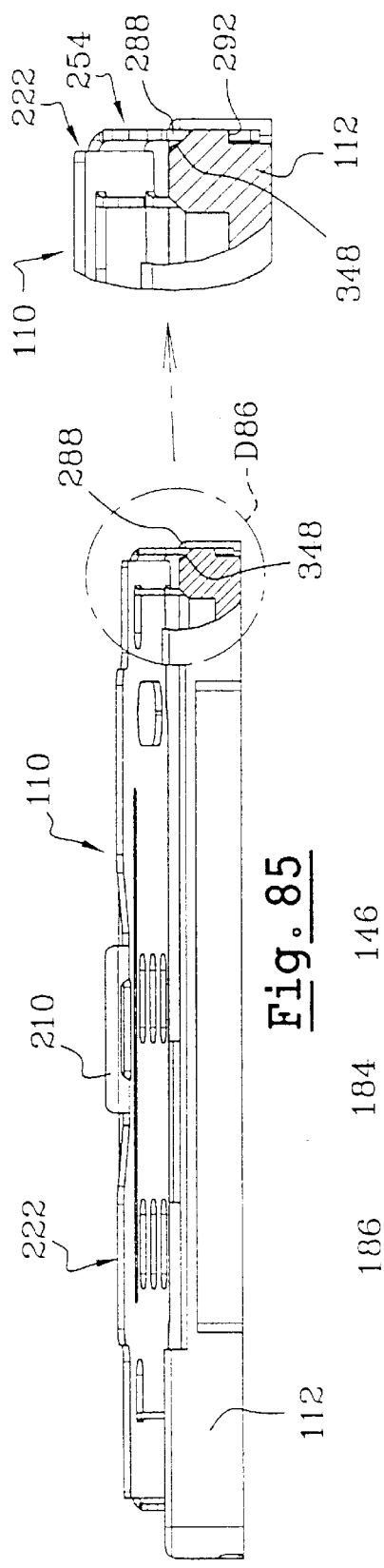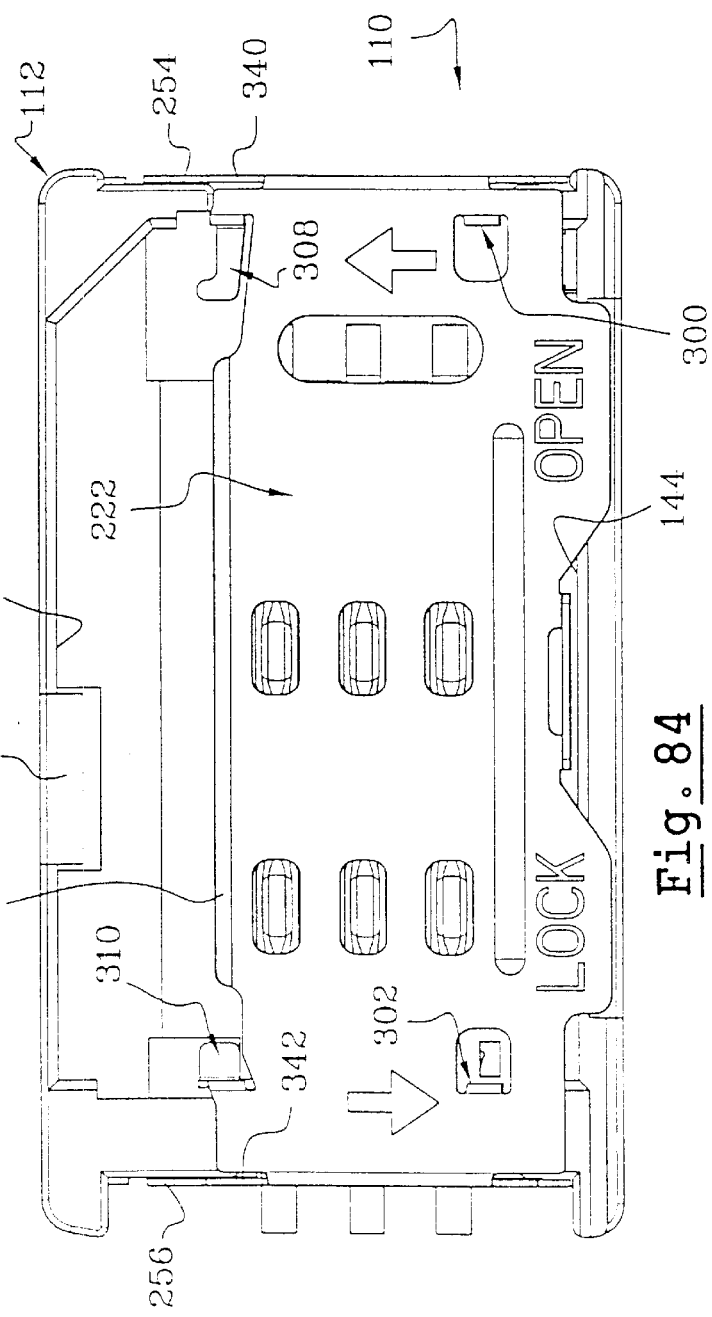

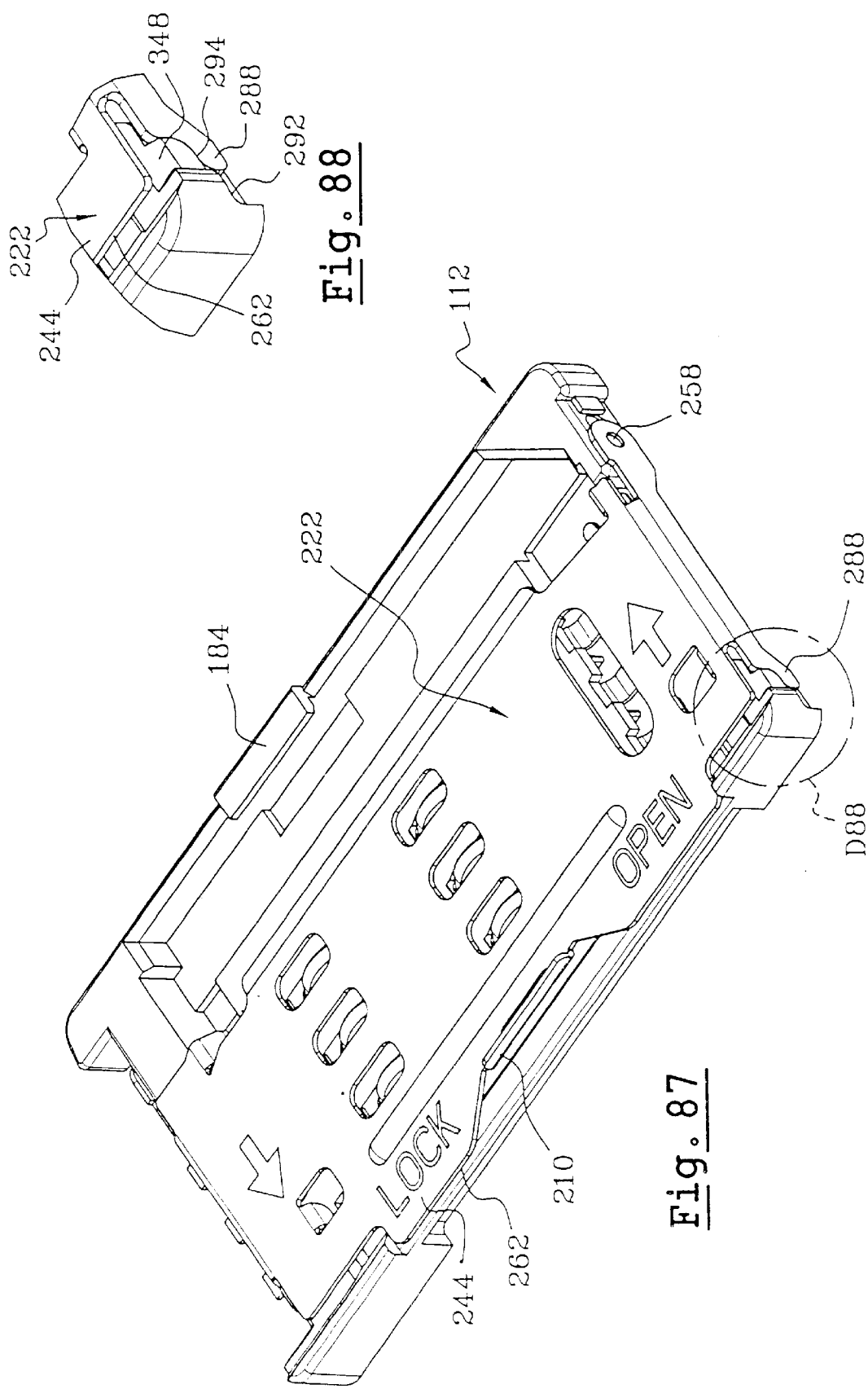

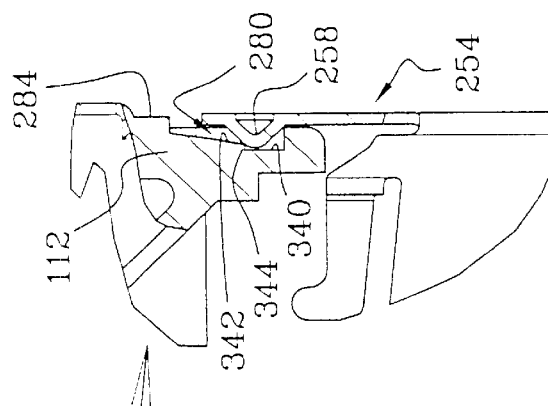
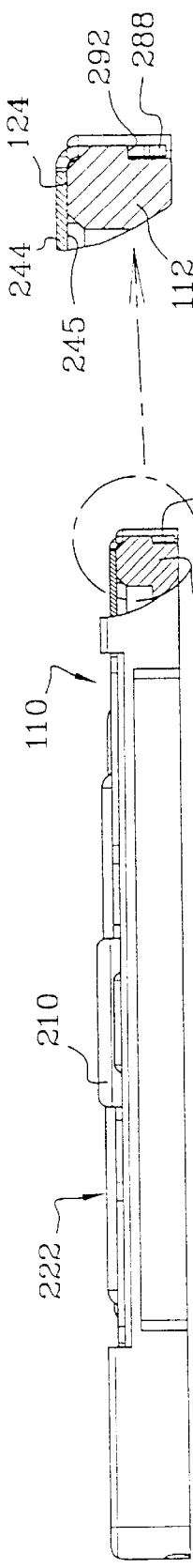
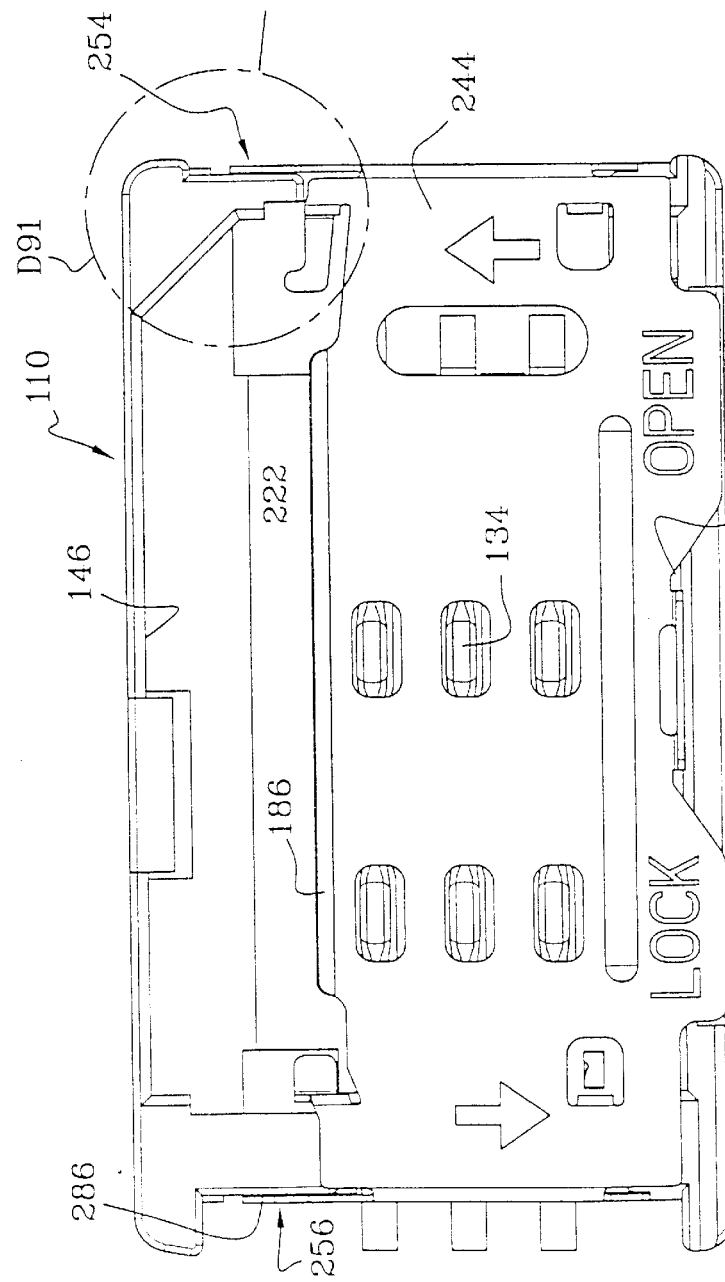

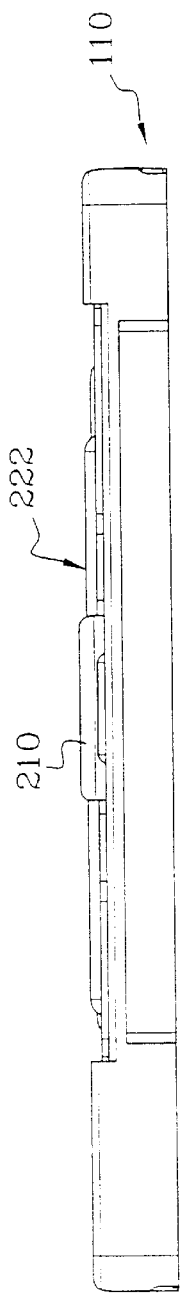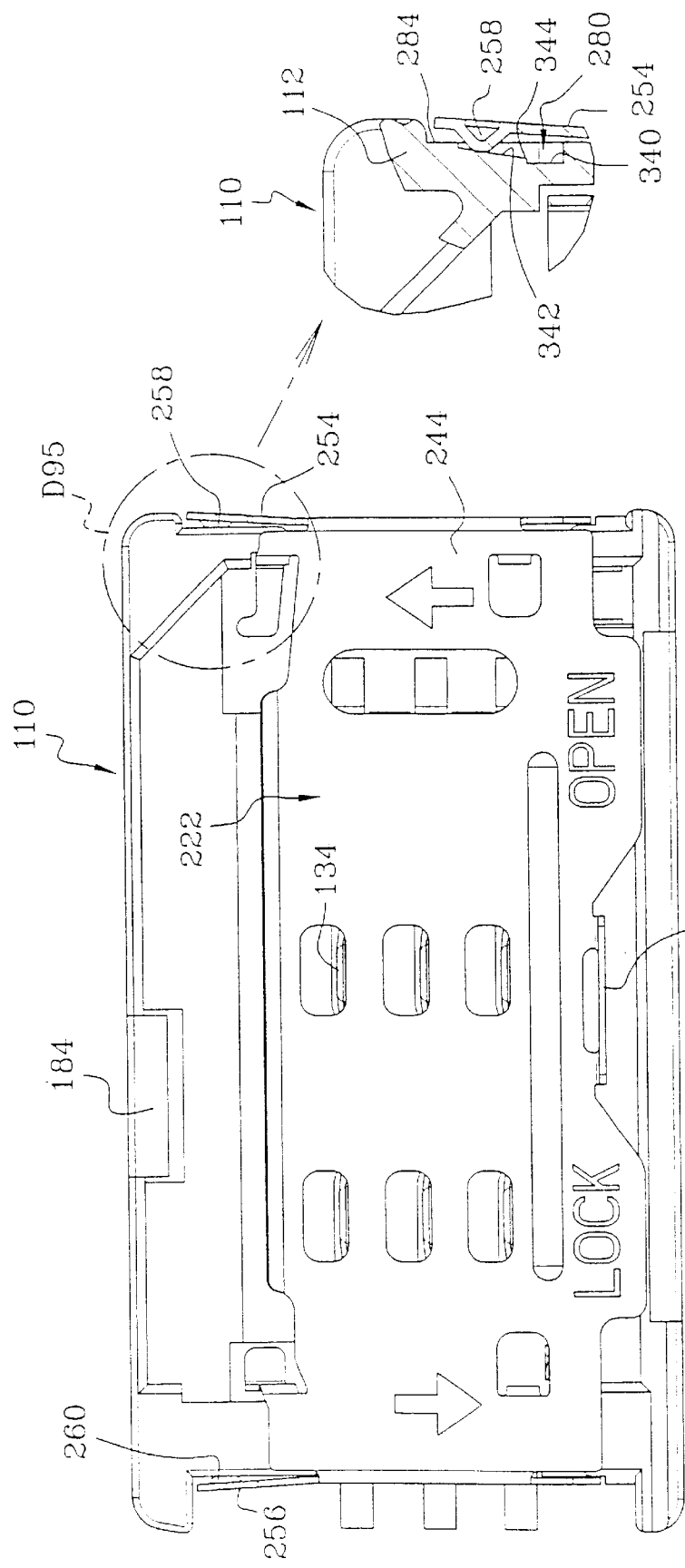

ERGONOMIC ELECTRICAL CONNECTOR FOR A SMART CARD

CROSS-REFERENCE TO RELATED APPLICATION

This is a continuation-in-part of PCT/EPO1/10640 application filed Feb. 14, 2001, which claims priority from French patent application 00/02006 filed Feb. 18, 2000.

BACKGROUND OF THE INVENTION

The present invention relates to an electrical connector for a contact-type smart card, also called an electronic memory card or chip card. The invention relates more particularly to a connector used for connecting the card to read/write circuits belonging to an electronic apparatus or equipment, such as, for example, a GSM-type mobile telephone, or a communication terminal, with which the connector is fitted.

According to the various known designs of such cards, most of which are standardized, the card is of rectangular general shape and has, on its lower face, contact pads which can engage contacts of a connector which are connected to read/write circuits of the electronic equipment. In the case of "chip" cards, the contact pads are grouped in a block of adjacent pads. The dimensions of the block are large, compared with the block of conducting pads of the standardized card type named "SIM", "MICROSIM", etc. In the case of a card having a high memory capacity, such as a card called a "MEMORYGARD" the conducting pads are grouped together in a series of parallel adjacent pads which extend as far as a transverse edge of the card.

In a large number of applications, the card is put manually into the use position in the connector, and therefore in the equipment with which it is associated. That is, the equipment does not include means for transferring the card between a position for manually loading the card into a carriage or slide-in unit, and the card-contacting position. In many arrangements, the card is inserted manually, directly into a connector cavity, in a longitudinal insertion direction parallel to the general plane of the card.

Arrangements are also known in which the card is put into position vertically in the housing by moving it upward perpendicular to its general plane. In this case, the space available above the housing of the connector must be at least equal to the longitudinal and lateral dimensions of the card and a fixed or moveable locking device, forming part of the electronic apparatus, allows the card to be locked in position in the connector.

Finally, connector designs are known in which the connector includes a hinged cap which has a cavity in which the user puts the card into position before closing the cap in order to bring the card into the contact position. In this case, the card is inserted "obliquely" so as to be inclined in a direction making an angle with respect to the horizontal plane of the base or support of the connector which carries the conducting elements. In order to be able to open the cap of the connector, this approach also requires there to be a sufficient space around and above the connector.

In all the cases that have just been mentioned, the overall size of the connector can be reduced to its minimum, but it remains necessary to have a large space around or above the connector to allow the card to be inserted, and in all cases, the space to be provided around the connector is greater, at least in one direction, than the corresponding dimension of the card.

In order to solve this problem, a design has been proposed, in which the card is inserted downwards, by presenting it at an incline. This design minimizes the total size of the connector, and the necessary space above the connector. However, it requires the user to bring the card into a precise position and the user must push on the card to insert it. Also, if the user does not continue pushing, the card remains in its inclined position and the telephone cannot be used.

SUMMARY OF THE INVENTION

In accordance with one embodiment of the invention, an electrical connector is provided for a contact-type smart card, which facilitates card insertion by enabling the user to easily view the card-receiving cavity in a compact and low cost design. The connector includes a support having a card-receiving cavity. The cavity is arranged so a smart card is installed by orienting the card at a downward incline with a first of its long sides lowermost. The card is inserted so the first long side lies against a recessed rear side of the cavity, the card then being tilted down to a horizontal position.

A card hold-down includes a sheet metal cover with a rear side pivotally connected to the rear side of the support and a front side that can latch to the front side of the support. The cover can be slideable, as well as pivotal, so it can be slid toward the front side of the support after the cover has been pivoted down, to latch the cover closed. The cover can have longitudinally opposite ends bent at right angles to form mount tabs that mount on the support.

According to other characteristics of the invention:

- the guiding edge is close to the first of the edges of the housing;
- the first of the edges of the housing forms a stop against which a corresponding first edge of the card bears while the card is being put into the contact position;
- the stop edge is elastically deformable in a horizontal direction perpendicular to this edge in order to make the card bear elastically against an opposed parallel second edge of the housing;
- the bottom of the housing formed in the insulating support includes a recess which lies along the said stop edge and which receives said first edge of the card when putting the latter in position by sliding and pivoting it along the guiding edge;
- the bottom of the recess is offset vertically downwards with respect to the bearing plane of the card in the horizontal contact position;
- the connector has a plurality of electrical conductors in the form of elastically deformable blades which lie parallel to the said first of the edges of the housing and each of which has a curved first end for contact with a corresponding pad on the card, which pad projects vertically upwards from the bottom of the housing;
- the card is rectangular and the guiding edge is parallel to the length of the complementary rectangular housing;
- the connector includes at least one fixed tab for retaining the card in the housing which lies horizontally parallel to the bottom of the housing and in a cantilever fashion above the latter from the said first of the edges of the housing;
- the guiding edge forms part of the said retaining tab;
- the guiding edge forms part of an element attached to the insulating support;
- the connector includes means for retaining the card in the contact position in the housing, which means lie at least partly above the upper face of the card;

the connector includes retractable means for retaining the card in the contact position in the housing, which means, In the card-retaining position, lie at least partly above the upper face of the card;

the retractable retaining means have an attached element which is mounted so as to move with respect to the insulating support between a retracted position allowing the card to be inserted for the purpose of putting it in the contact position in the housing and a position for retaining the card in the contact position in which a part of the moveable retaining element lies above the upper face of the card;

in the card-retaining position, a part of the moveable retaining element lies above a peripheral part of the upper face of the card near a second edge of the card which is opposite the said first edge of the card;

the attached moveable retaining element is mounted so as to move translationally with respect to the insulating support along a horizontal direction perpendicular to said first of the edges of the housing;

the attached moveable retaining element is a flap which is mounted so as to be hinged to the support about a horizontal axis and which, in the retaining position, lies horizontally above the housing which it at least partly covers;

the flap is mounted so as to be hinged to the support about an axis parallel to said first of the edges of the housing;

the flap is mounted so as to be hinged to the insulating support about an axis which is close to said first of the edges of the housing, between a retracted position in which the flap lies more or less vertically and its horizontal card-retaining position, and the guiding edge is part of the flap;

the hinge axis of the flap is located between said first edge and the opposed parallel second edge of the housing and, when the flap is in its retracted extreme angular position, the edge for guiding the card is offset vertically upwards with respect to the hinge axis of the flap and is located between the said first edge of the housing and the hinge axis;

the flap includes means which, when the flap is in the retracted position, bold the card in a position substantially adjacent to the internal face of the flap, and closing the flap causes the card to be inserted into the housing and then put into the contact position by sliding and pivoting along the said edge;

the said holding means allow the card to tilt with respect to the flap until it reaches an intermediate position in which the upper face of the card bears against the guiding edge;

the holding means consist of at least one pair of opposed holding tabs which lie along the edges of the card which are perpendicular to said first of the edges of the housing and which engage with facing portions of the lower face of the card;

the moveable retaining element is elastically returned to its card-retaining position;

the moveable flap is elastically returned to its retracted position and means are provided for locking the flap in its position for retaining the card;

the locking means are means for automatically locking the flap when the latter reaches its card-retaining position;

Further characteristics and advantages of the invention will become apparent on reading the detailed description which follows, for the understanding of which reference will be made to the appended drawings in which:

BRIEF DESCRIPTION OF THE DRAWINGS

First Embodiment

Second Embodiment

Figure 1:
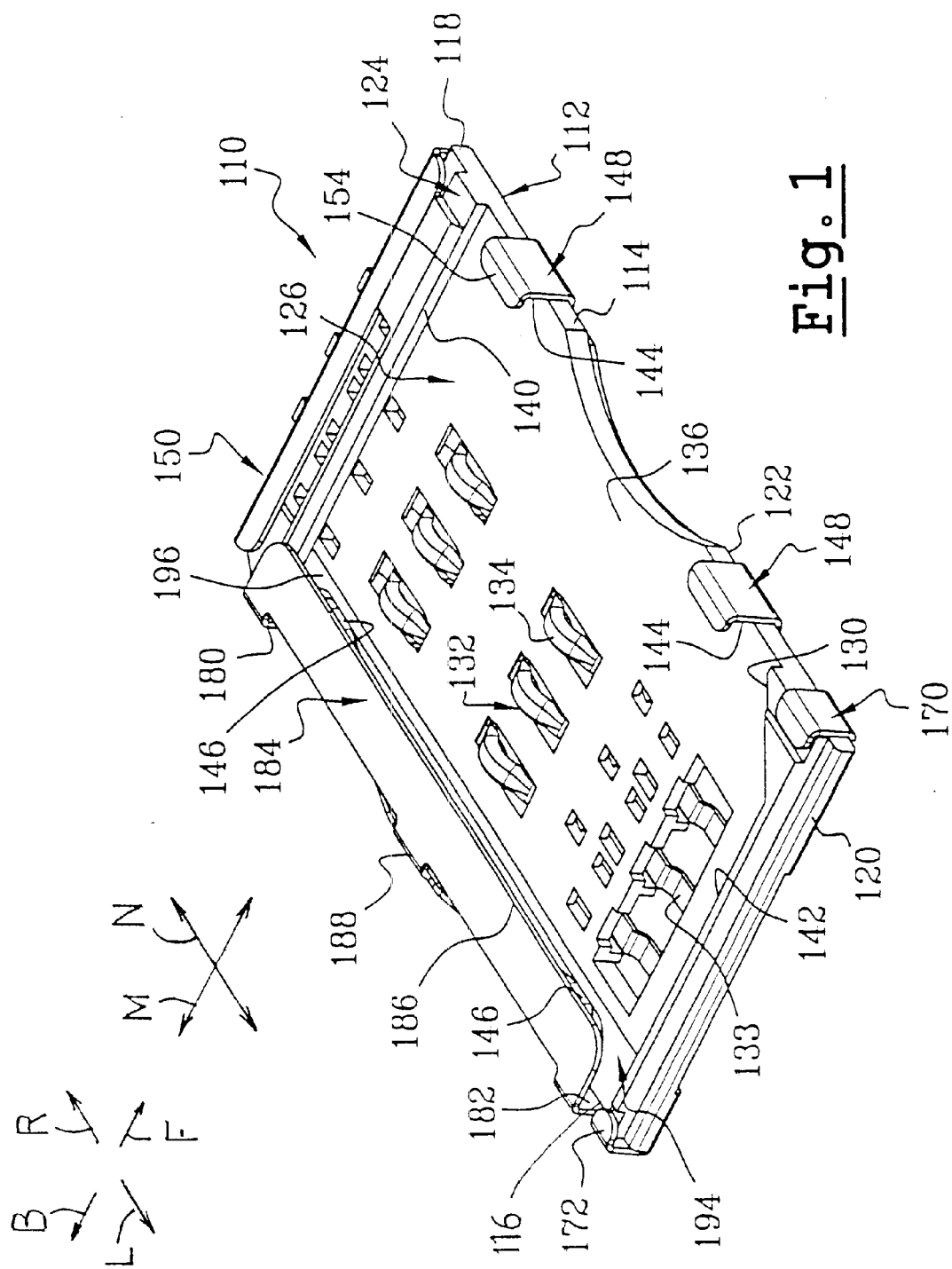
FIG. 1 is top isometric view which illustrates a first embodiment of a connector according to the invention which is shown without a card and in which the means for retaining the card in the contact or use position are fixed means.
Figure 4:
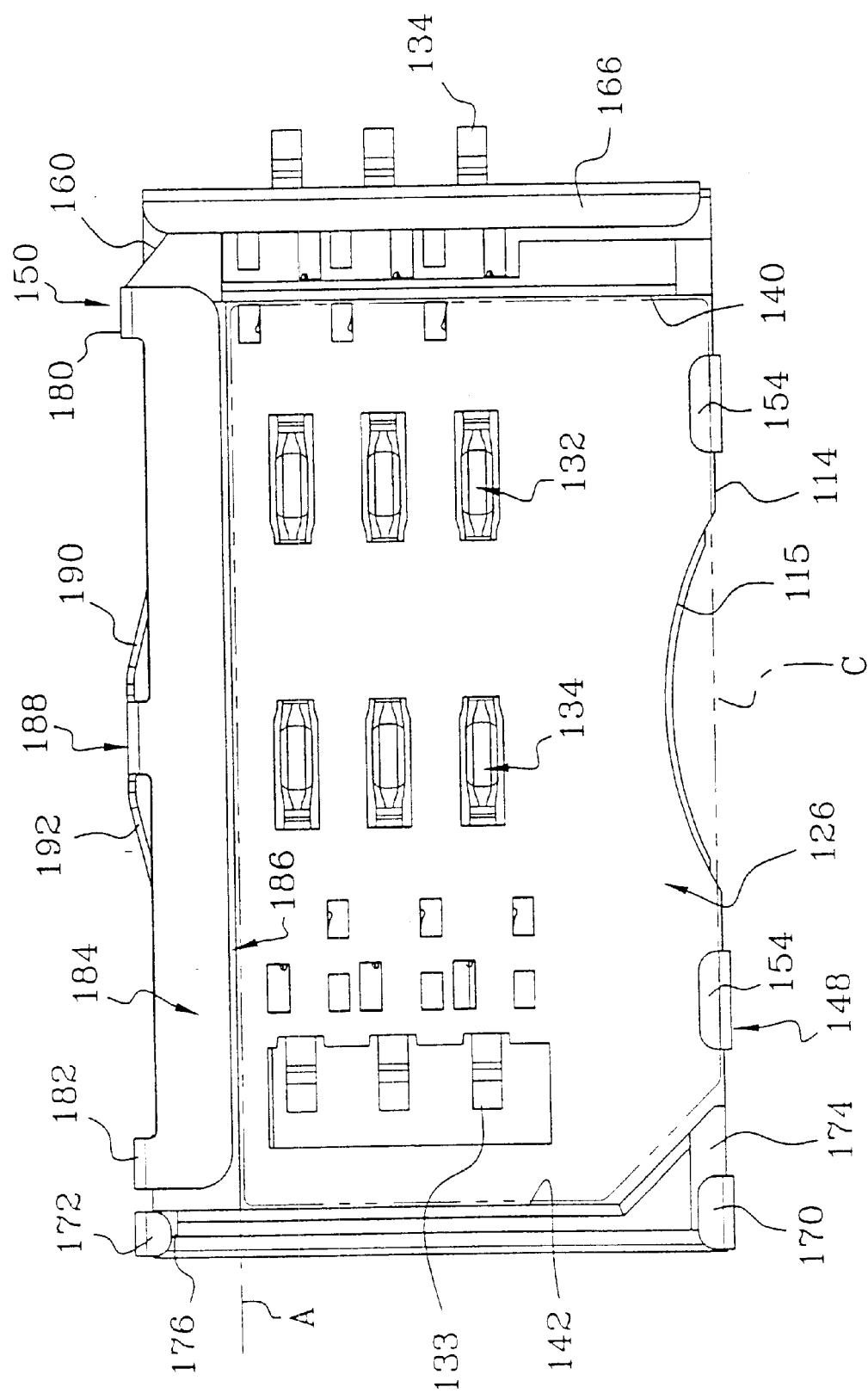
FIG. 4 is a top view of the connector of FIG. 1
Figure 6:
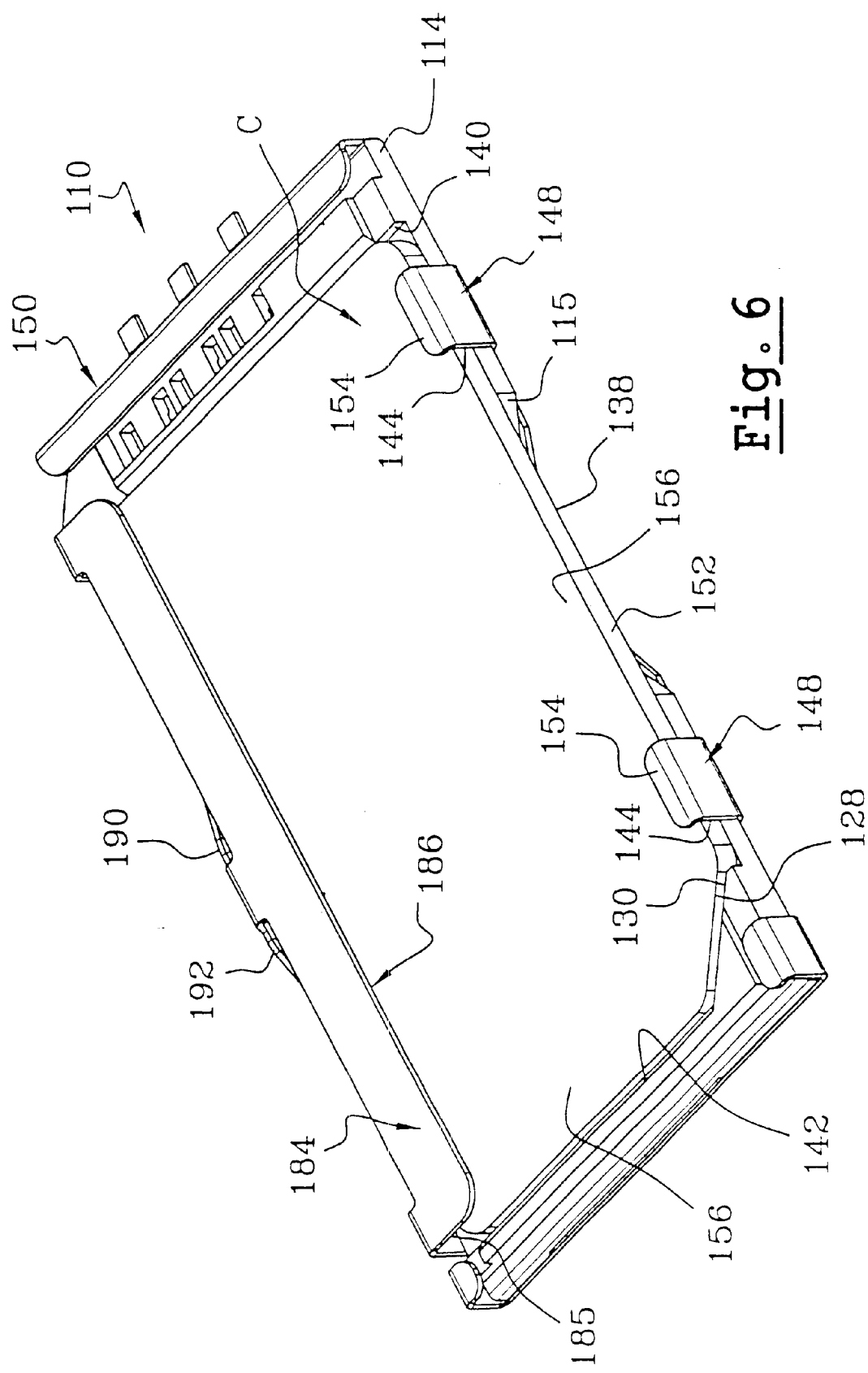
FIG. 6 is a view similar to that in FIG. 5, in which the card is shown in the fully inserted position.
Figure 7:
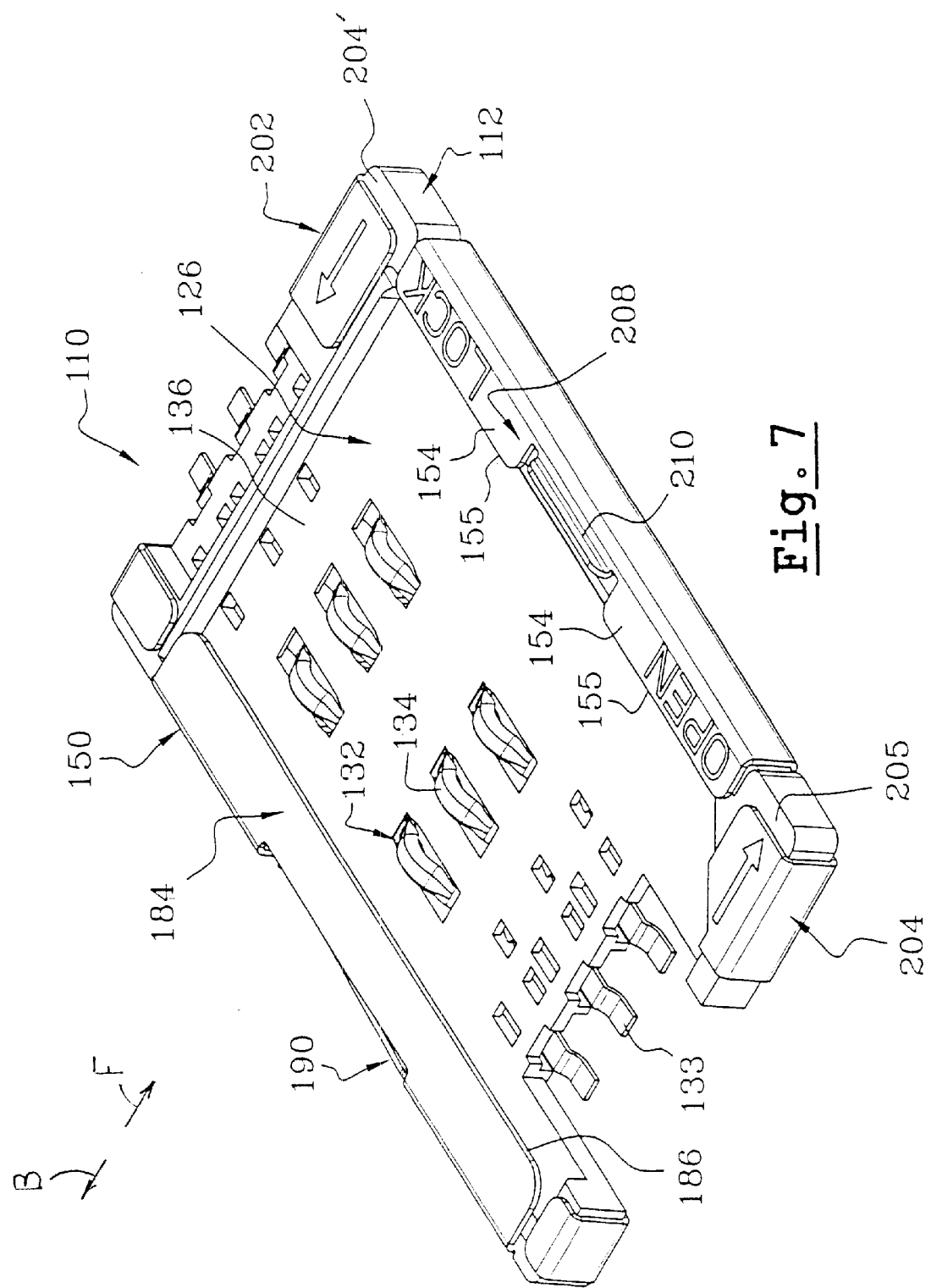
Figure 8:
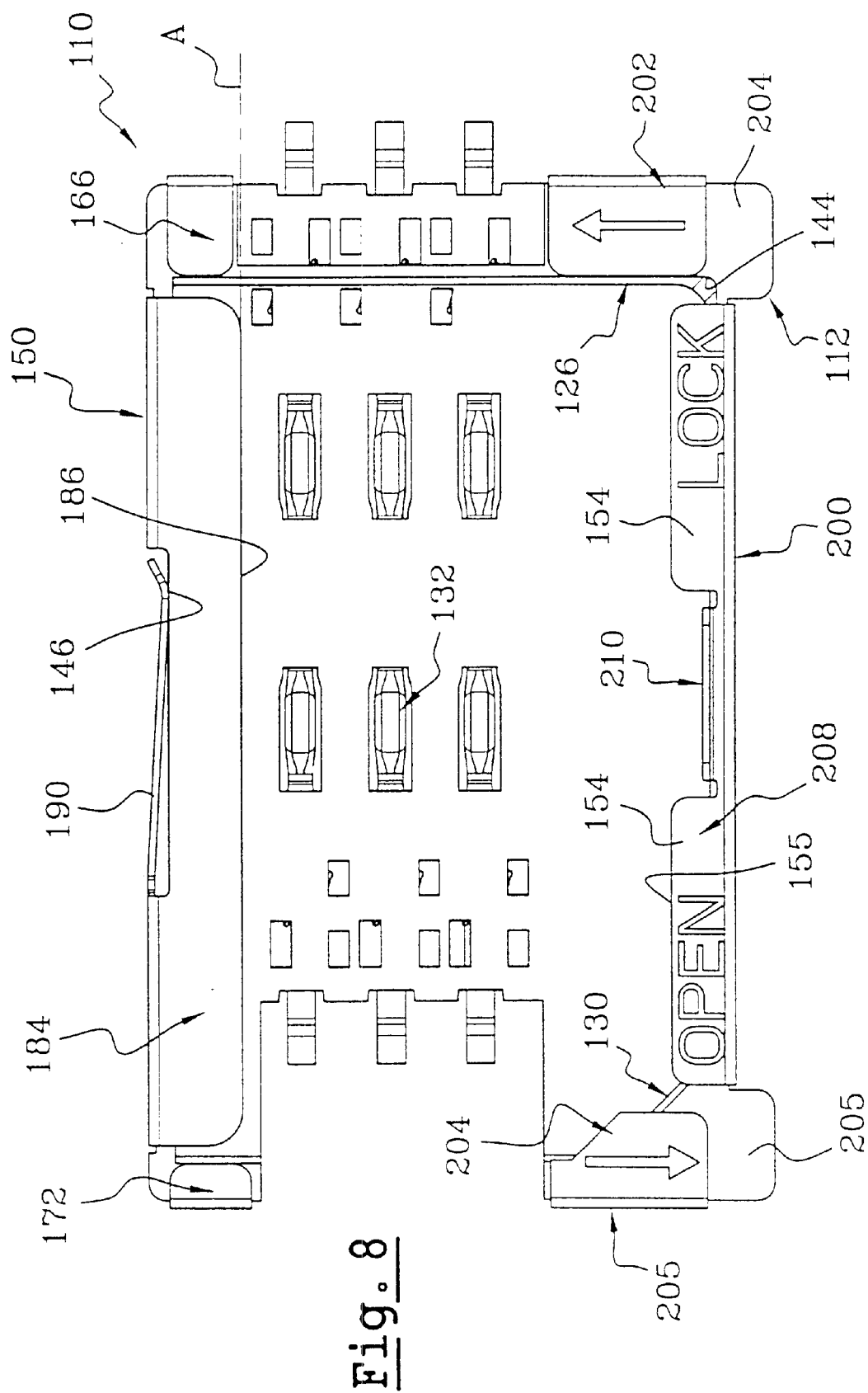
Figure 9:
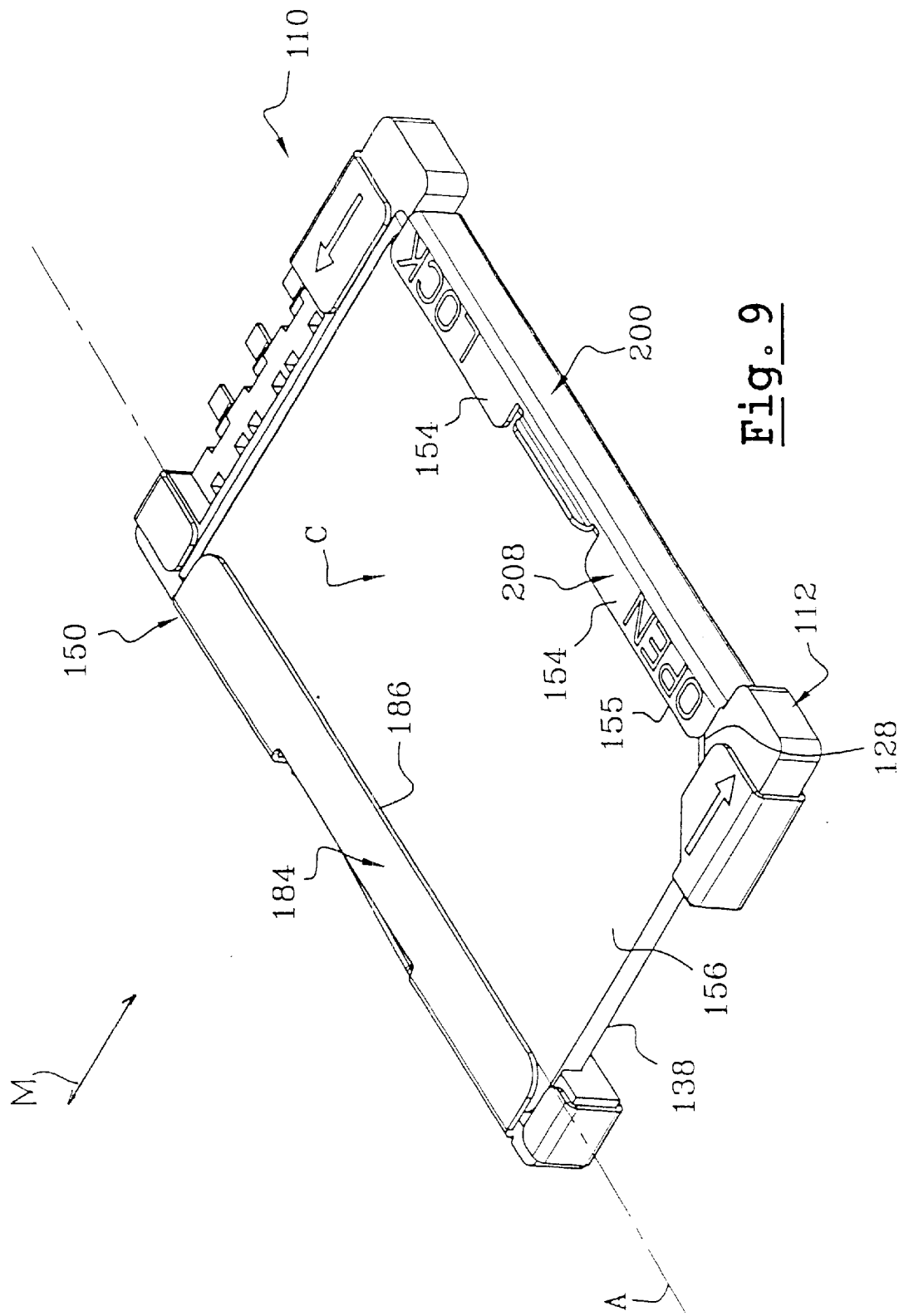

FIG. 7 is a view similar to that in FIG. 1, which illustrates a second embodiment of the invention which includes a moveable element for retaining the card in the contact position, in the form of a lock mounted so as to slide laterally and shown in the open or retracted position allowing the card to be inserted for the purpose of putting it into the contact position in the housing;

FIG. 8 is a view similar to that in FIG. 4, in which the sliding lock is shown in the closed position for retaining the card with part of the retaining element lying above the upper face of the card;

FIG. 9 is a view similar to that in FIG. 6, in which the sliding lock is shown in the closed position;

Third Embodiment

Figure 10:
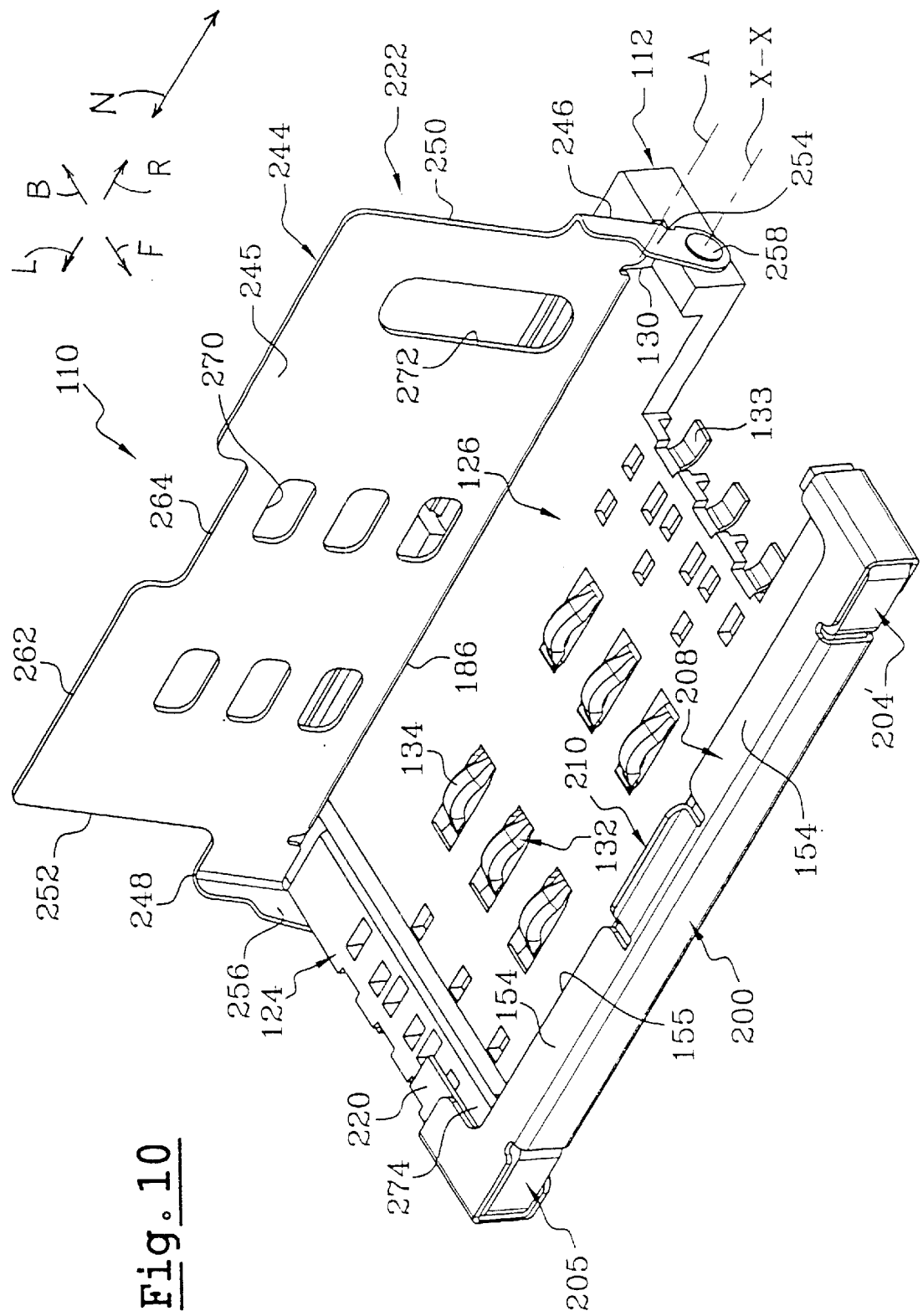
Figure 11:
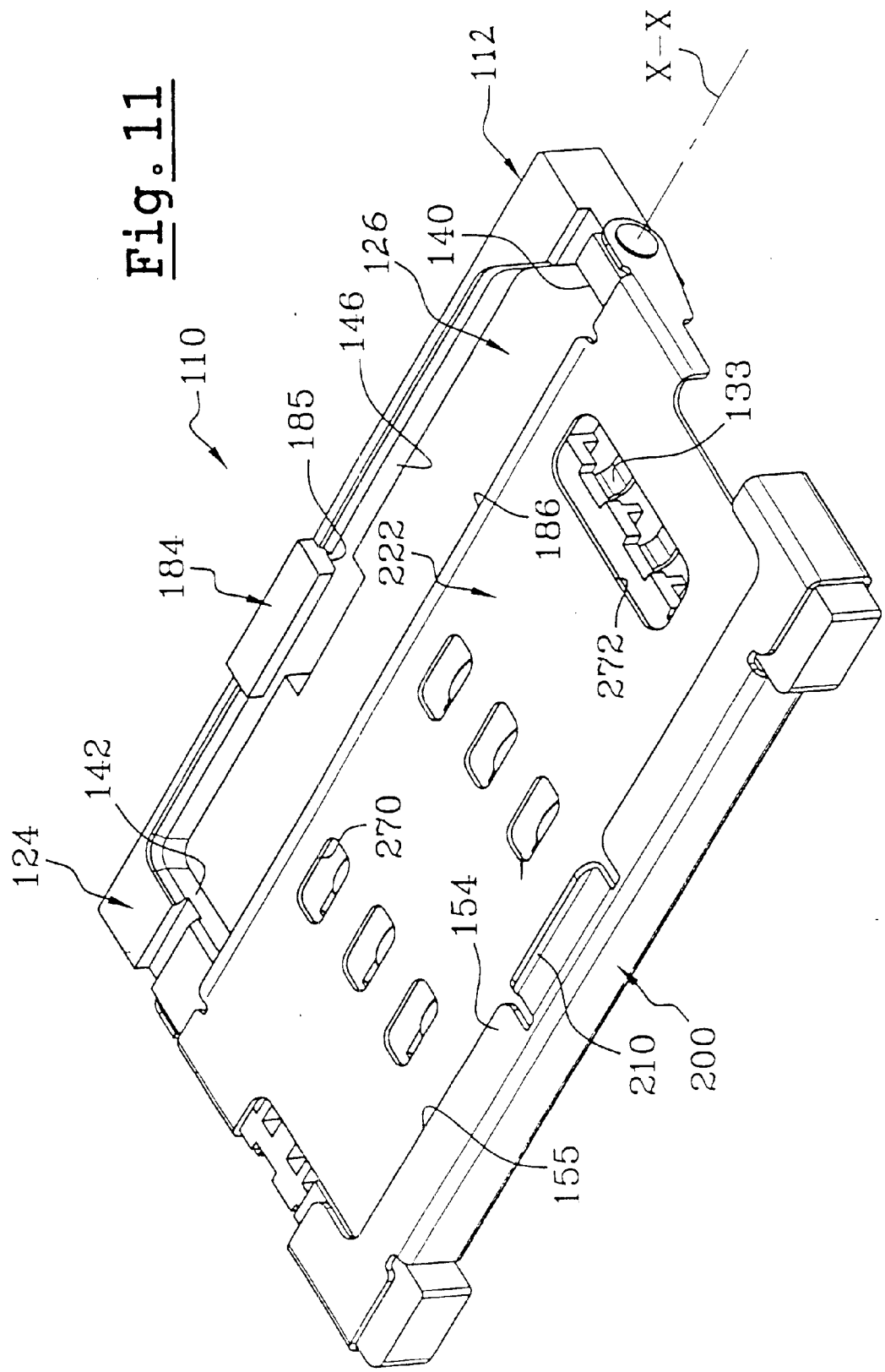
Figure 12:
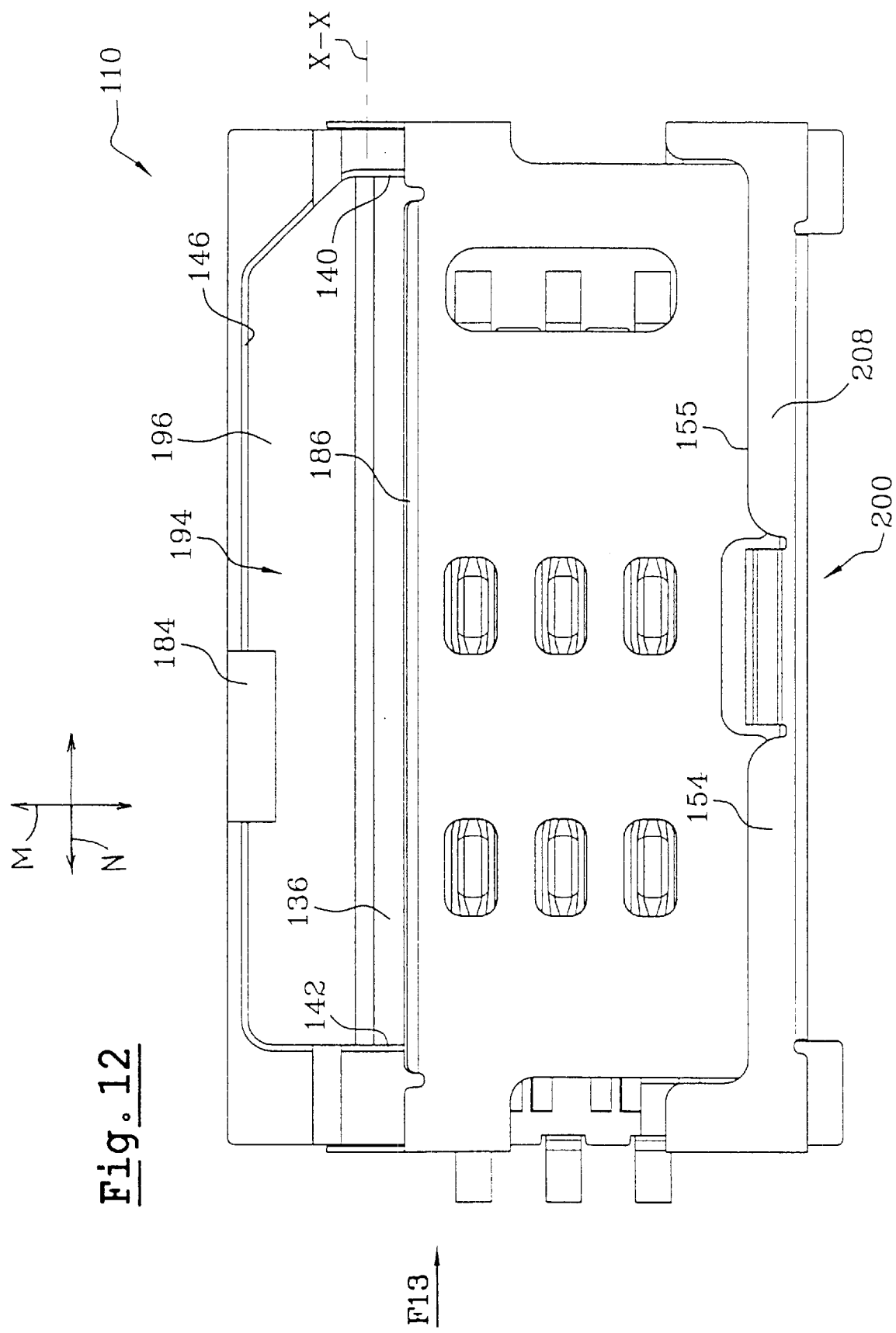
Figure 14:
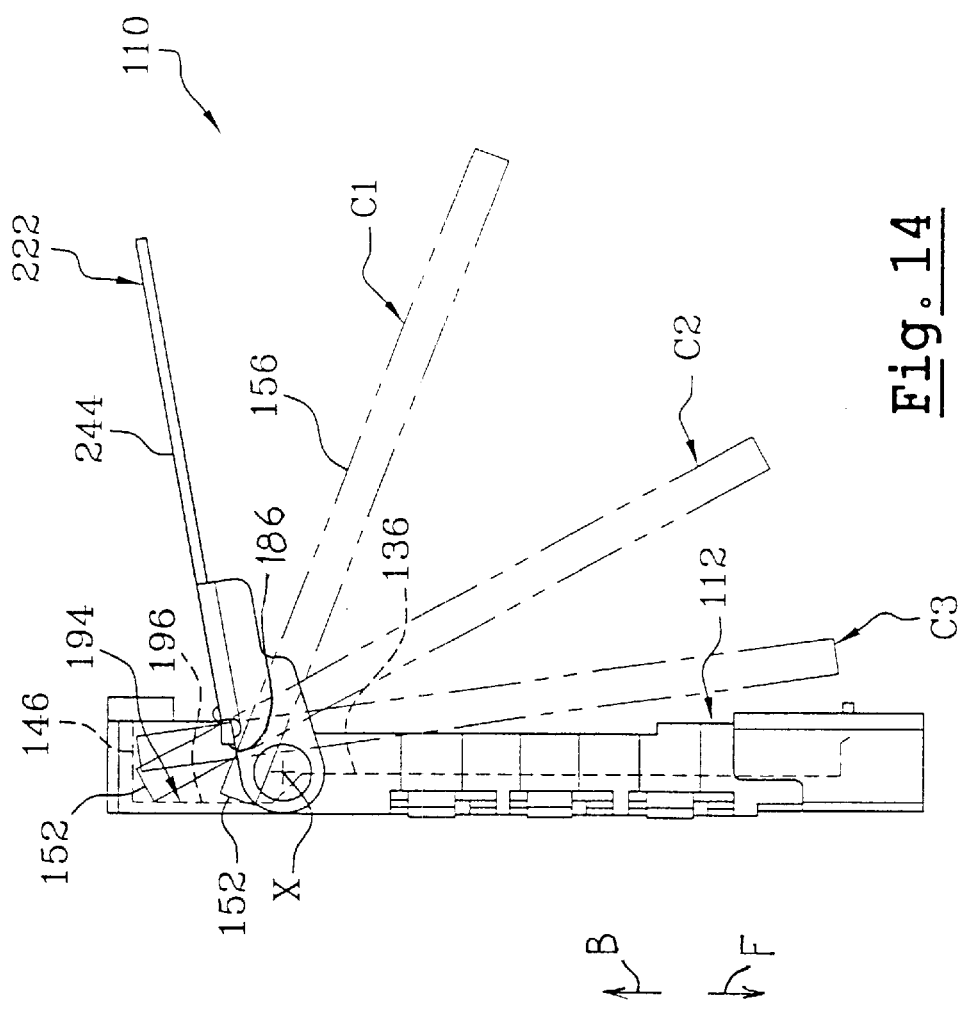
Figure 13:
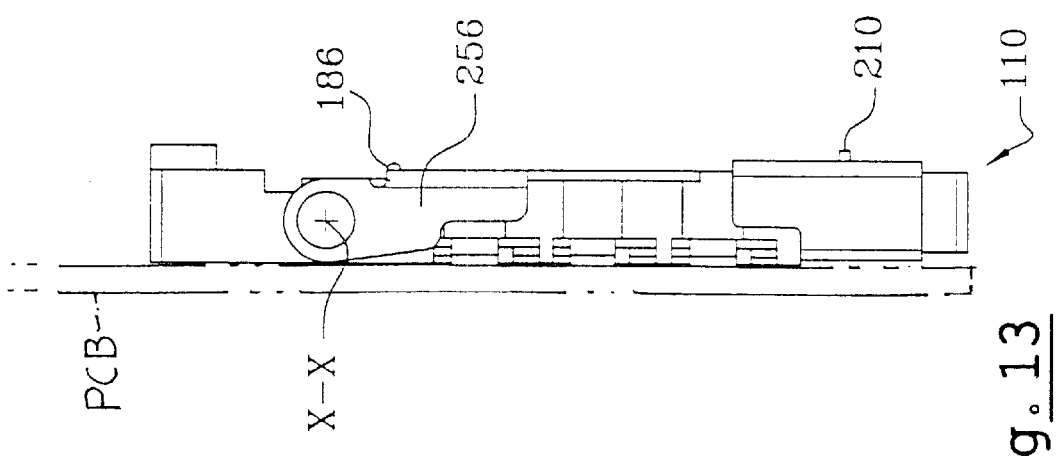

FIG. 10 is a top isometric view of a third embodiment of the invention, which has a moveable element for retaining the card in the contact position, in the form of a cover, or flap which is mounted so as to be hinged to the insulating support of the connector and which is shown in the open position, and which includes a sliding lock for locking the cover in the closed position, the lock being shown in the unlocked position;

FIG. 11 is a view similar to that in FIG. 10, in which the cover is in the closed position and the lock in the locked position;

FIG. 12 is a top view of the connector illustrated in FIG. 11;

FIG. 13 is a side view looking along the arrow F 13 shown in FIG. 12;

FIG. 14 is a view similar to that in FIG. 13, in which the card-retaining cover is shown in the open position, the lock being in the unlocked position, and in which three different positions of the card have been shown in phantom views;

FIG. 15 is a view similar to that in FIG. 12, in which a card is shown in the fully inserted position;

Fourth Embodiment

Figure 16:
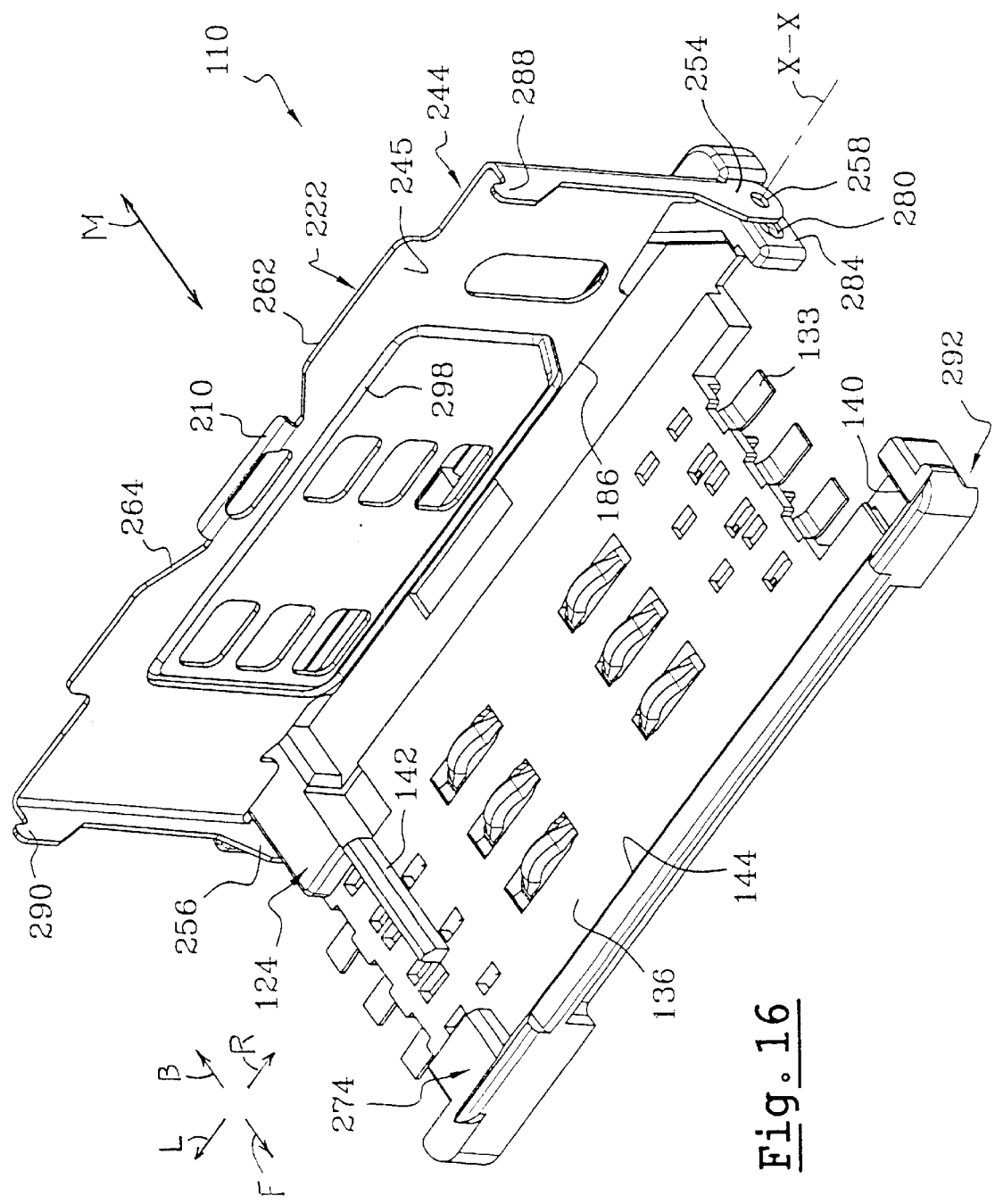
Figure 17:
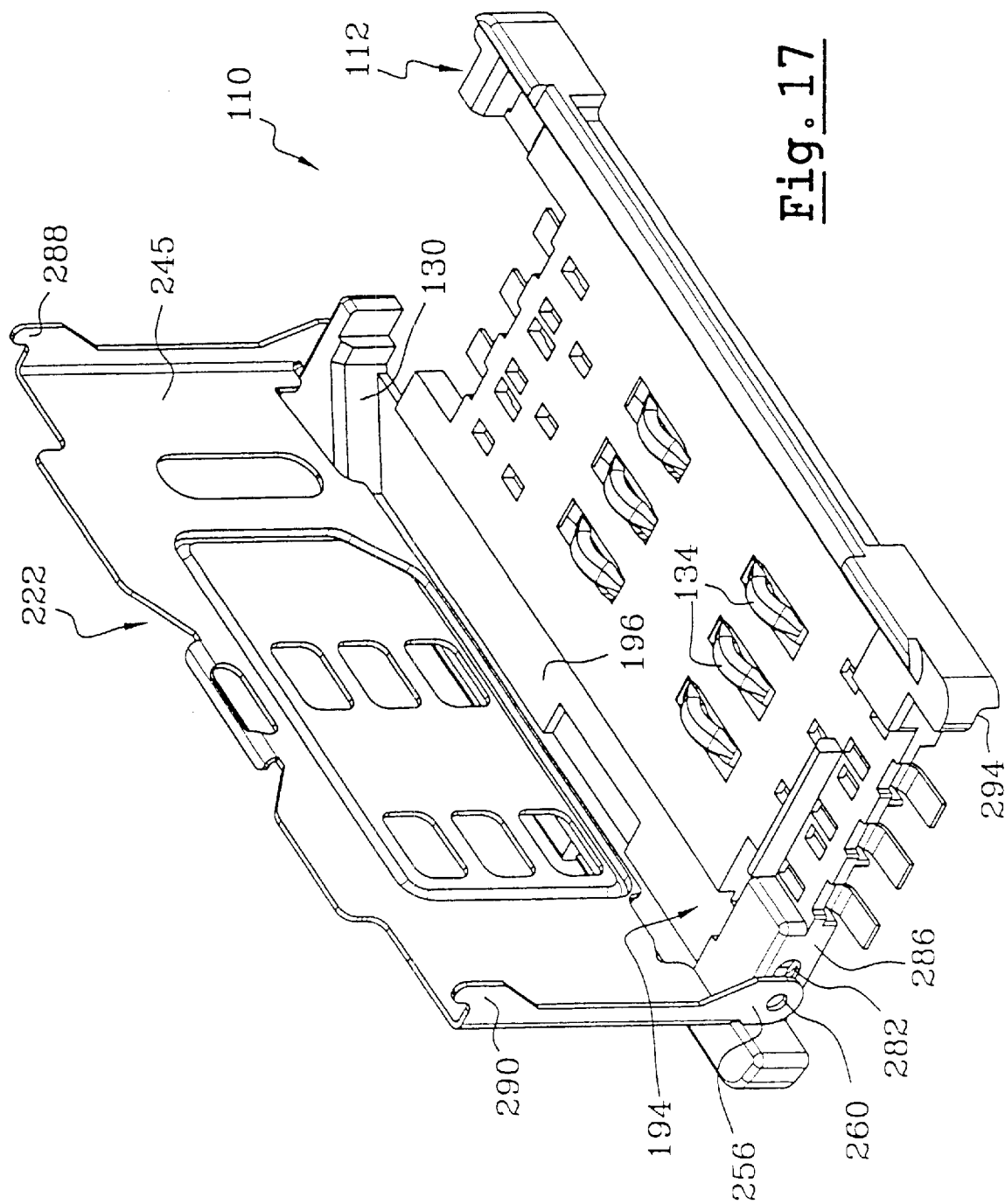
Figure 18:
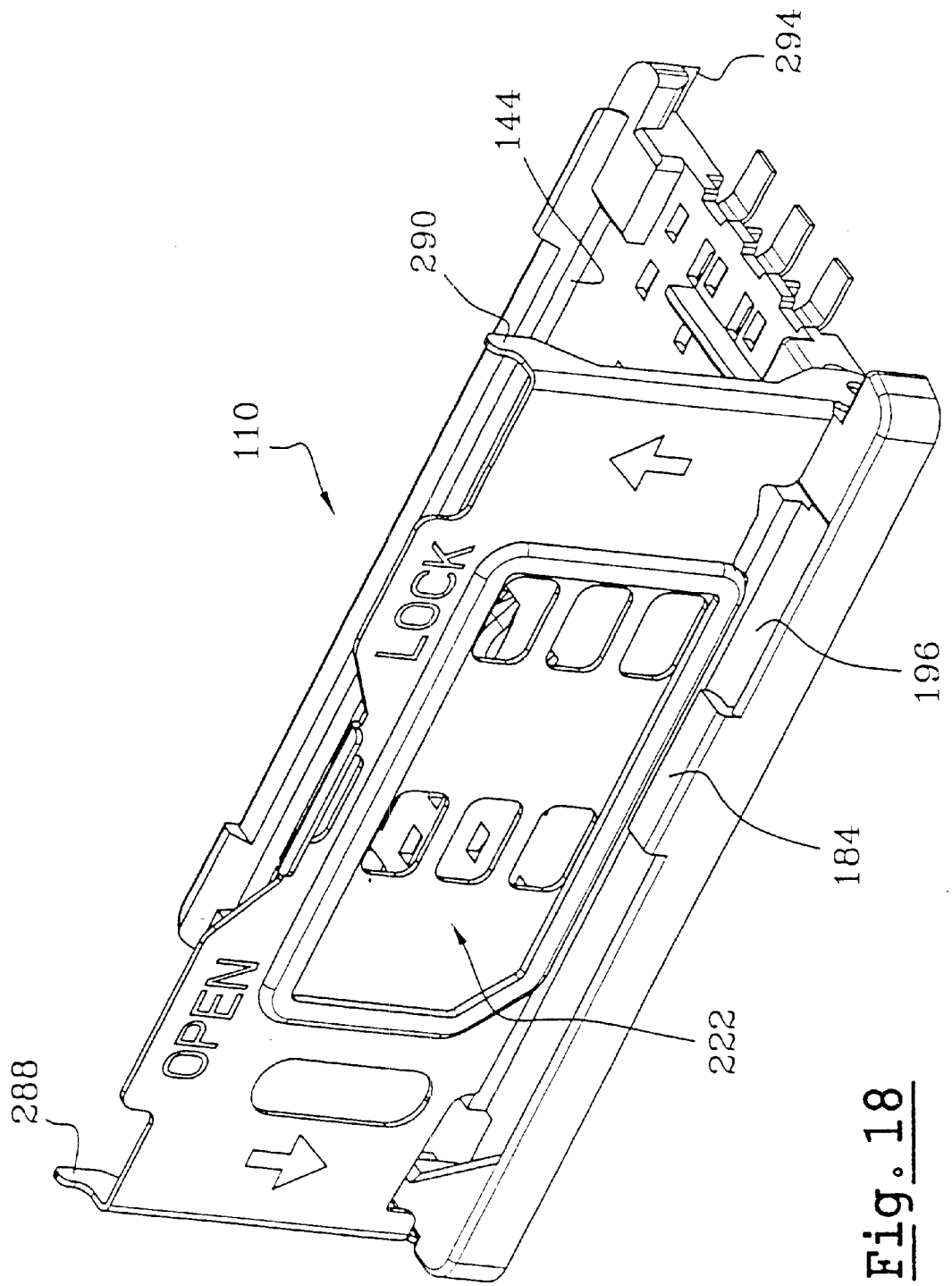
Figure 28:
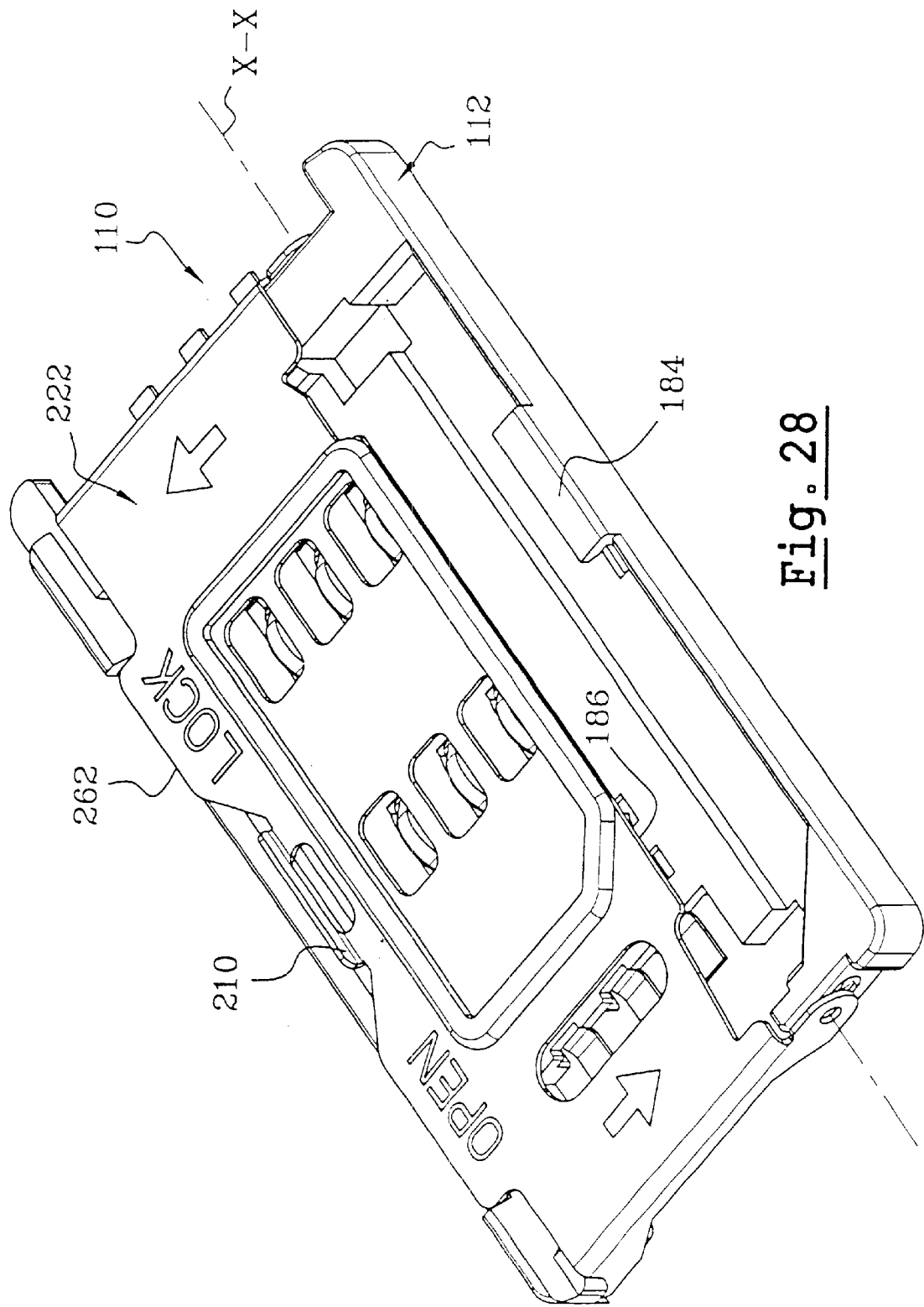
Figure 29:
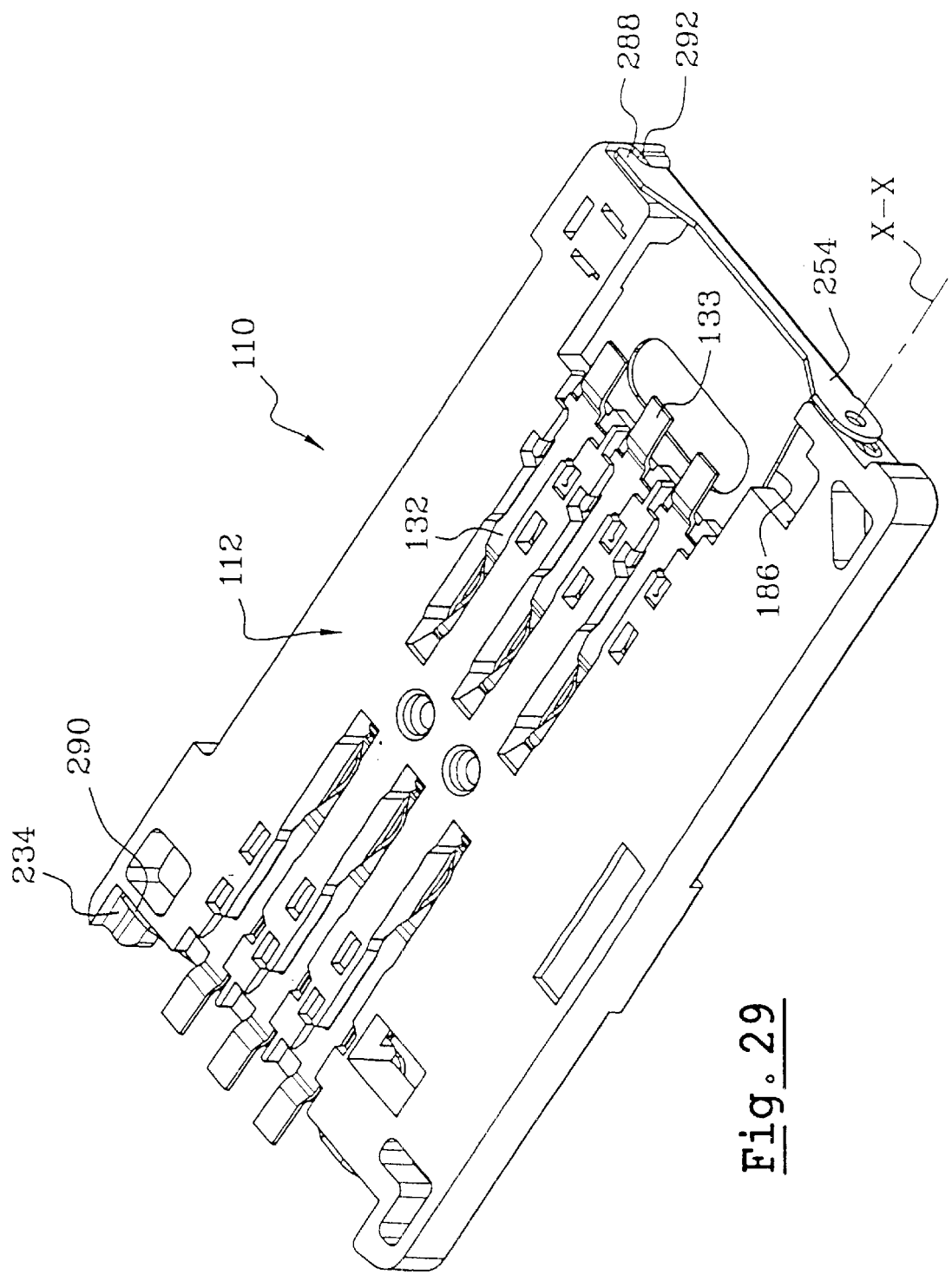
Figure 30:
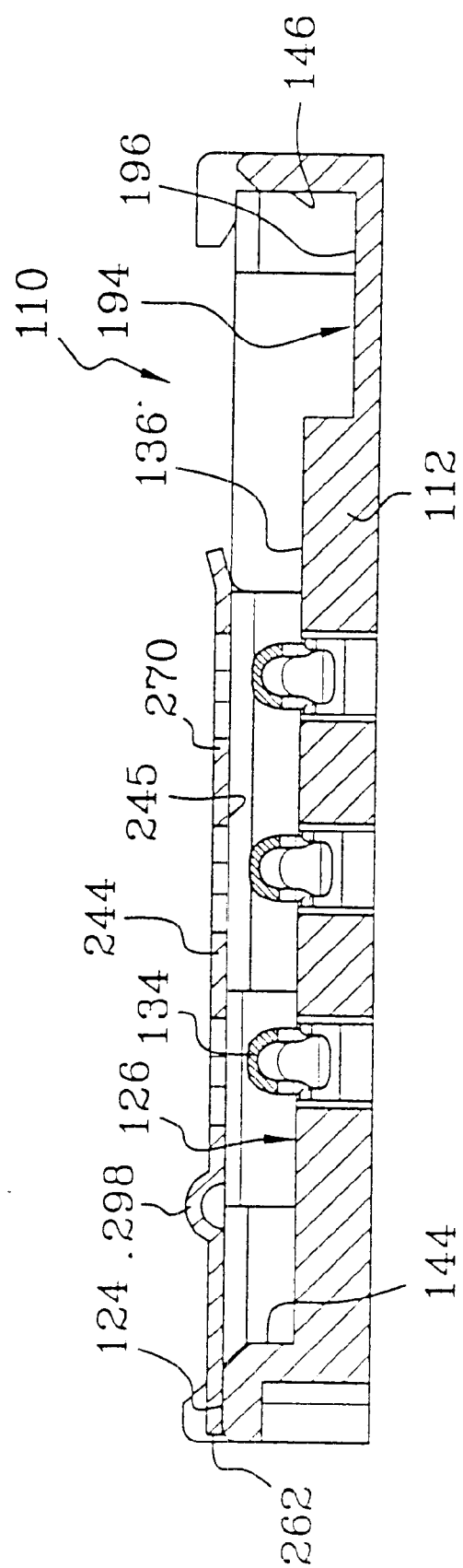
Figure 31:
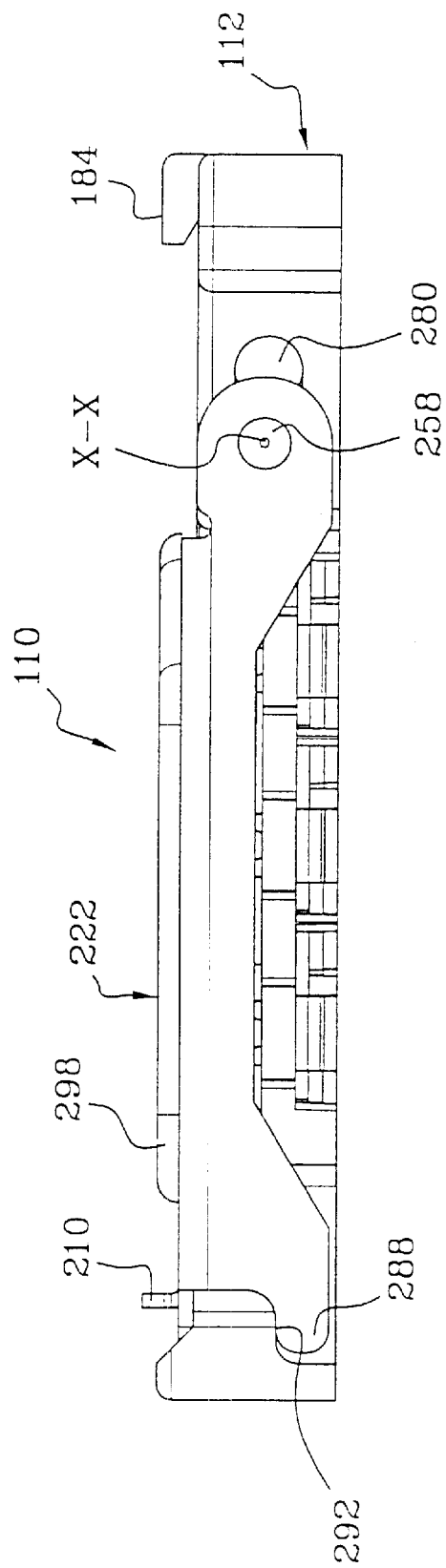
Figure 32:
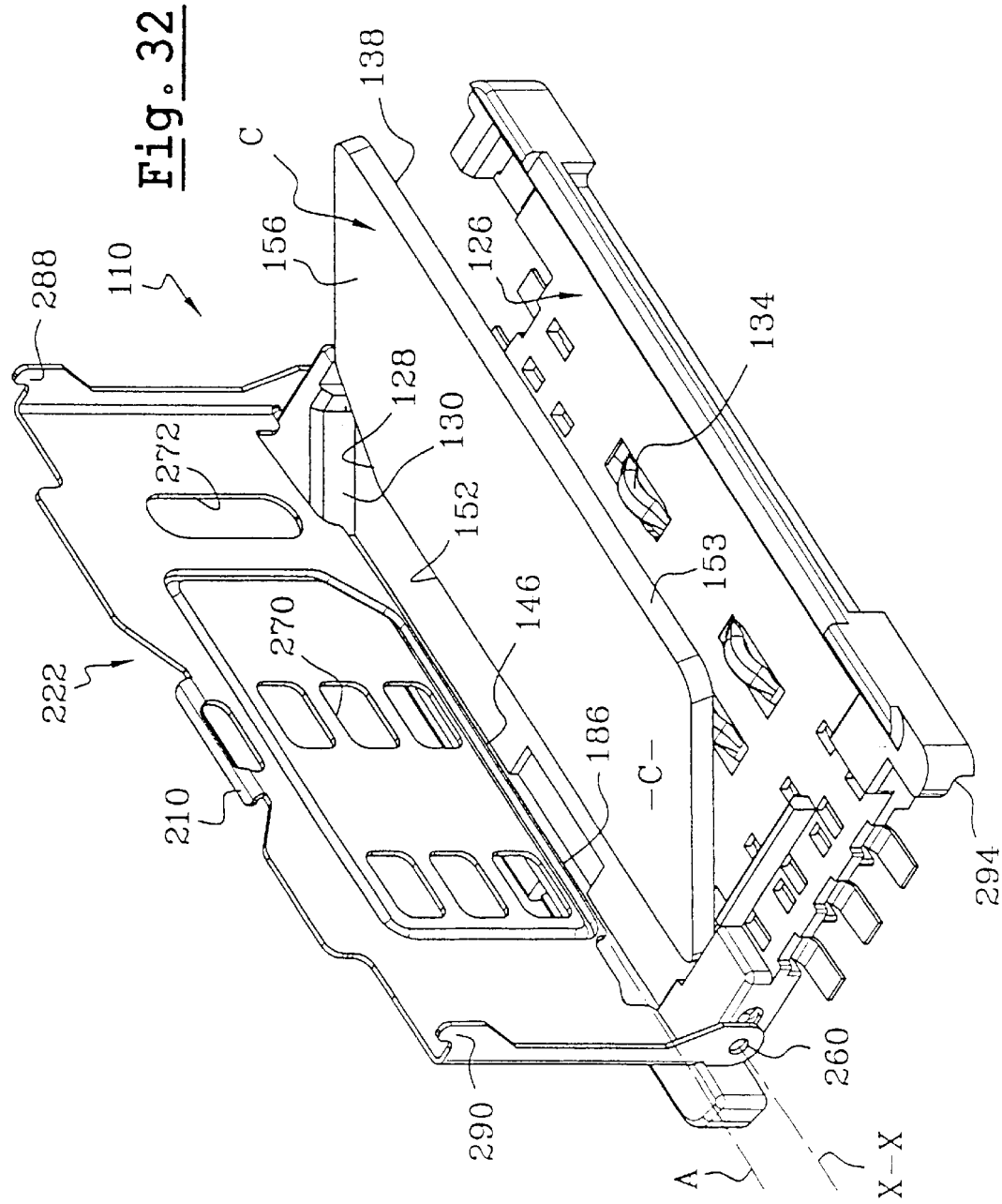
Figure 33:
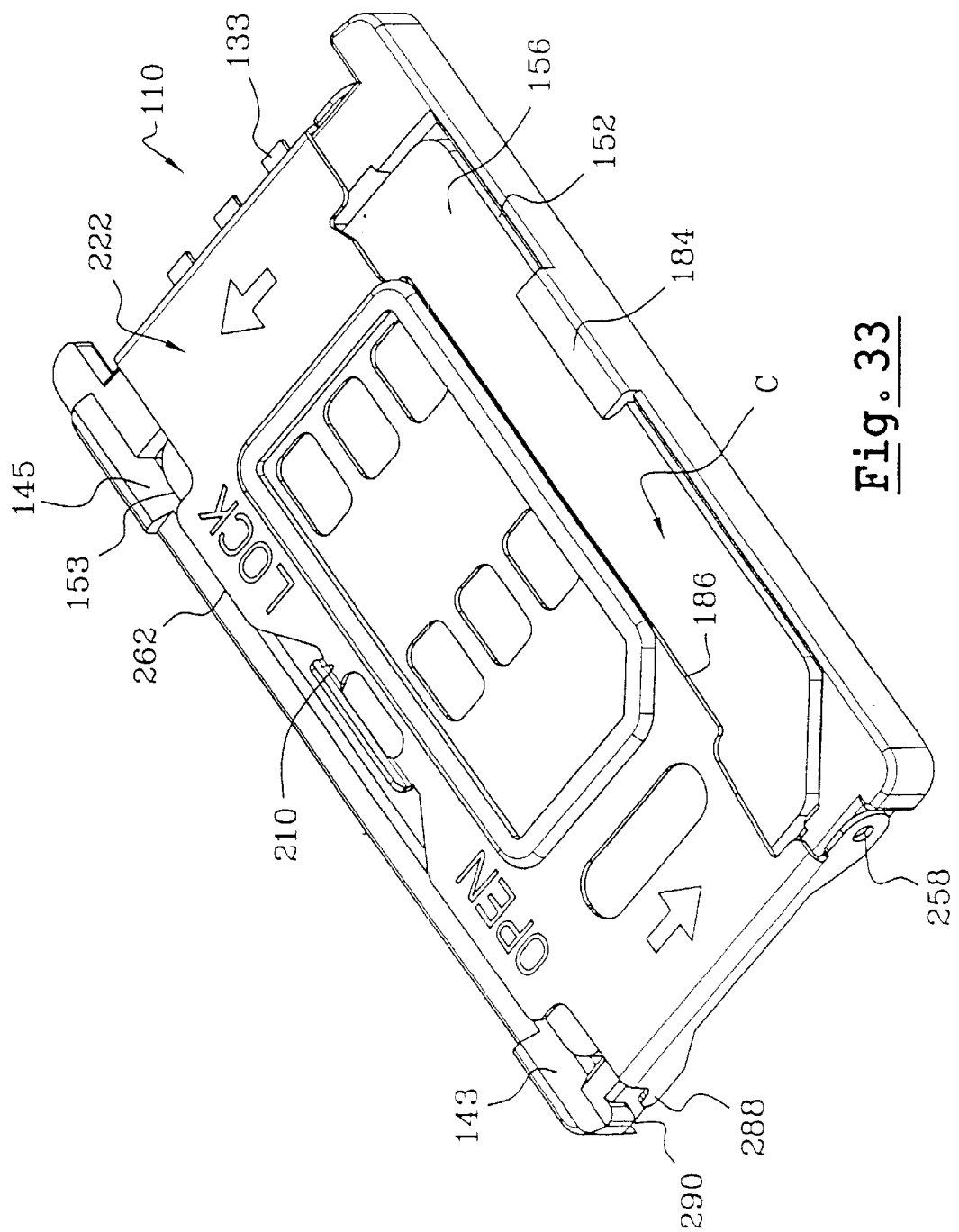
Figure 34:
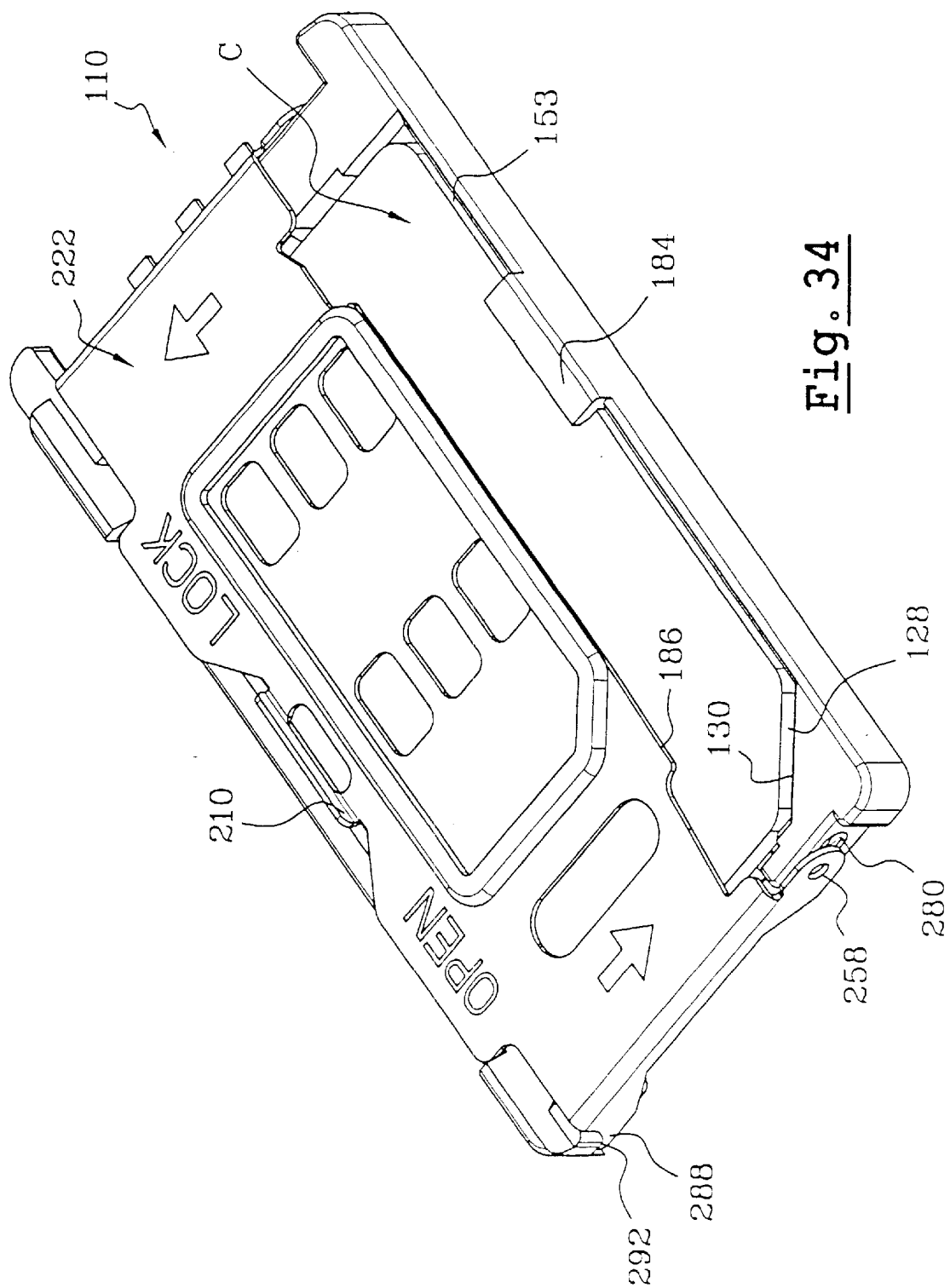
Figure 38:
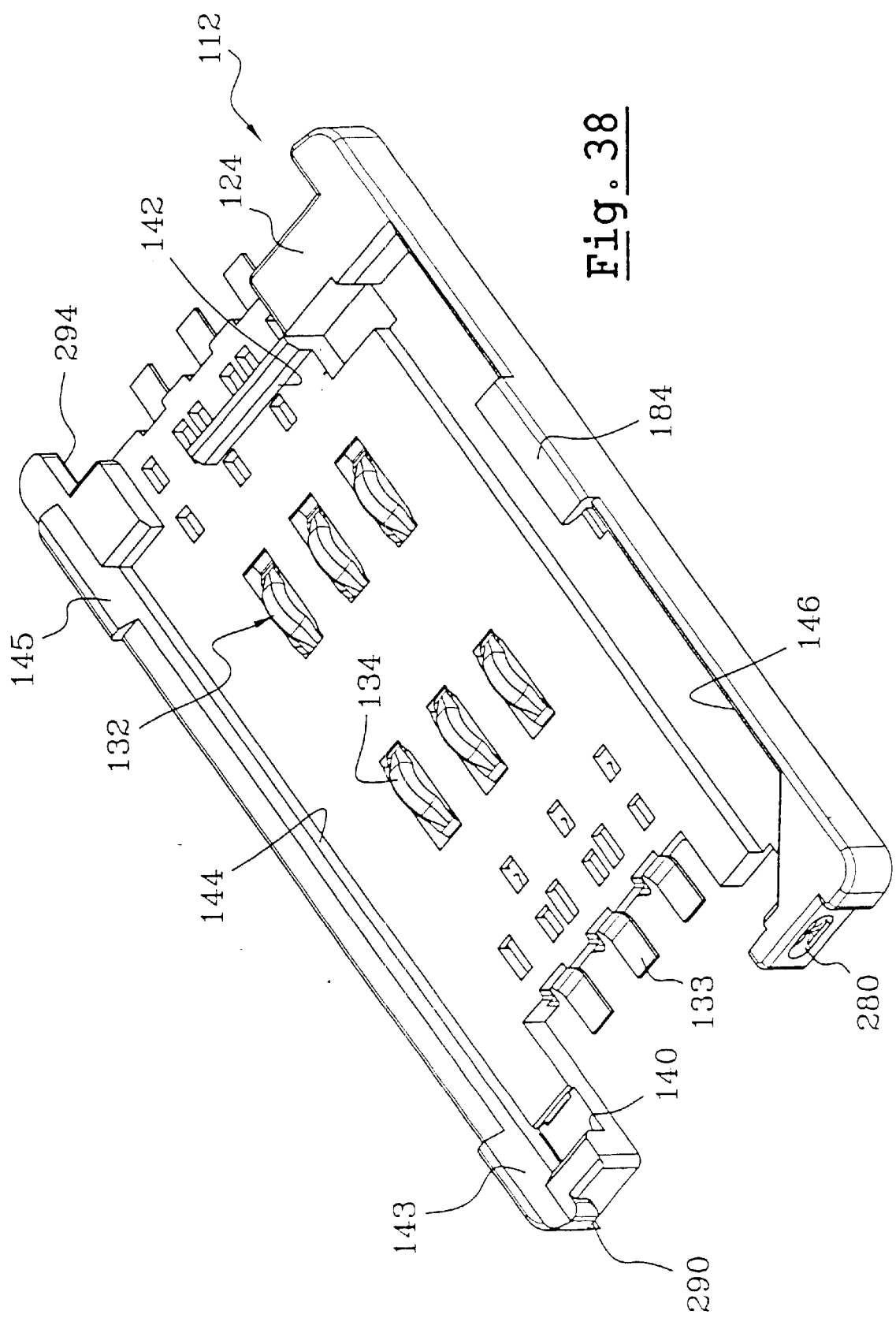
Figure 39:
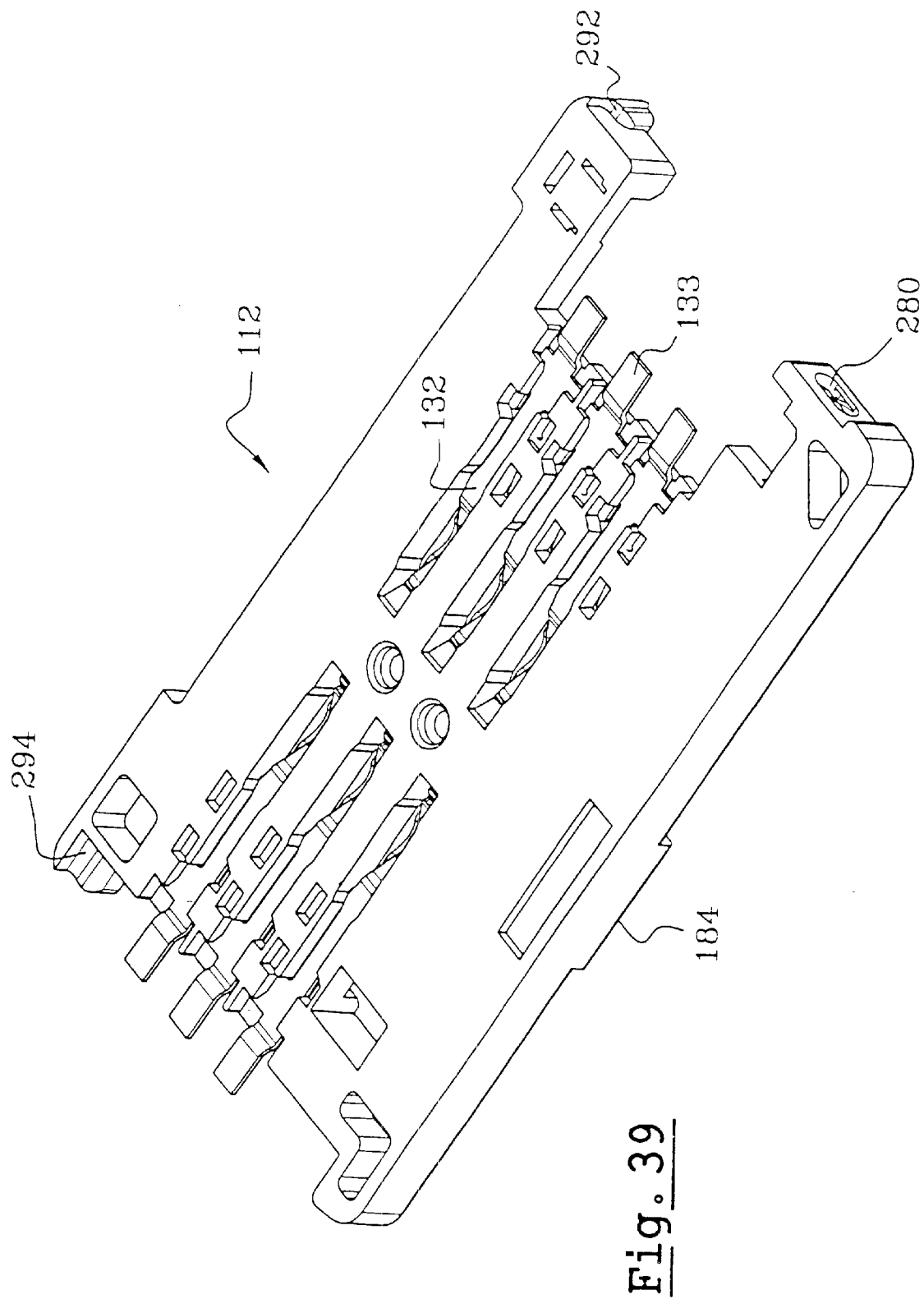

FIG. 16 is a top isometric view of a fourth embodiment of a connector according to the invention, which has a flap, or cover that is hinged and slideable, and which is shown in the open vertical position;

FIG. 17 is a top front isometric view of the connector illustrated in FIG. 16;

FIG. 18 is a top rear isometric view of the connector illustrated in FIG. 16;

FIG. 19 is a view on a larger scale and in cross section taken on line 19—19 of FIG. 20;

FIG. 20 is a top view of the connector illustrated in FIGS. 16 to 18;

FIG. 21 is a side view looking along the arrow F21 shown in FIG. 20;

FIG. 22 is a side view looking along the arrow F22 shown in FIG. 20;

FIG. 23 is a top isometric view, in which the cover is shown in the closed horizontal position, but is not locked;

FIG. 24 is a bottom isometric view;

FIGS. 25 to 27 are views similar to those in FIGS. 20 to 22, which show the connector in its state illustrated in FIG. 23;

FIG. 28 is a view similar to that in FIG. 23, in which the flap, or cover is shown in the closed position and is locked;

FIG. 29 is a view similar to that in FIG. 24, which illustrates the connector in its state shown in FIG. 28;

FIG. 30 is a view similar to that in FIG. 19, which illustrates the connector in its state shown in FIG. 28;

FIG. 31 is a longitudinal end view of the connector illustrated in FIG. 19;

FIG. 32 is a view similar to that in FIG. 17, showing a card in the process of being put into position in its cavity;

FIG. 33 is a view similar to that in FIG. 23, with a card in the installed position;

FIG. 34 is a view similar to that in FIG. 33, in which the cover is in the closed position and is locked;

FIGS. 35 to 37 are views similar to those in FIGS. 25 to 27 and illustrate the connector in its state shown in FIG. 34;

FIGS. 38 and 39 are views similar to those in FIGS. 23 and 24. in which the connector is shown without its metal card-retaining cover;

Fifth Embodiment

Figures 40, 41:
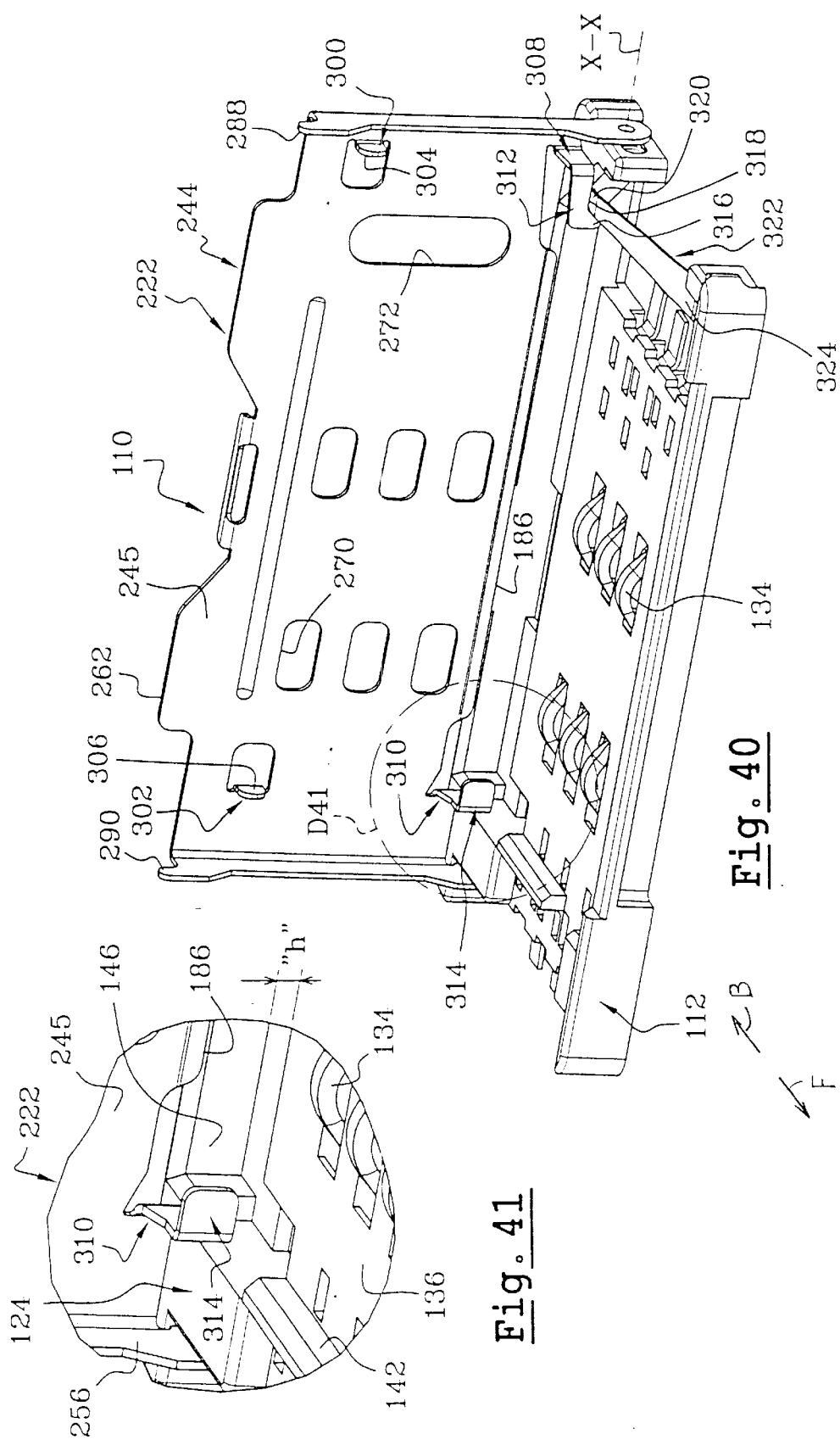
Figure 42:
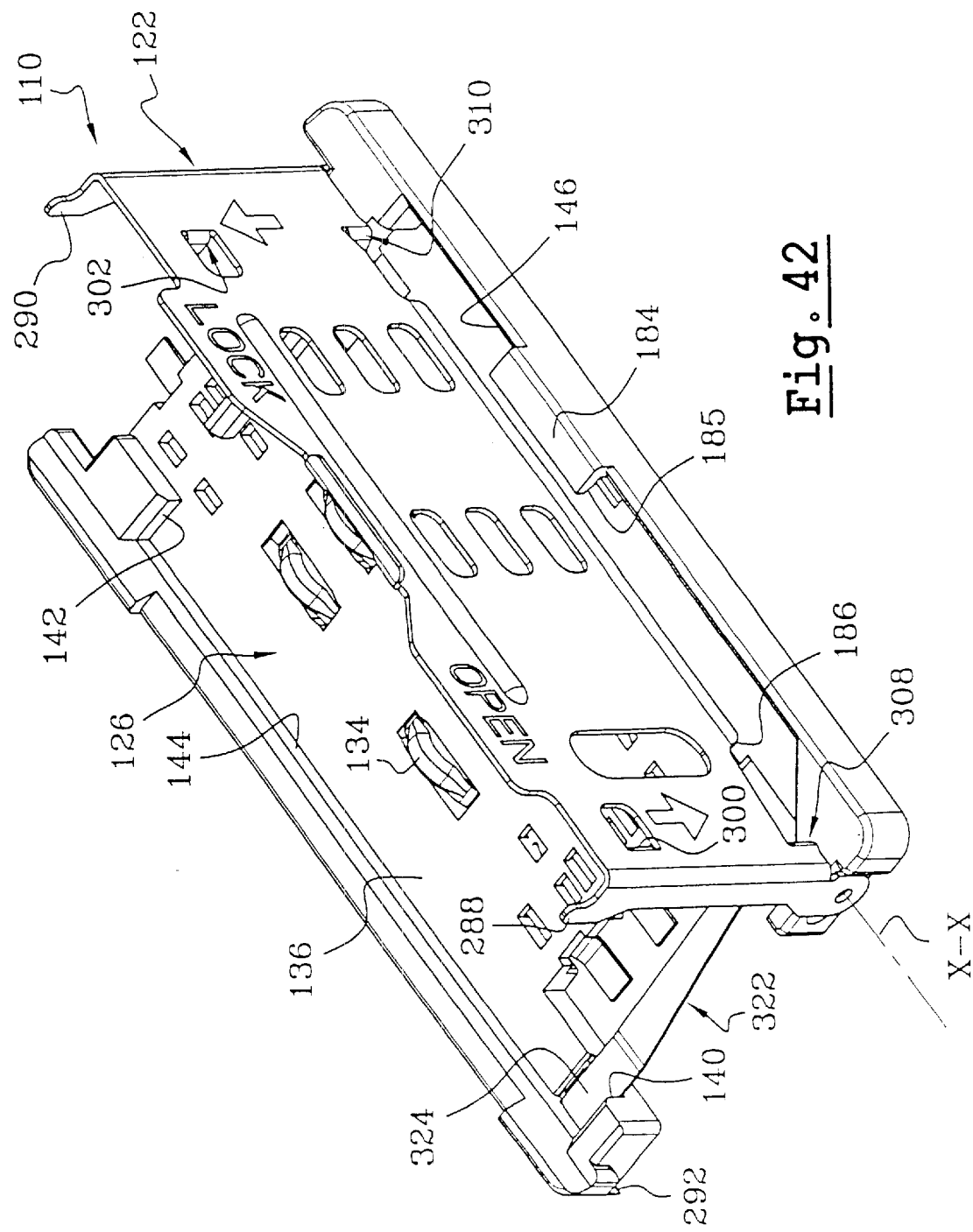
Figure 43:
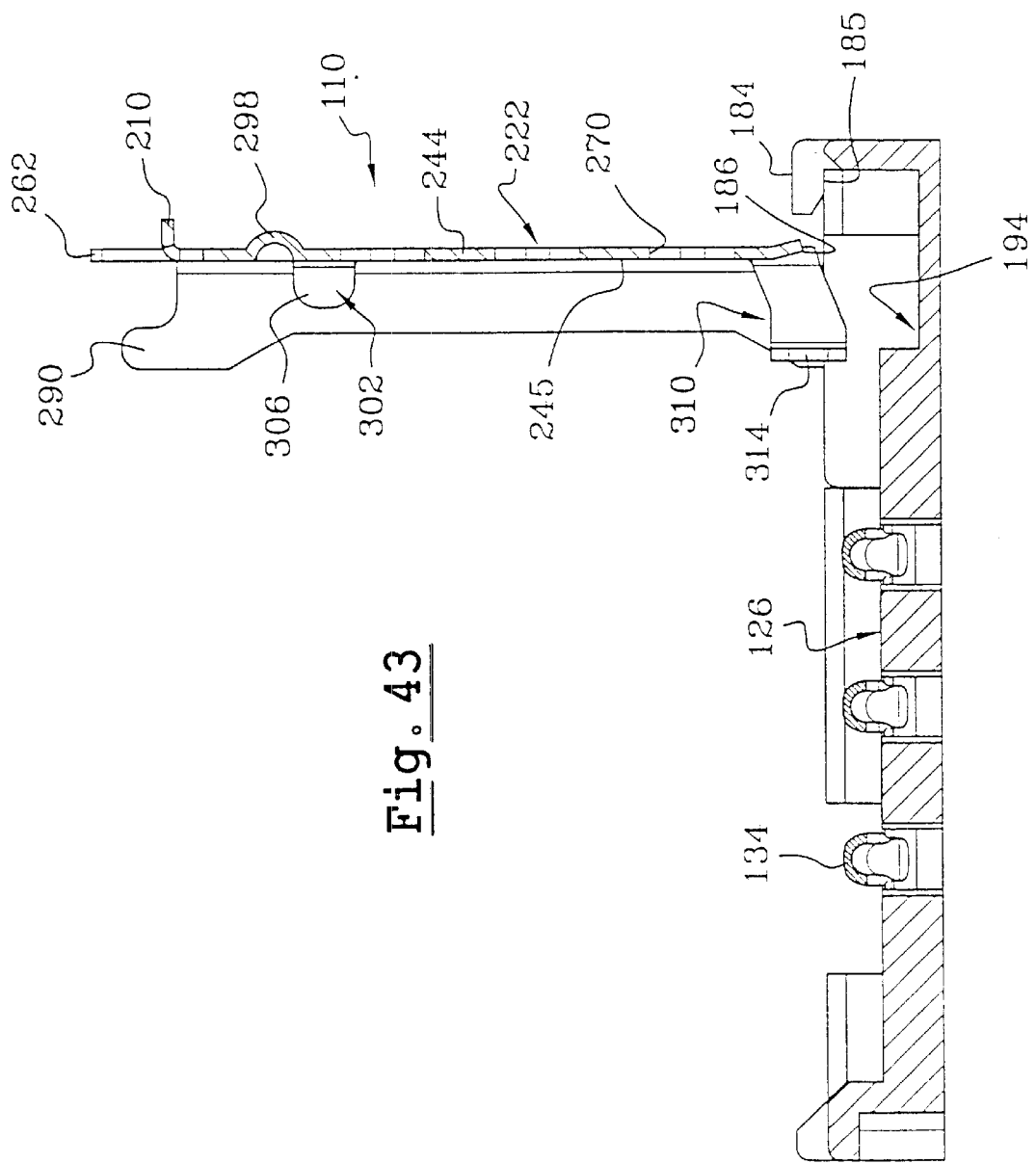
Figure 45:
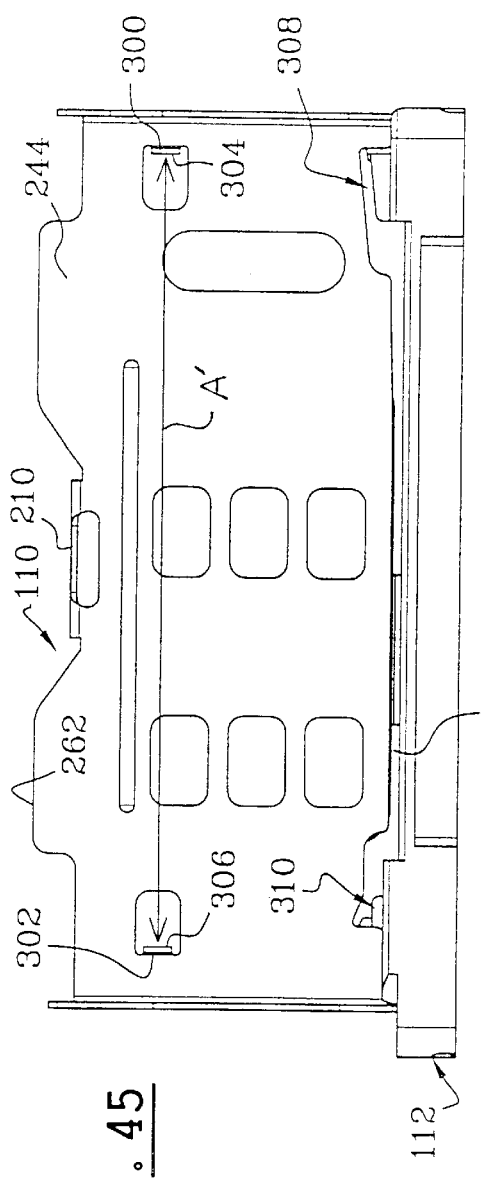
Figure 44:
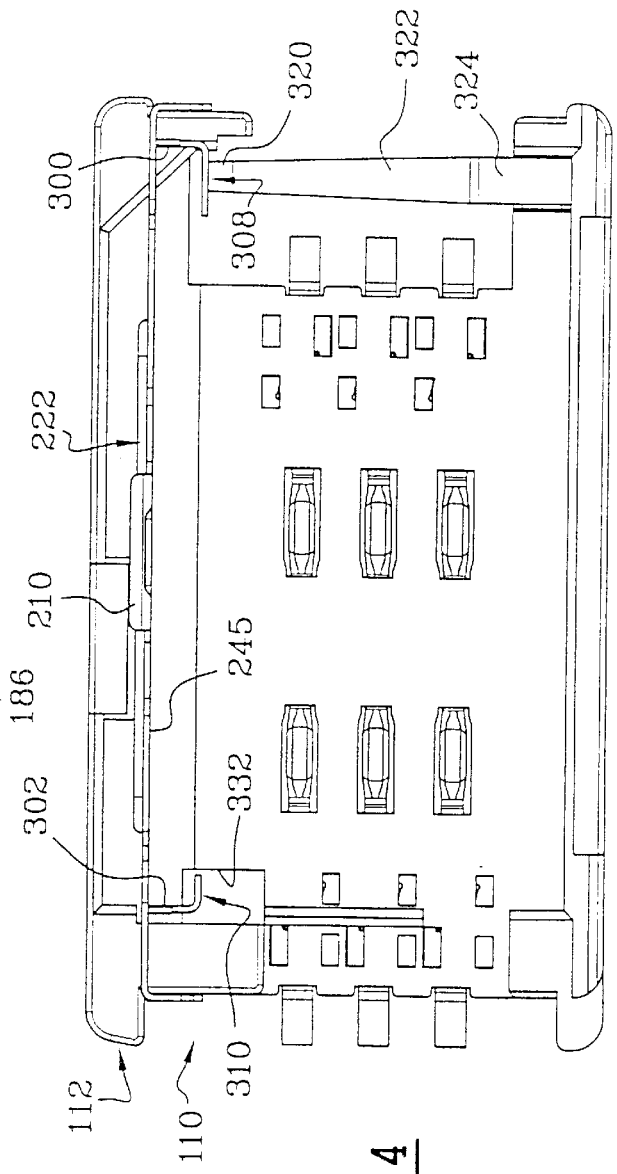
Figure 52:
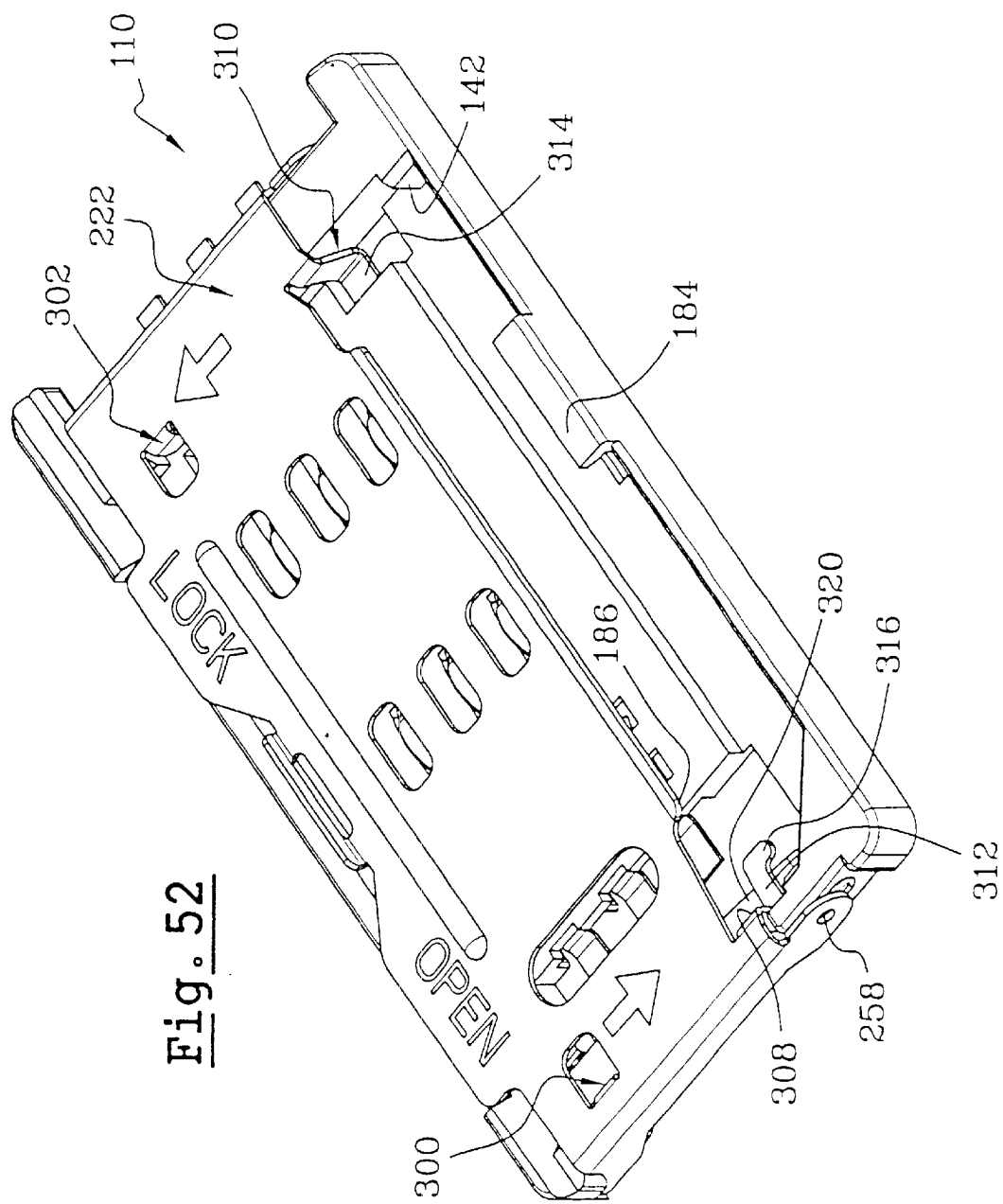
Figure 53:
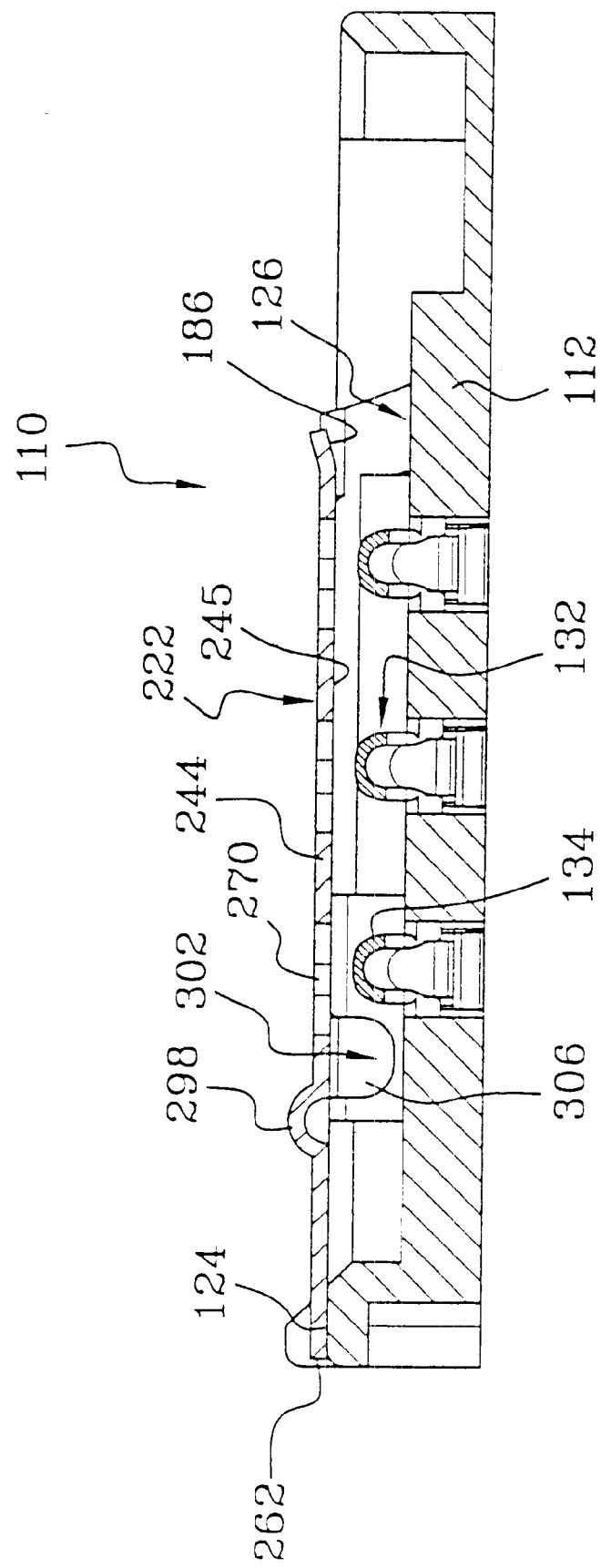
Figure 54:
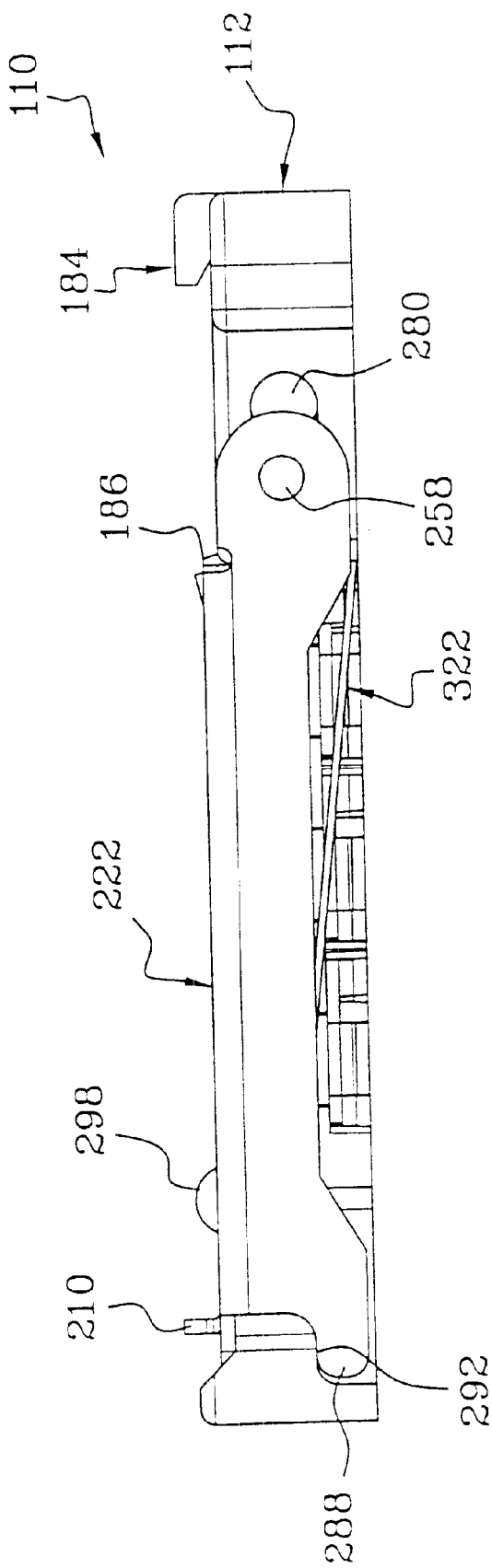
Figure 56:
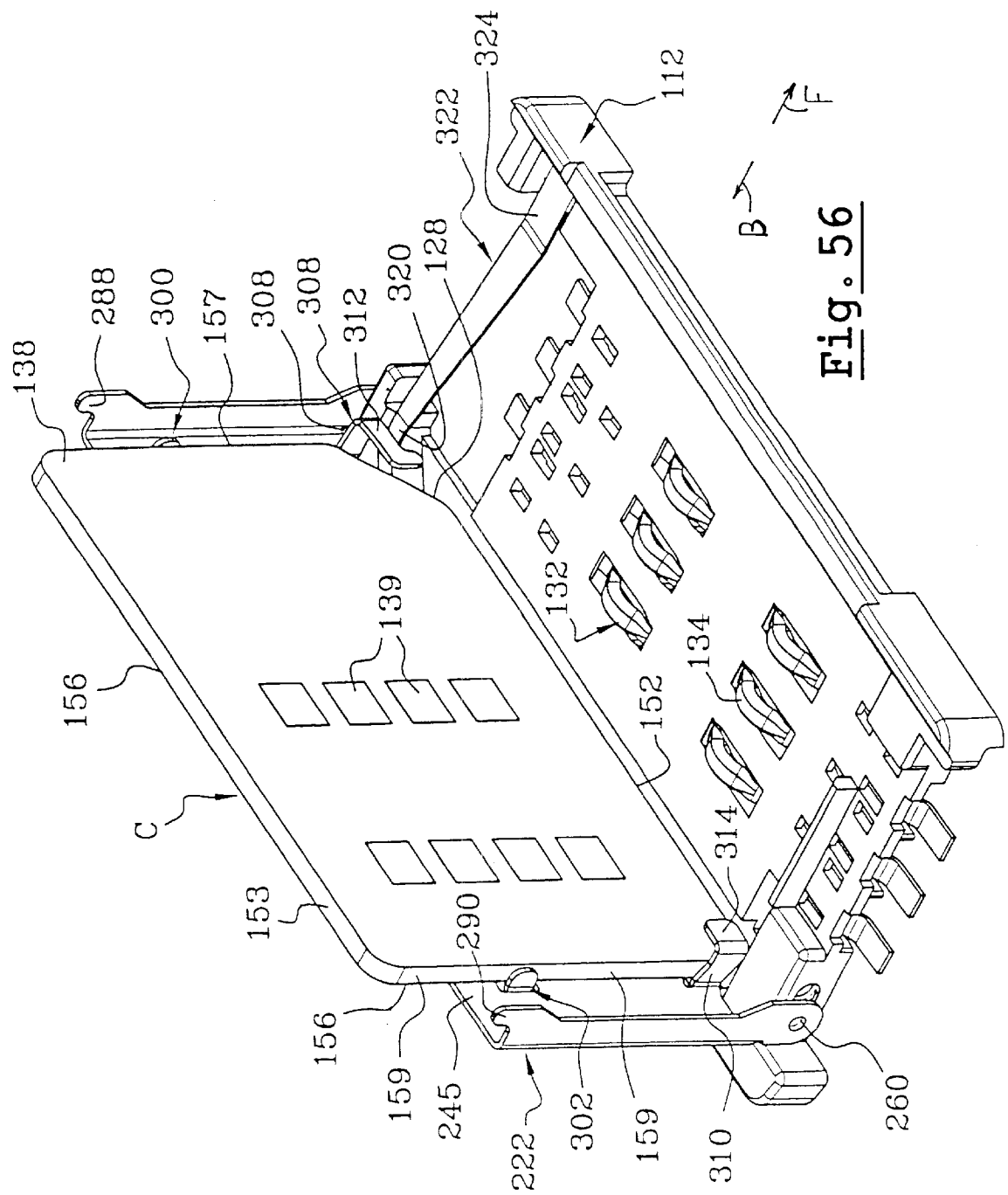
Figure 59:
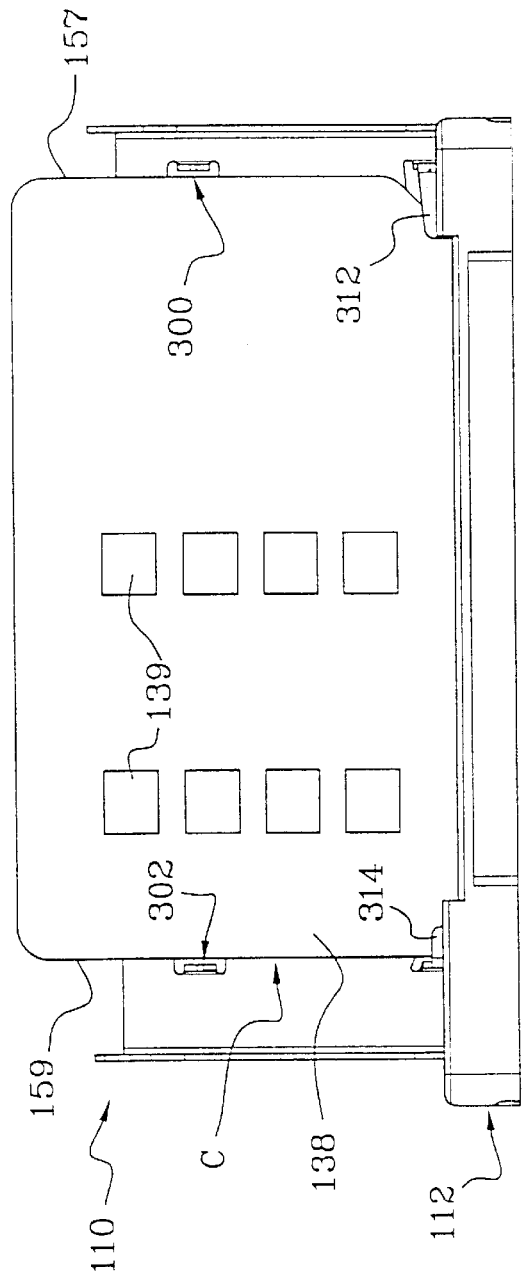
Figure 58:
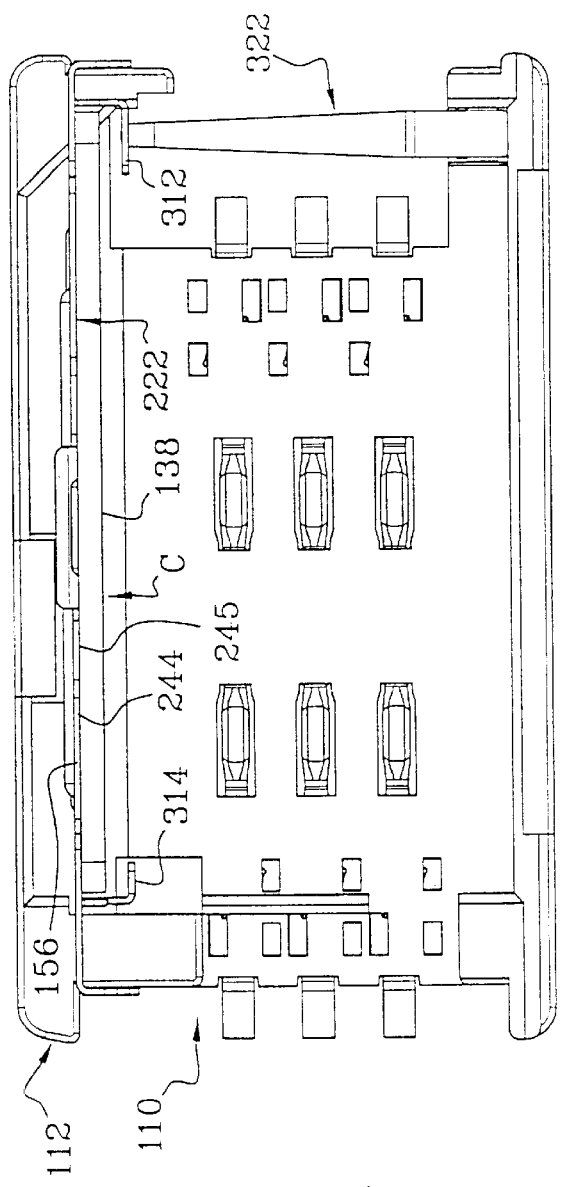
Figure 61:
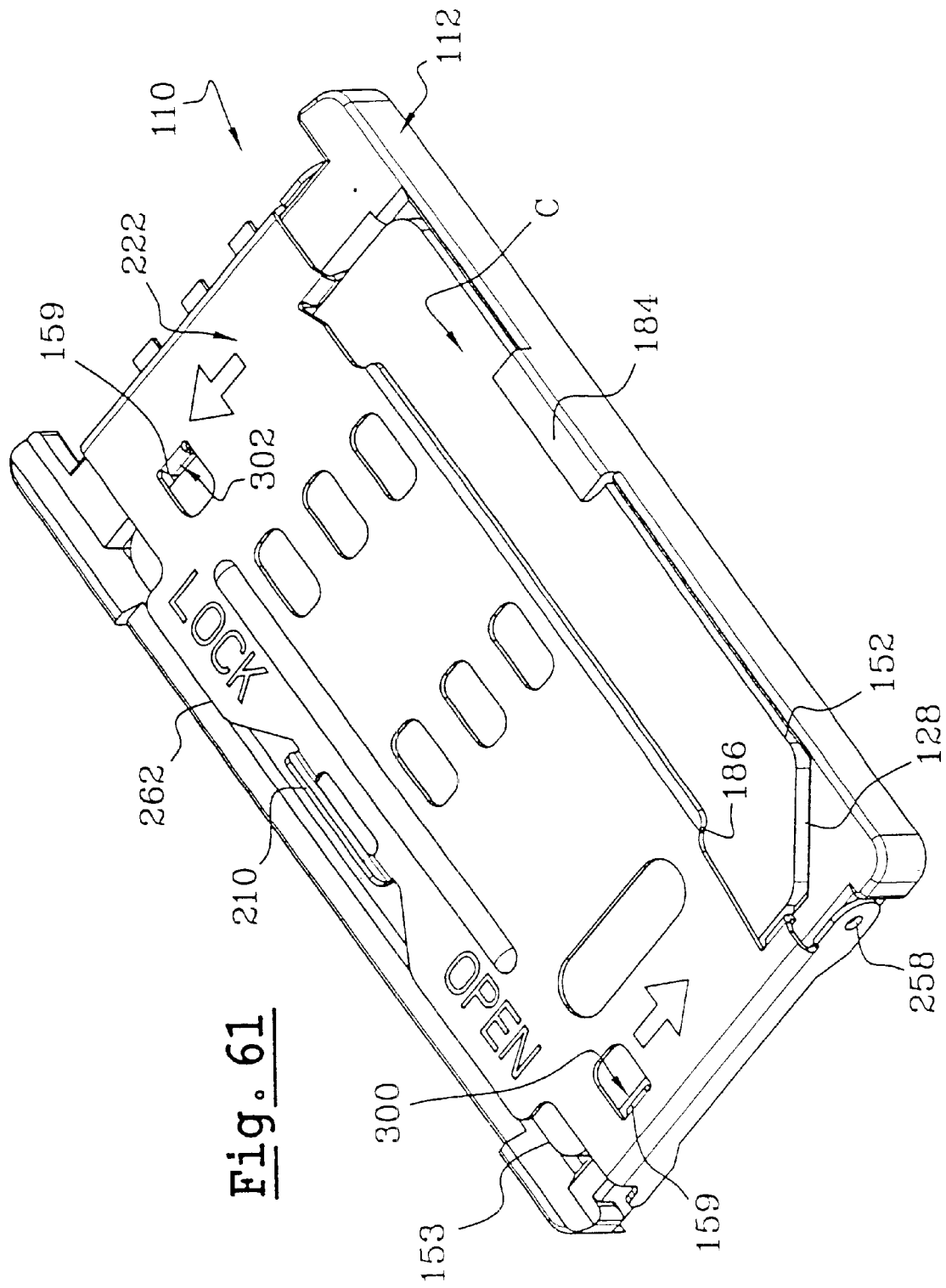
Figure 62:
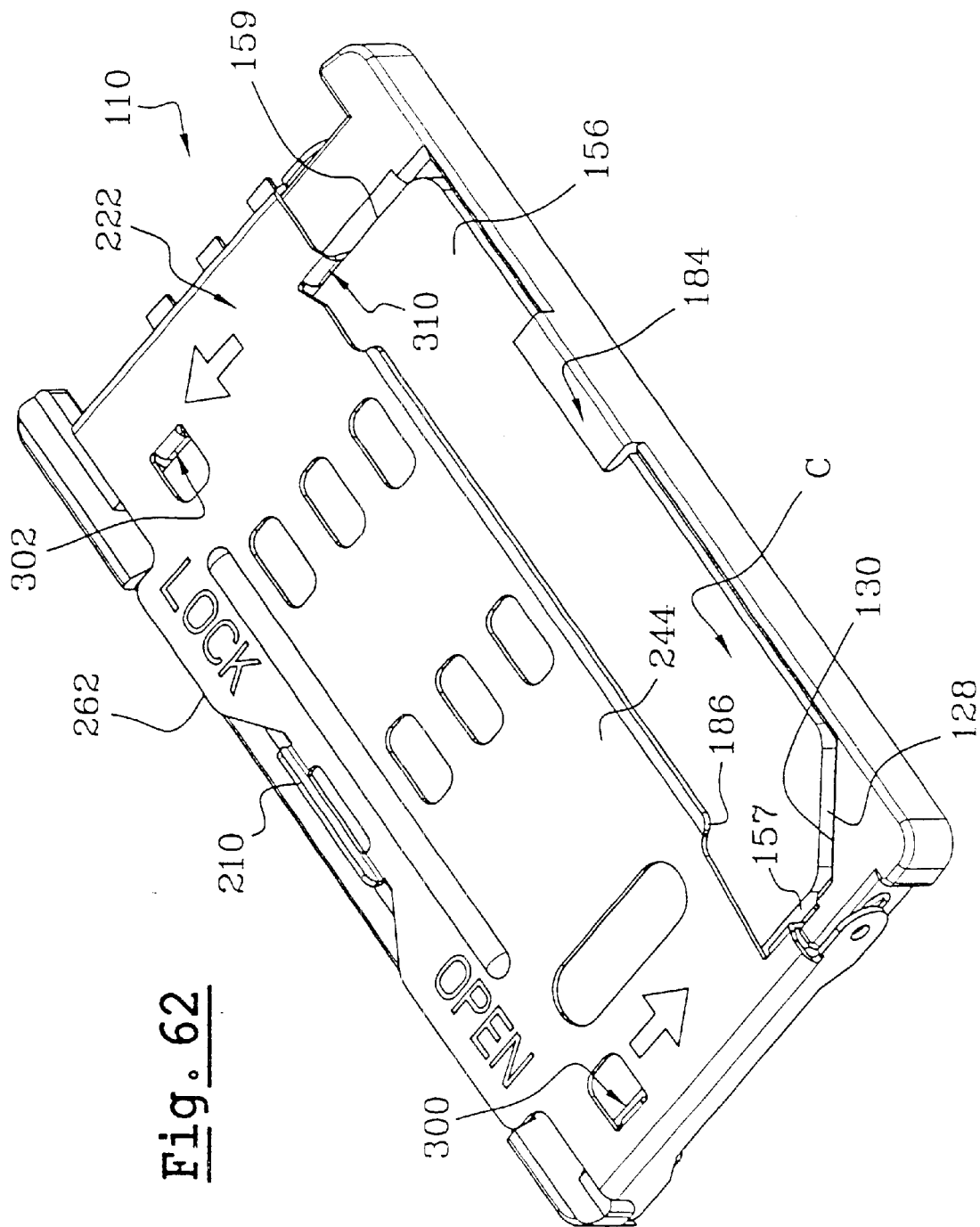
Figure 64:
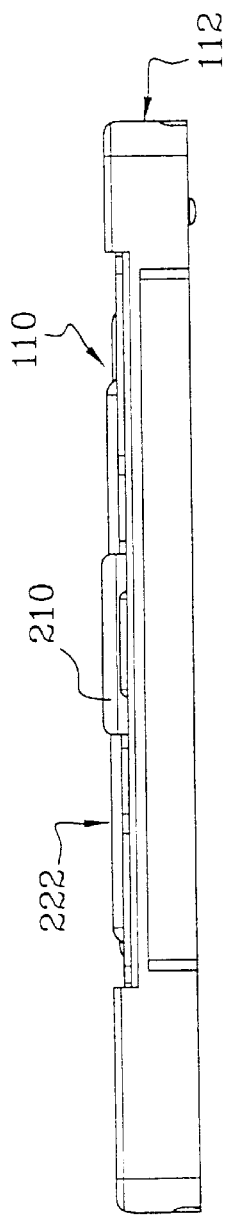
Figure 63:
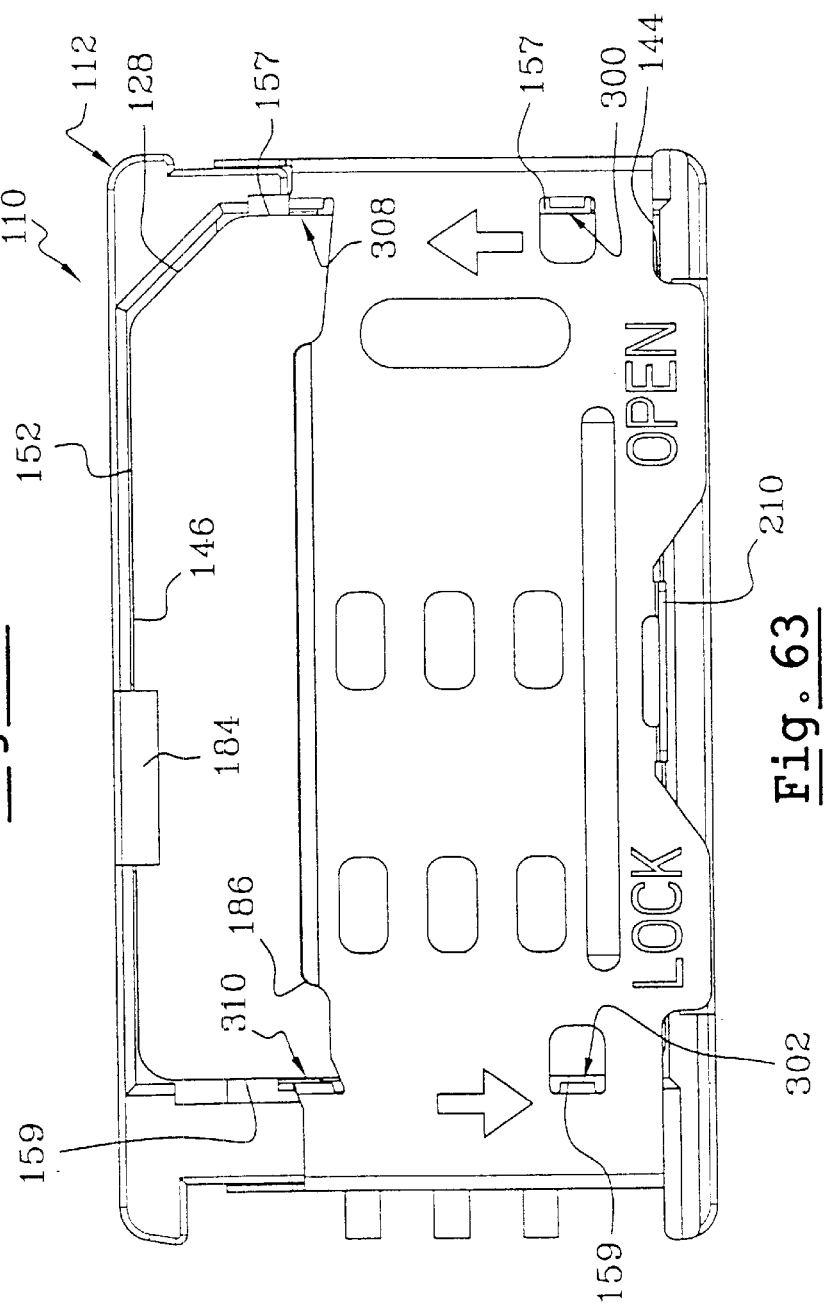
Figure 65:
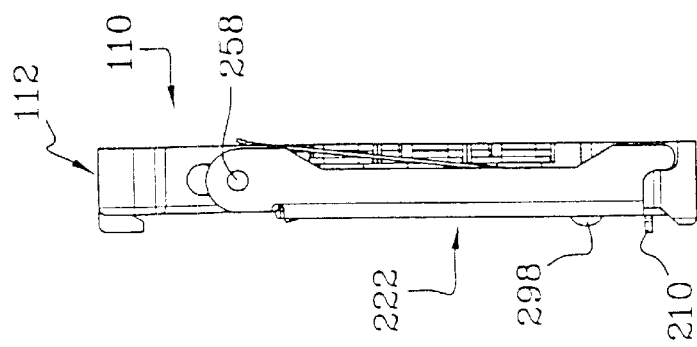
Figure 66:
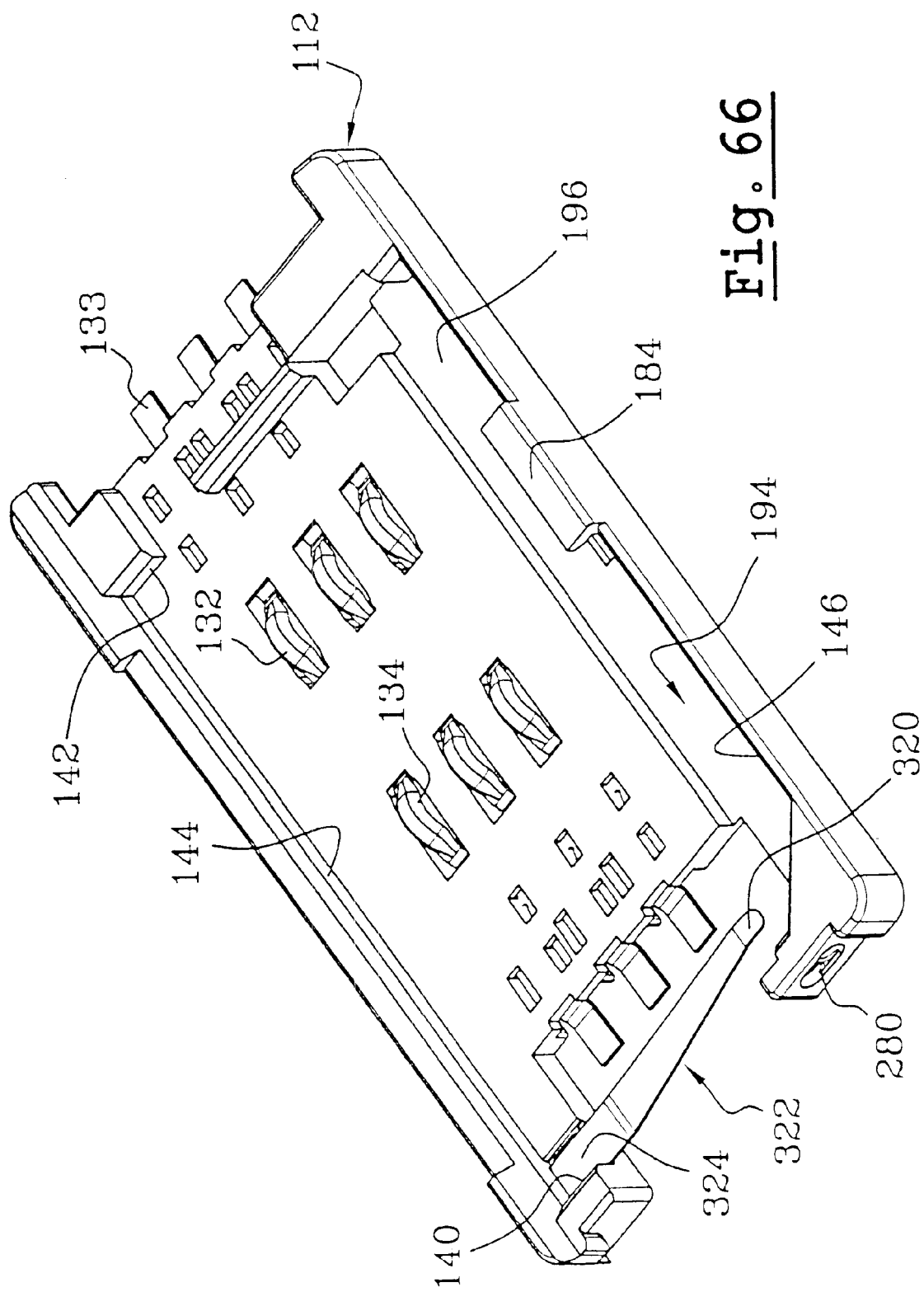
Figure 67:
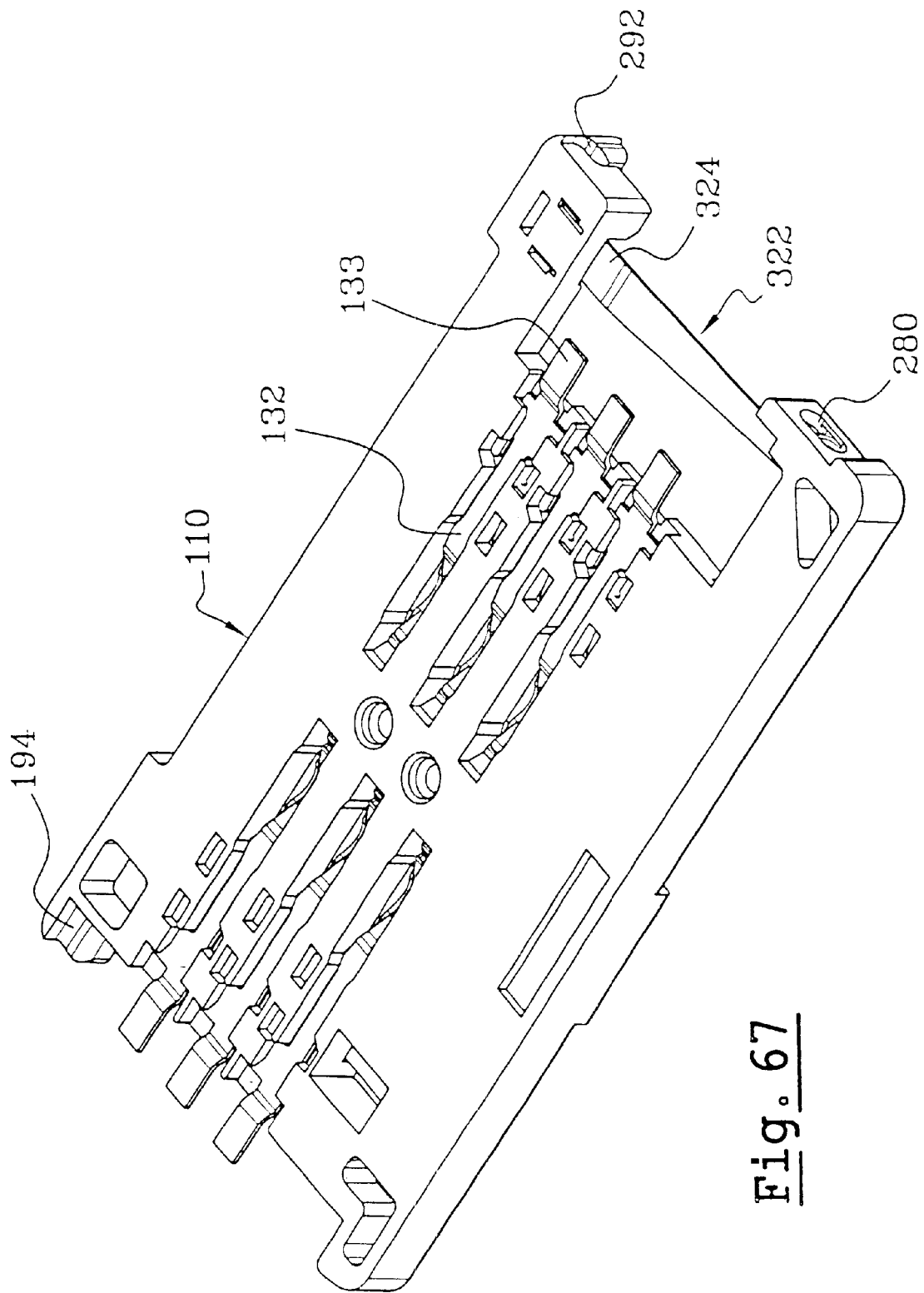
Figure 68:
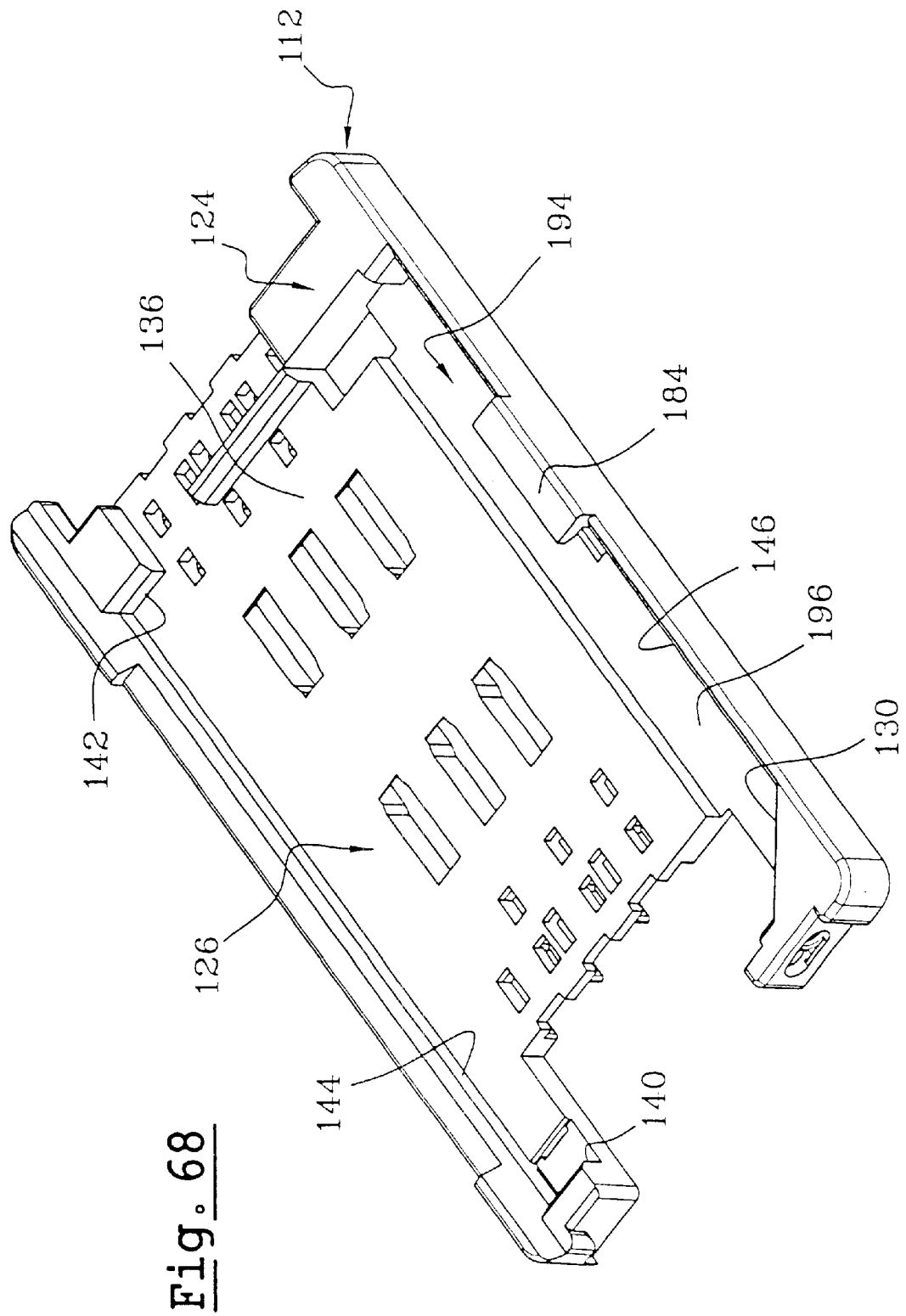
Figure 69:
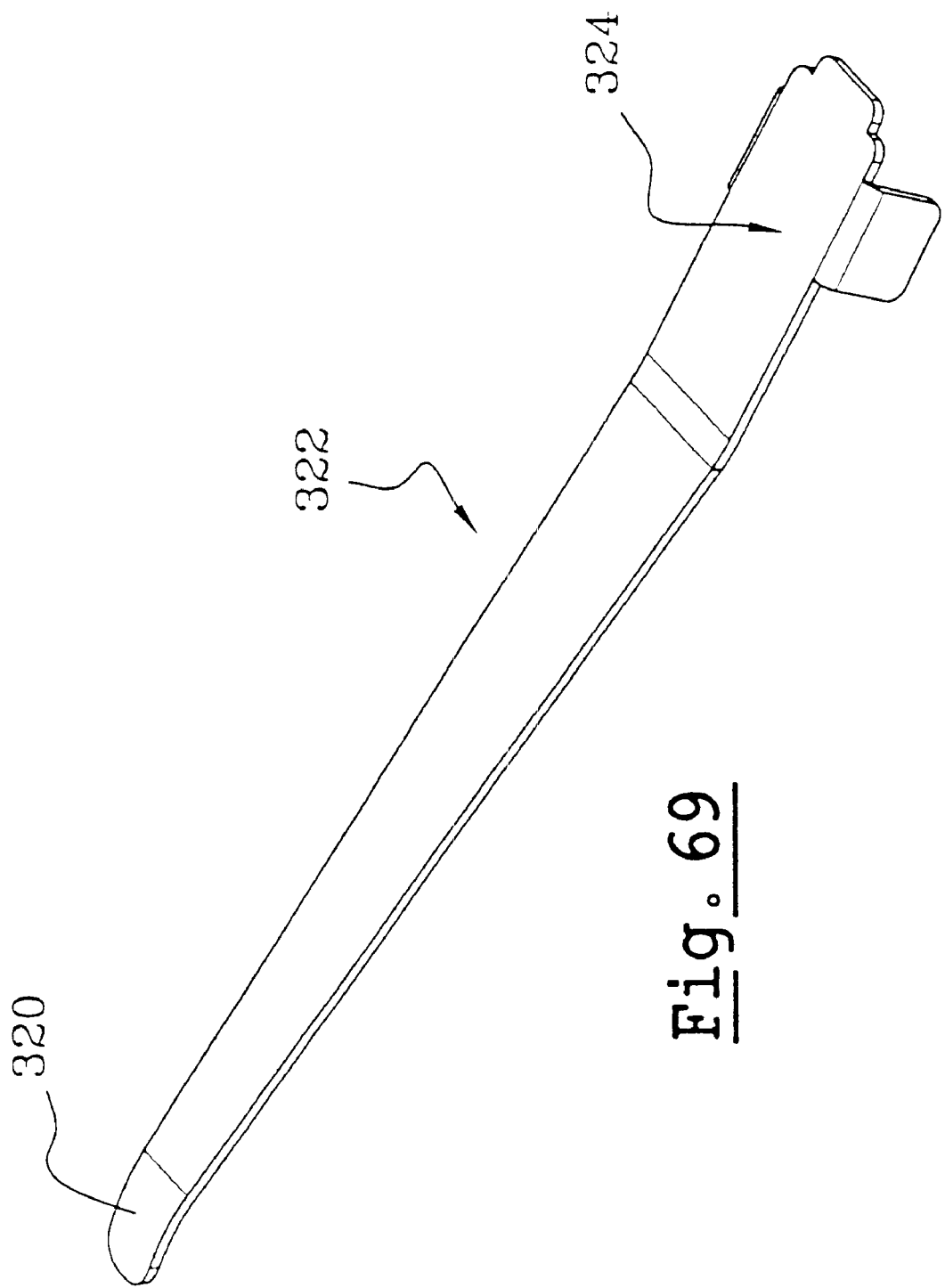
Figure 70:
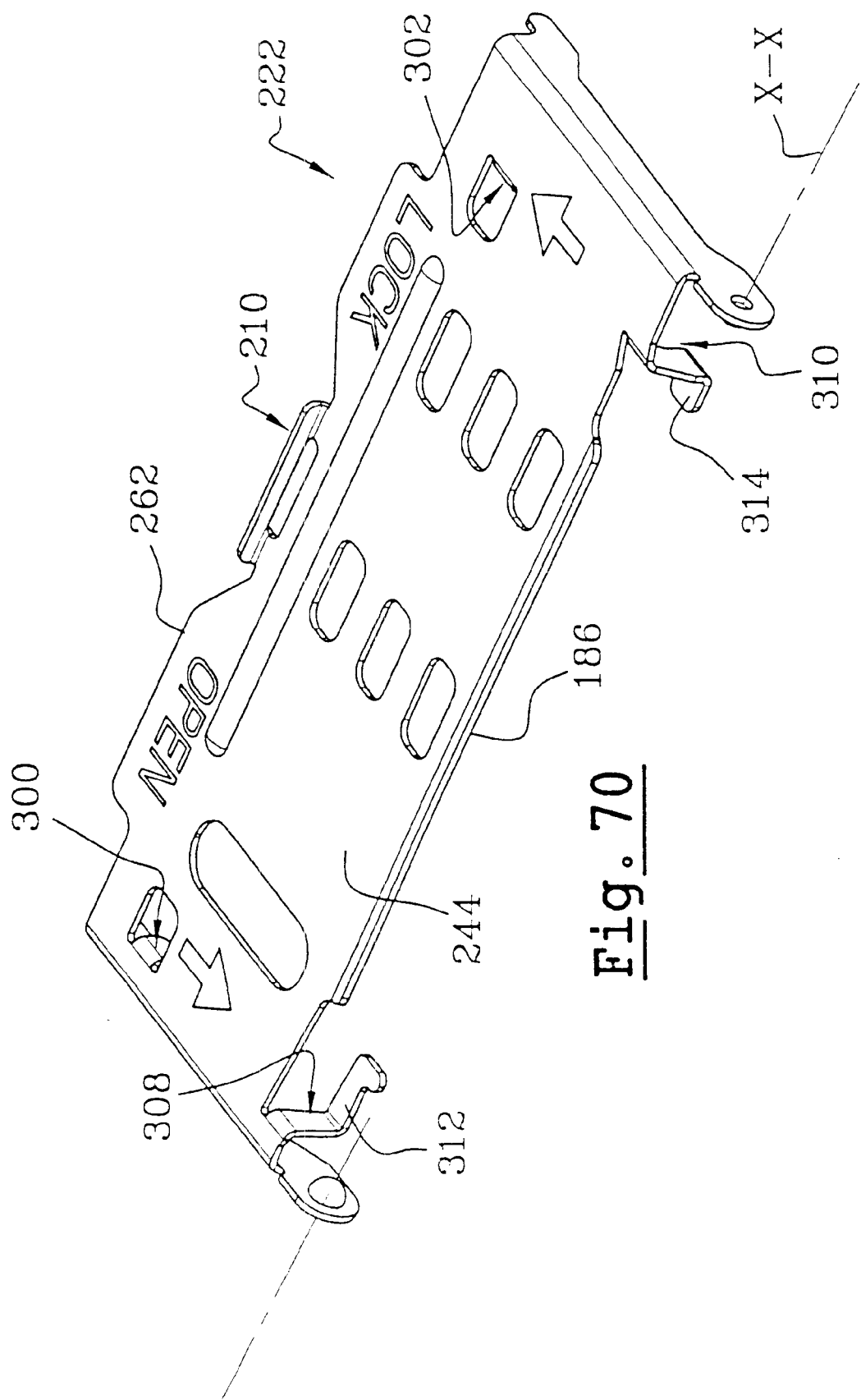
Figure 71:
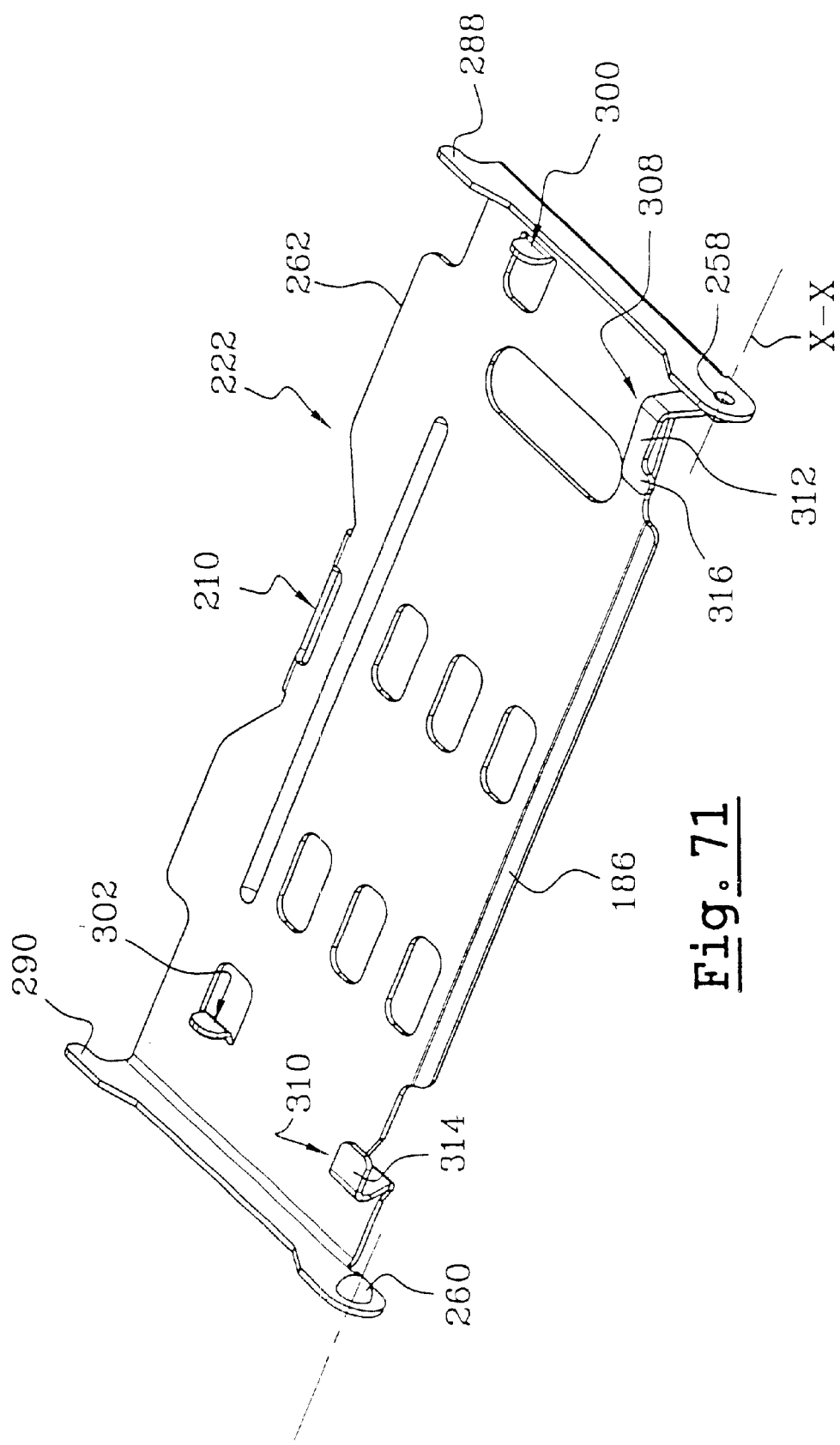

FIG. 40 is a view similar to that in FIG. 16, which illustrates a fifth embodiment of a connector according to the invention, which has a flap, or cover that is hinged and slideable and which includes spring means for automatically opening the flap;

FIG. 41 is a view on a larger scale of detail D41 shown in FIG. 40;

FIGS. 42 and 43, 44 to 45, 47 and 48, 49 to 51, 52, 53, 54, and 55 are views similar to those in FIGS. 18 and 19, 20 to 22, 23 and 24, 25 to 27, 28, 30, 31 and 29, respectively which illustrate the connector according to the fifth embodiment;

FIG. 56 is an isometric view similar to that in FIG. 40, in which the card is vertically inserted into the flap, which is held in the vertical open position by a return spring;

FIG. 57 is an isometric view similar to that in FIG. 56;

FIGS. 58 to 60 are views similar to those of FIGS. 44 to 46, respectively, and in which the card and the flap are in the position illustrated in FIGS. 56 and 57;

FIG. 61 is a view similar to that in FIG. 47, with the card in the fully inserted position;

FIG. 62 is a view similar to that in FIG. 52, with the card in the fully inserted position;

FIGS. 63 to 65 are views similar to those in FIGS. 58 to 60, respectively, with the flap in the closed horizontal position;

FIG. 66 is a view similar to that in FIGS. 42 and 47 in which the connector is shown without its hinged flap;

FIG. 67 is a bottom view of FIG. 66;

FIG. 68 is a view similar to that in FIG. 66, in which only the molded plastic insulating support element is shown;

FIG. 69 is a top perspective view on a larger scale of the return spring of the flap;

FIG. 70 is a top isometric view of just the closure flap;

FIG. 71 is a bottom isometric view of the flap shown in FIG. 70

Figure 72:
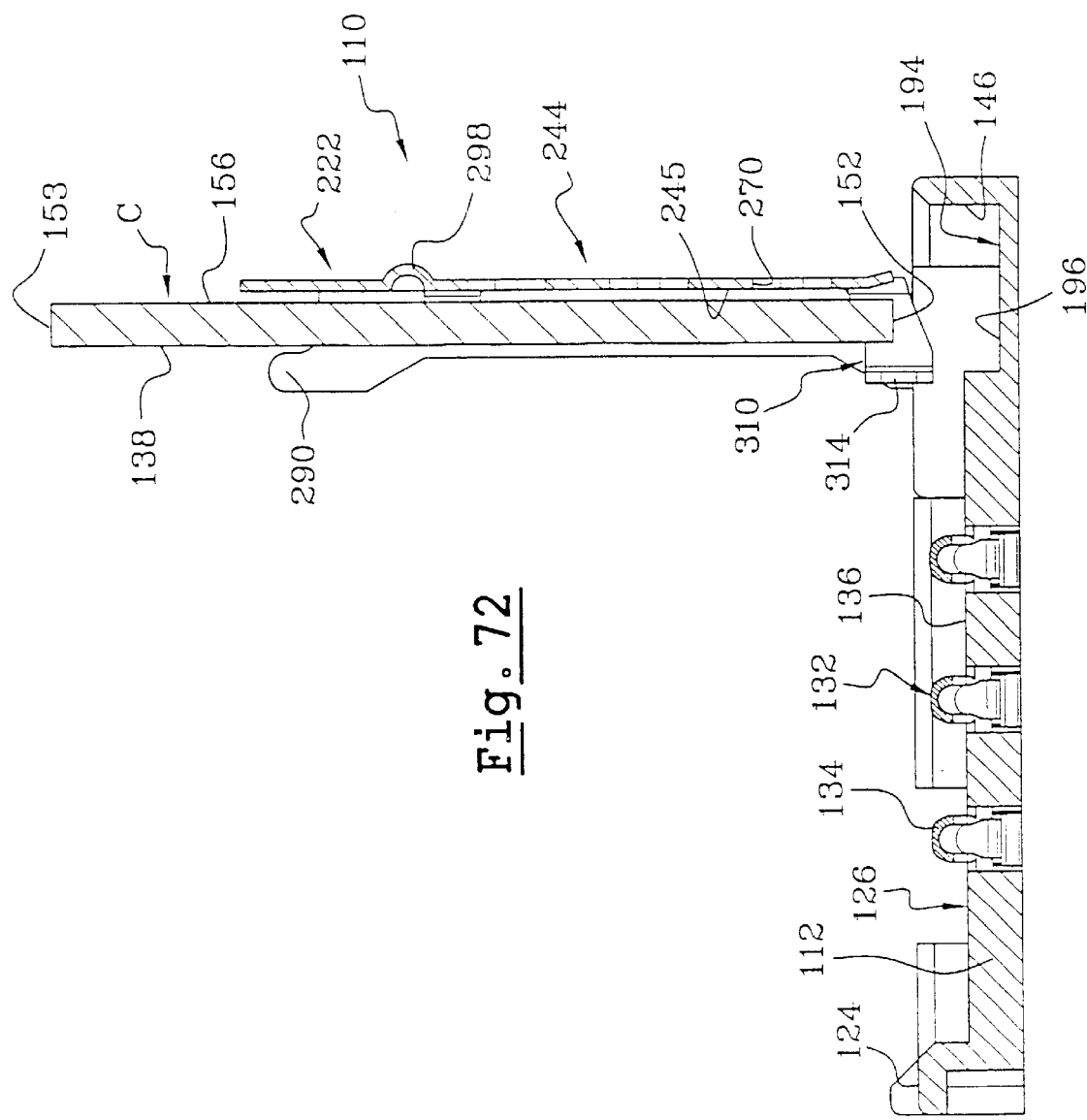
Figure 73:
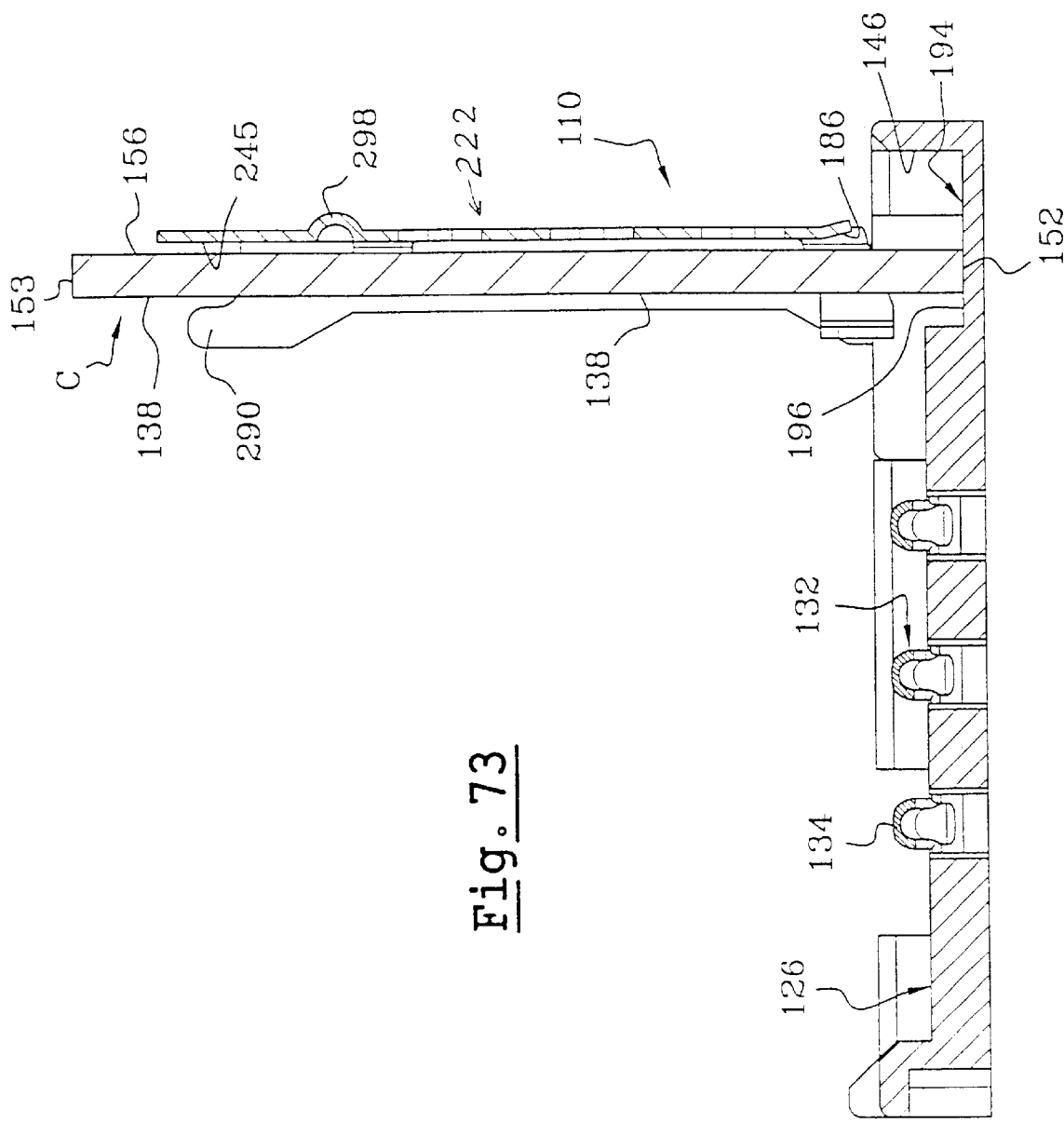
Figure 74:
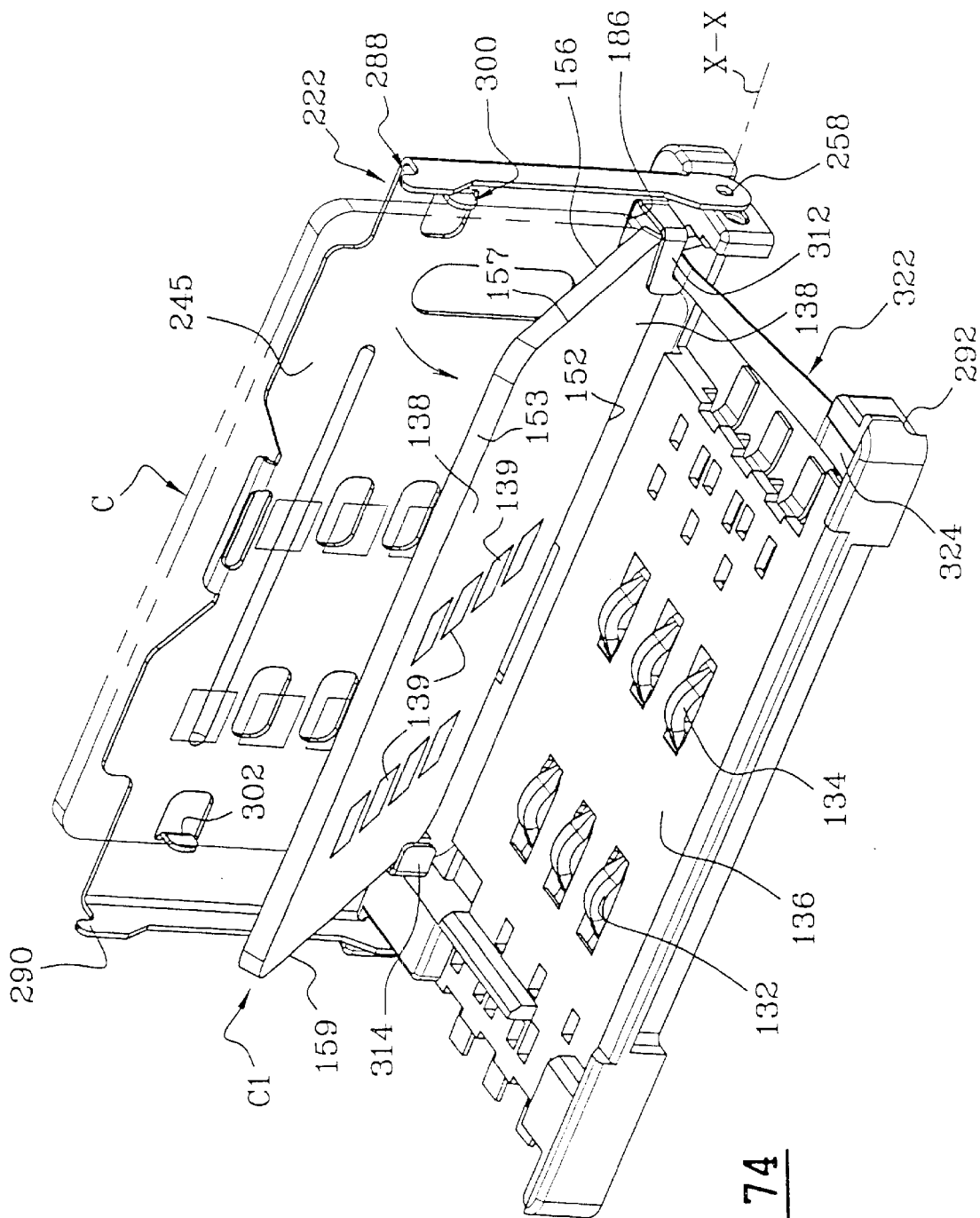
Figure 75:
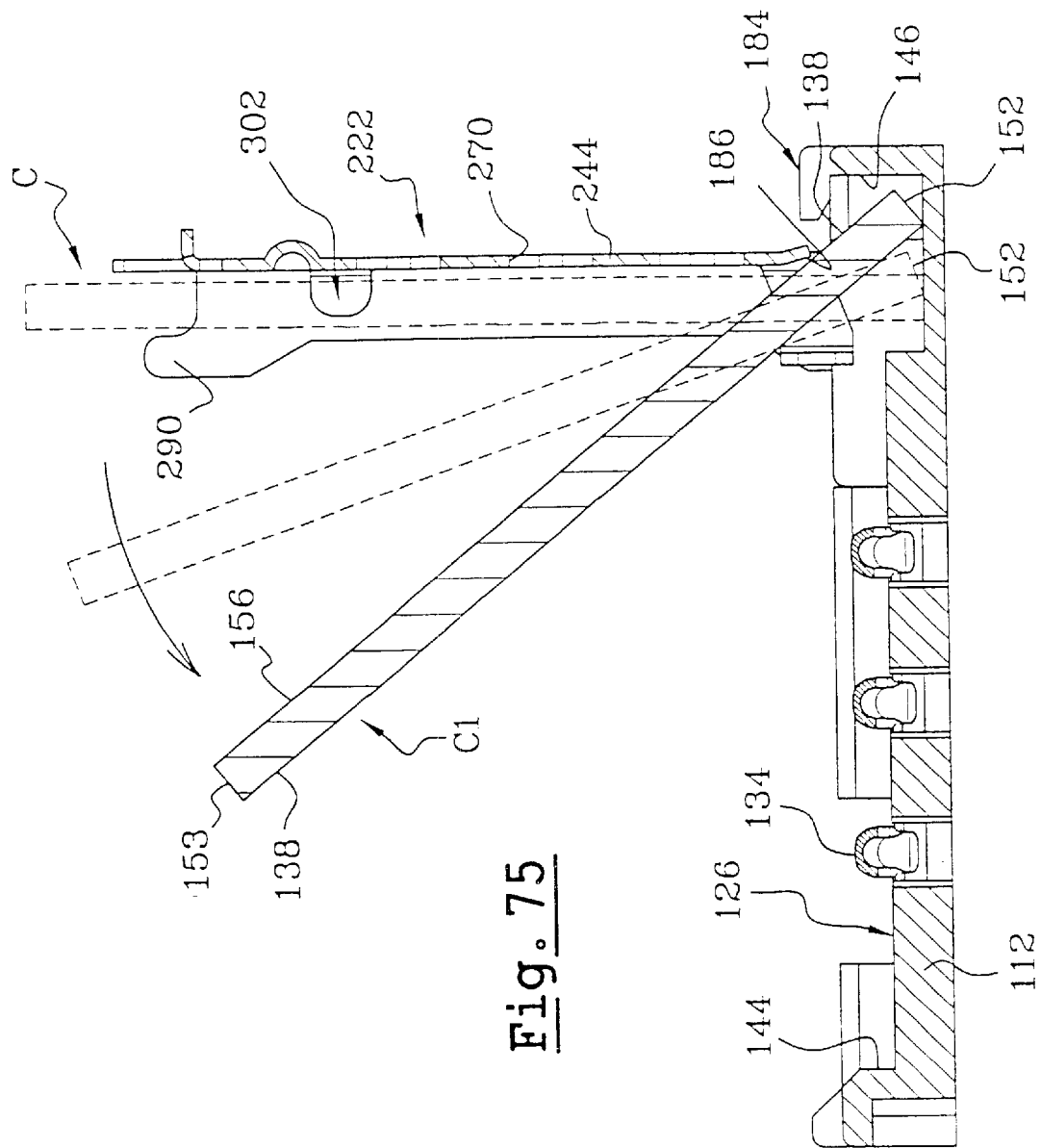
Figure 76:
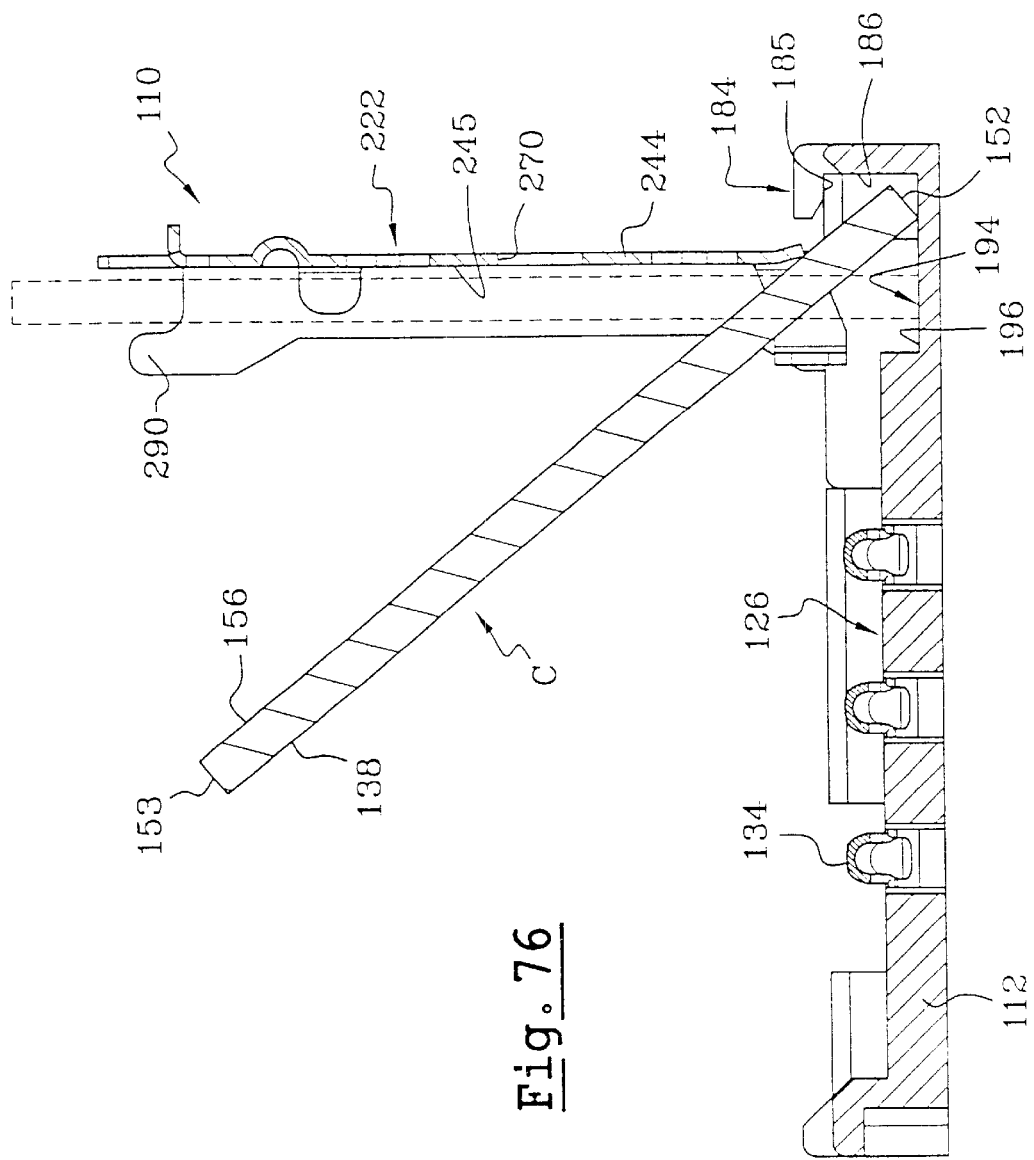
Figure 77:
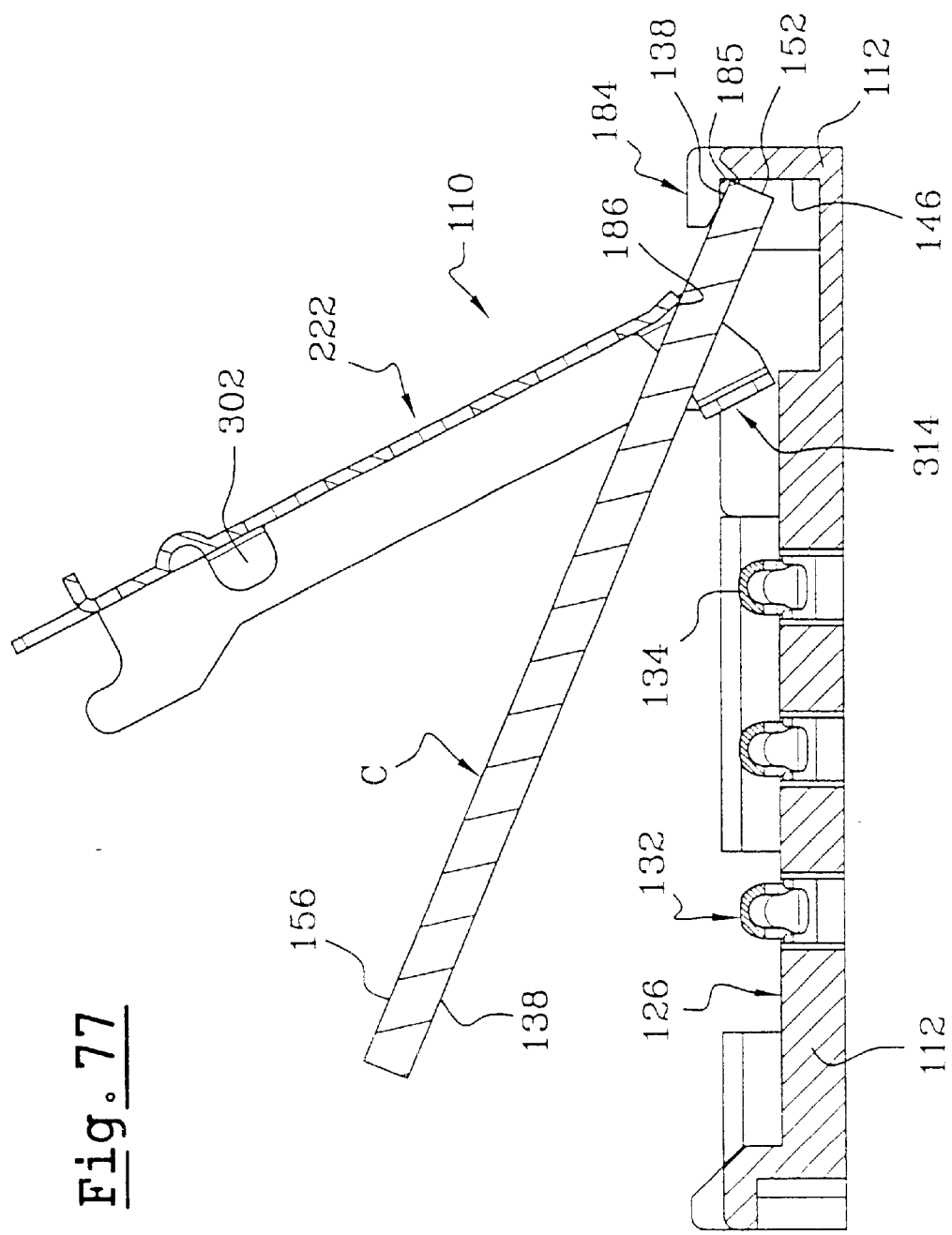
Figure 78:
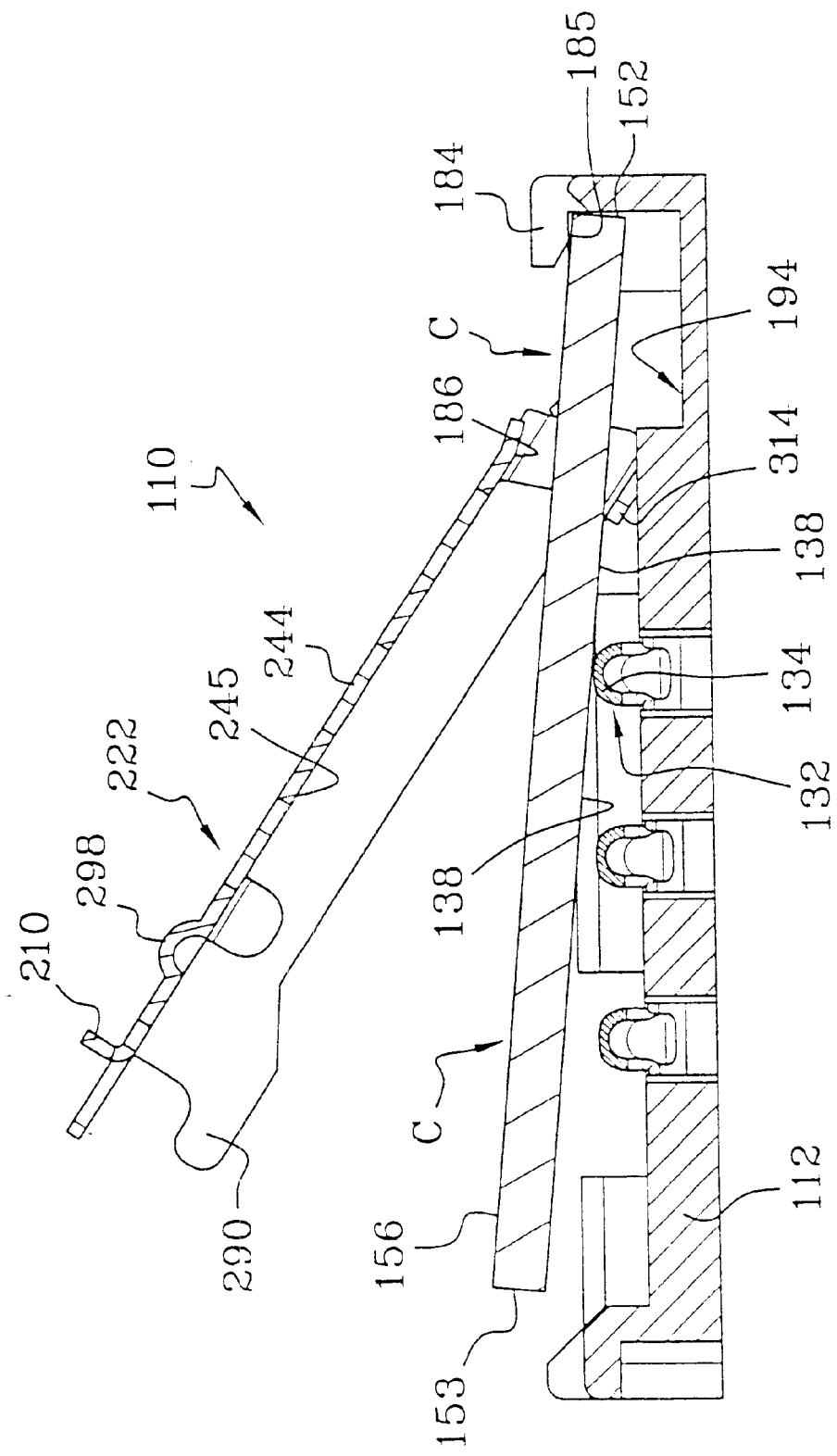
Figure 79:
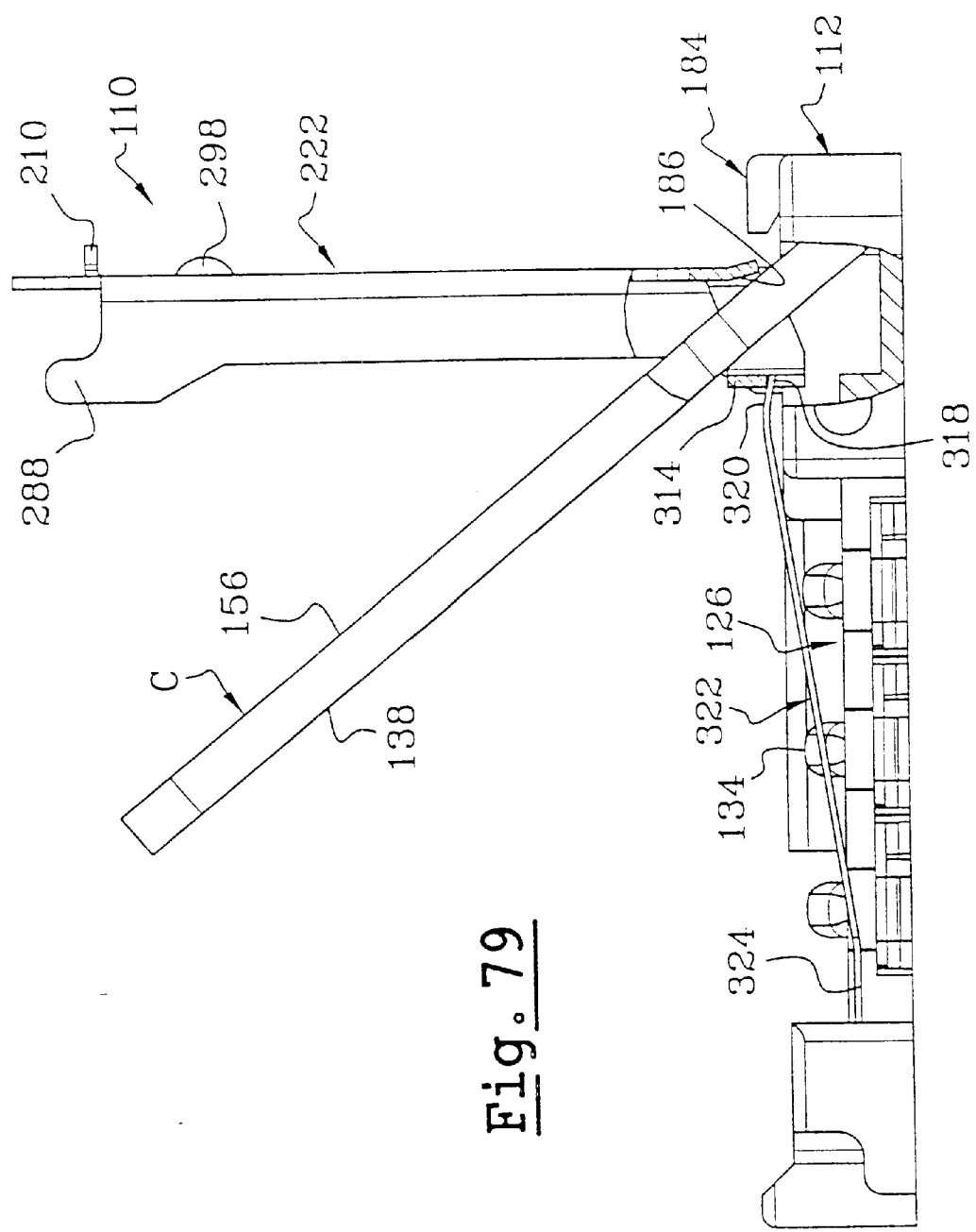

FIG. 72 is a view similar to that in FIG. 19, in which the flap and the card are shown in the same position as in FIGS. 56 and 57, the card being in the process of being inserted vertically into the flap;

FIG. 73 is a view similar to that in FIG. 72, in which the card is in the fully inserted vertical position;

FIG. 74 is a view similar to that in FIG. 40, with the card shown in phantom lines in its initial, vertical insertion position, and in solid lines in a tilted position that it occupies as the flap starts to be closed or when the card is released;

FIG. 75 is a view similar to FIGS. 72 and 73, in which the card is shown in various positions to illustrate the tilting movement of the card, by its pivoting and sliding;

FIG. 76 is a view similar to FIG. 75, in which the card is in the stable inclined position and the flap is in the open vertical position;

FIGS. 77 and 78 are two views similar to FIG. 76, illustrating the two next steps in closing the flap;

FIG. 79 is a view similar to that in FIG. 60, in partial cross section, in which the card is illustrated in the stable position after the flap has been automatically unlocked, and under the action of the return spring;

Sixth Embodiment

Figure 80:
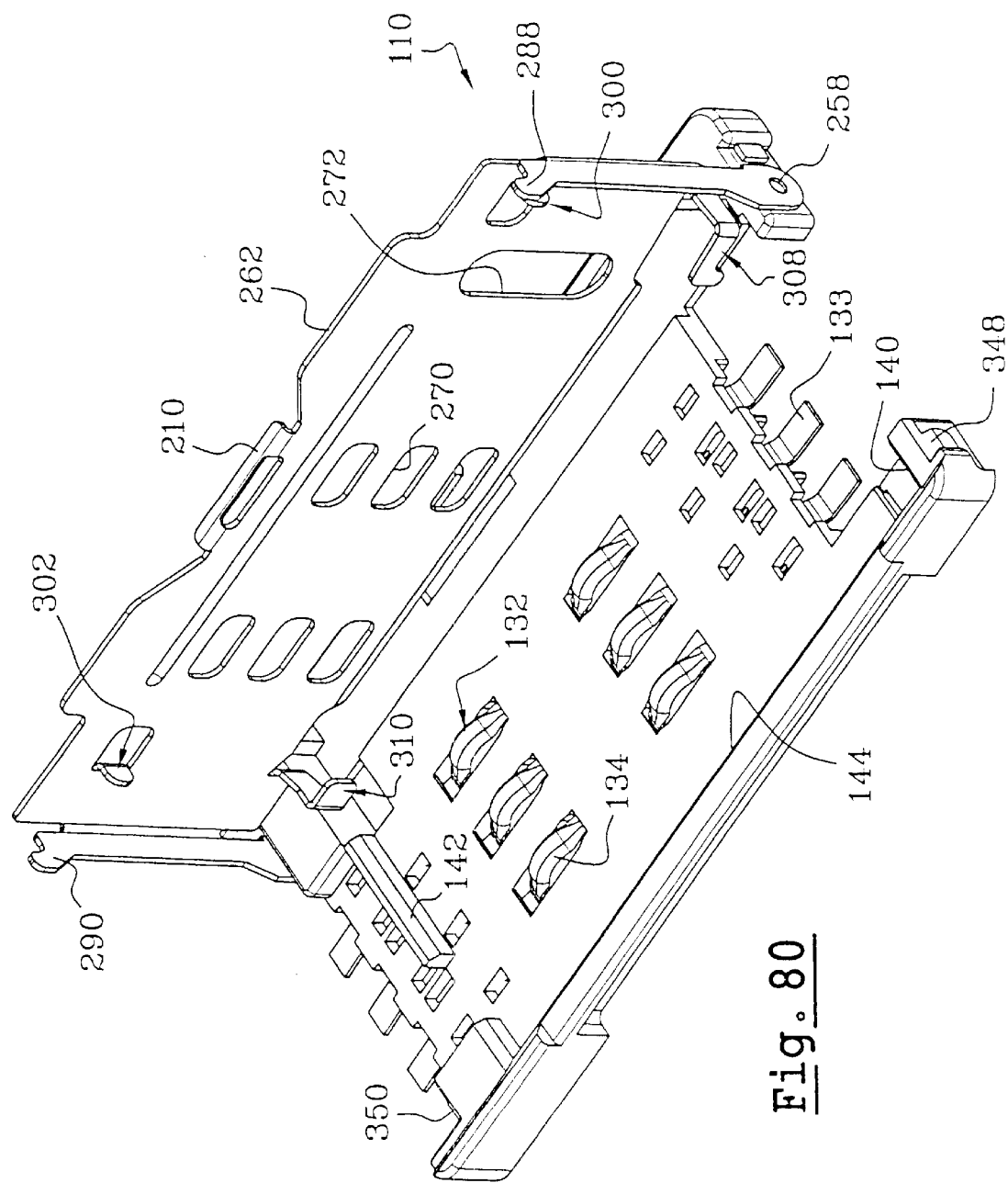
Figure 83:
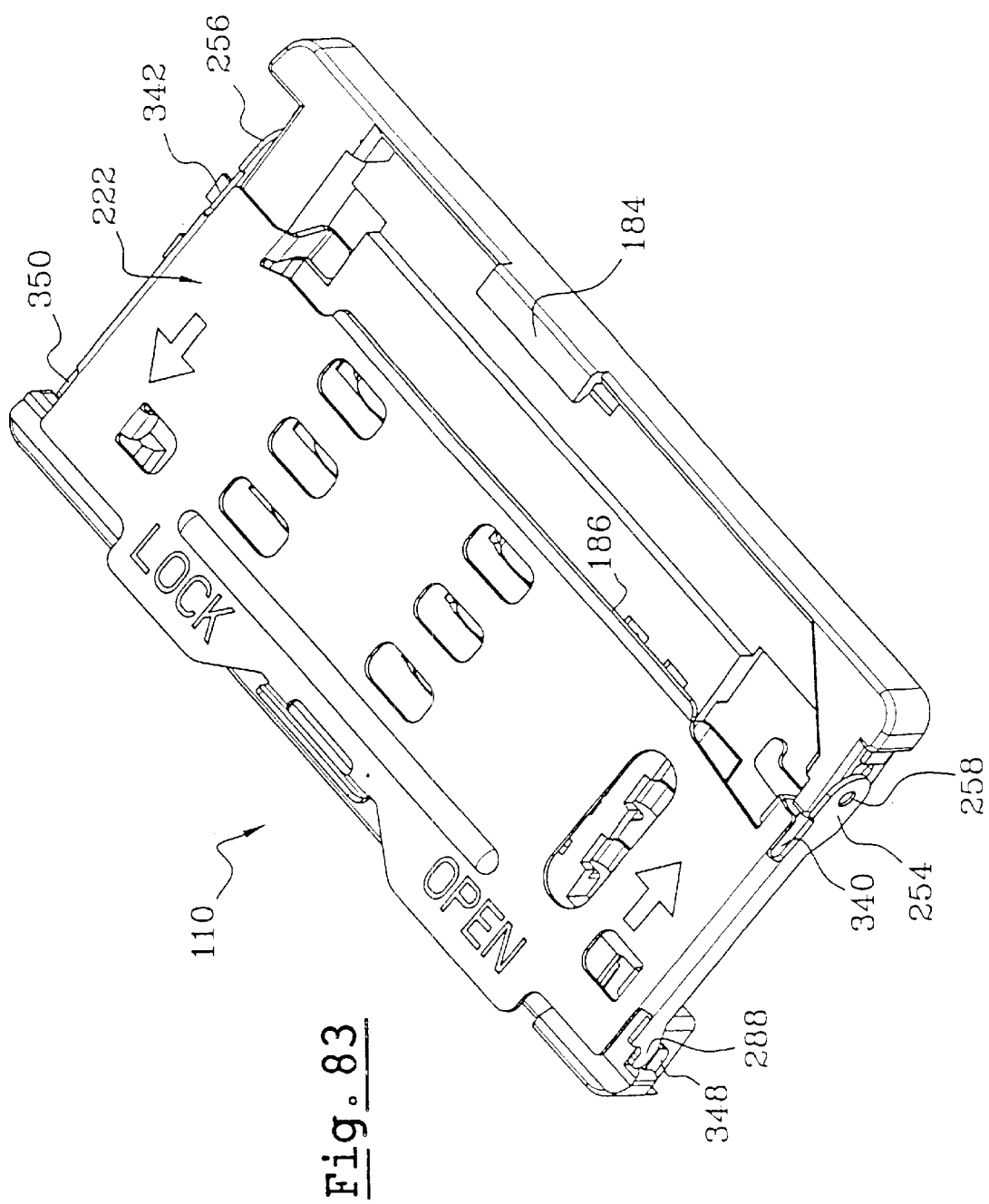
Figure 89:
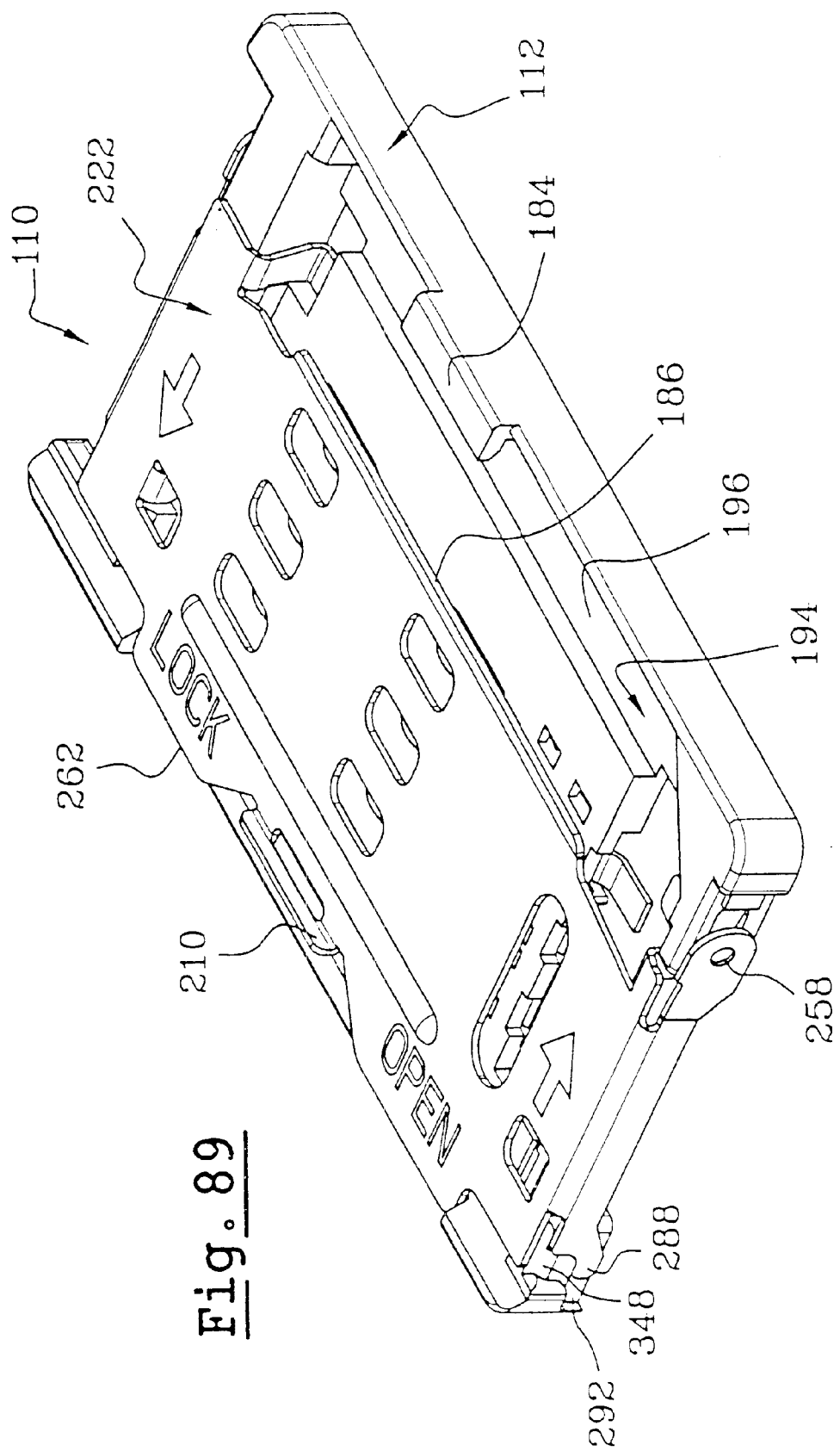
Figure 97:
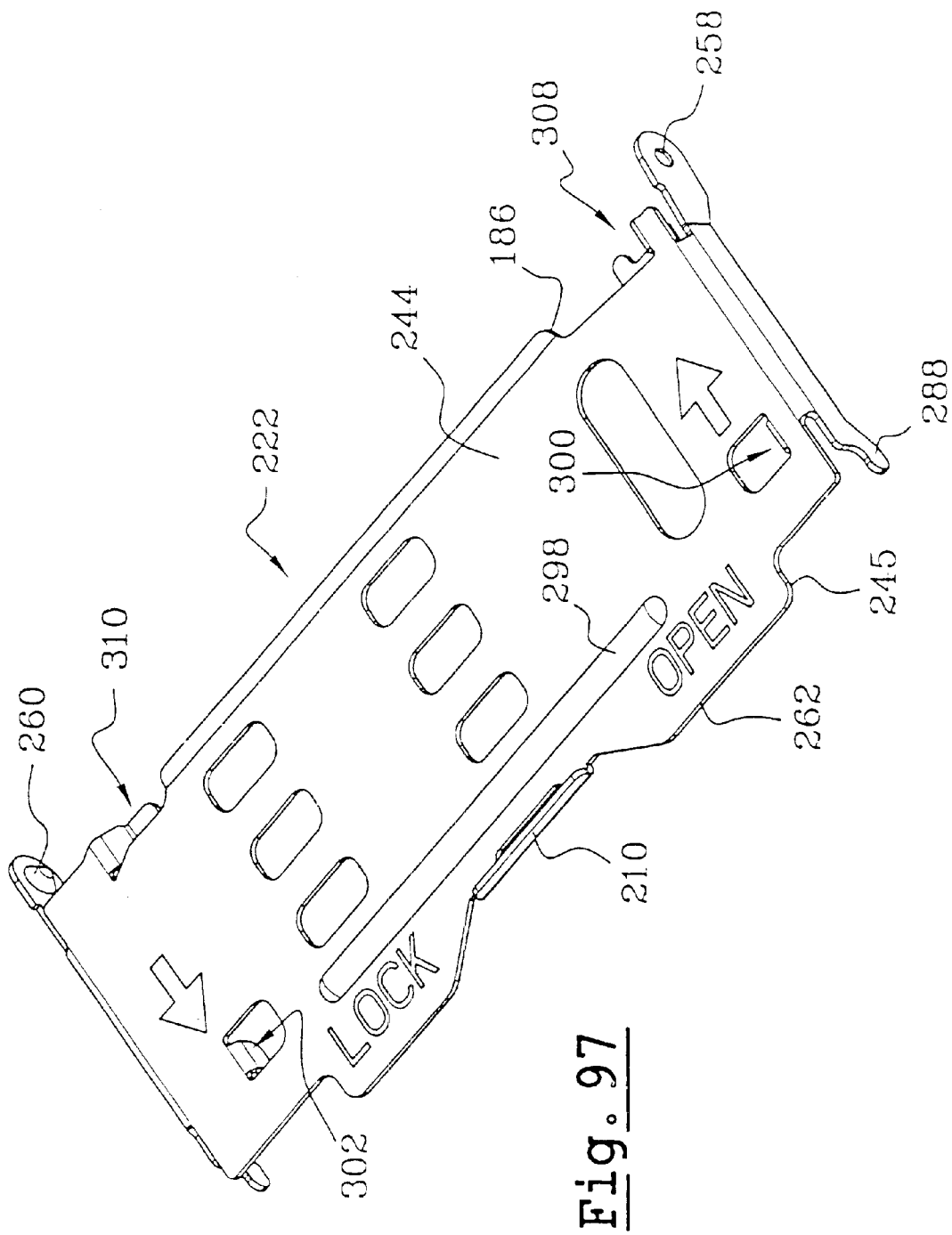

FIG. 80 is a view similar to that in FIG. 40, which illustrates a sixth embodiment of the invention, which is similar to the fifth embodiment but with a different means for hinging the flap to the insulating support and different means for locking the flap in the closed and looked position;

FIG. 81 is top isometric view in which the flap is illustrated in the closed but unlocked position;

FIG. 82 is a view on a larger scale of detail D81 shown in FIG. 81;

FIG. 83 is a top isometric view of the connector-illustrated in FIG. 31;

FIGS. 84 and 85 are views similar to those in FIGS. 49 and 50, which illustrate the connector in its state shown in FIGS. 81 and 83;

FIG. 86 is a view on a larger scale of detail D86 shown in FIG. 85;

FIGS. 87 to 89 are views similar to those in FIGS. 81 to 83, which illustrate the connector with the flap closed and locked;

FIGS. 90, 92 and 93 are views similar to those in FIGS. 87, 88 and 89 in which the flap is illustrated in its closed and locked position;

FIG. 91 is a view on a larger scale and in partial cross section of detail D91 shown in FIG. 90;

FIGS. 94, 95 and 96 are views similar to those in FIGS. 90, 91 and 92, in which the connector is illustrated with its flap in the process of being unlocked;

FIG. 97 is a top isometric view of just the closure flap;

Seventh Embodiment

Figure 98:
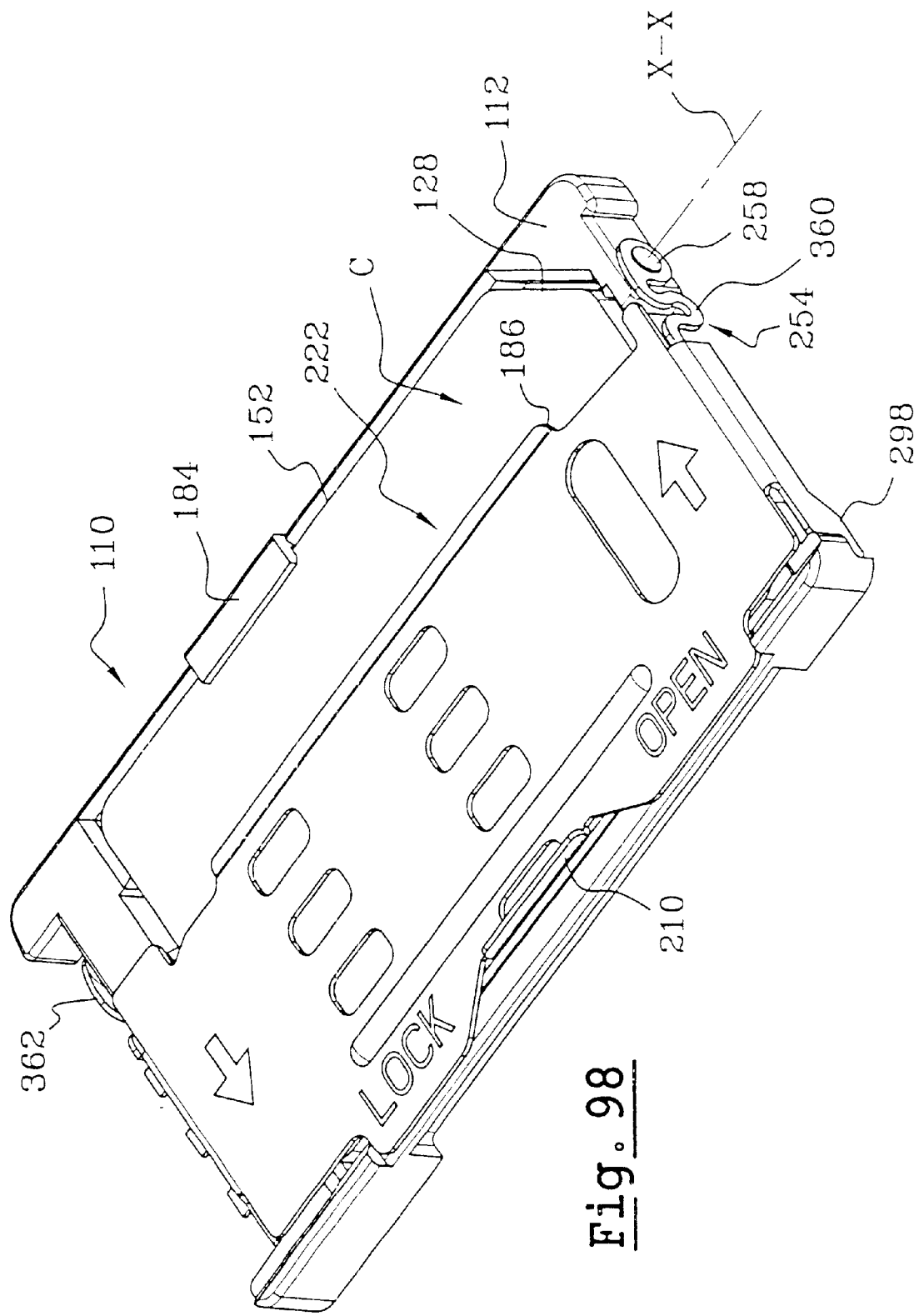
Figure 99:
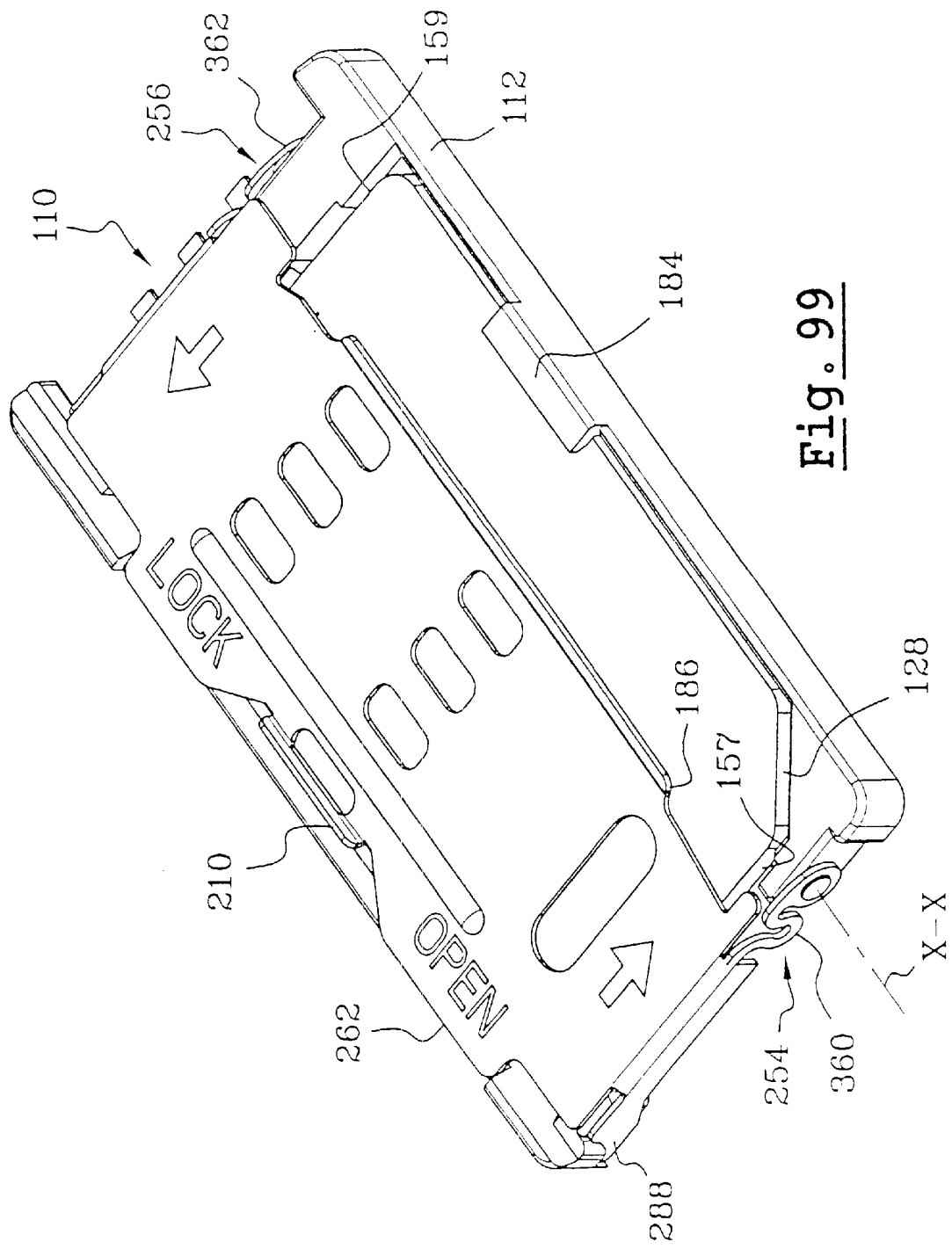
Figure 100:
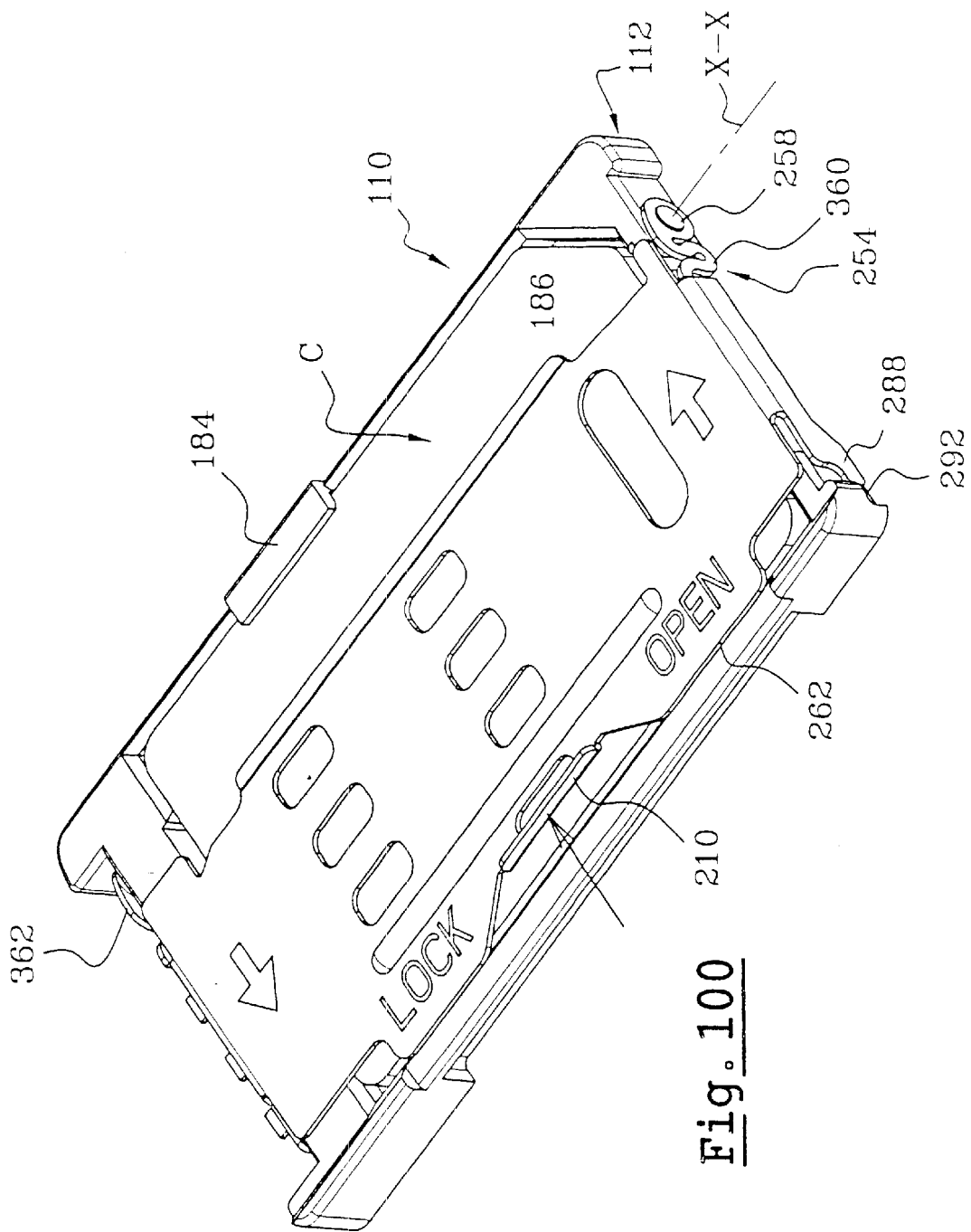
Figure 101:
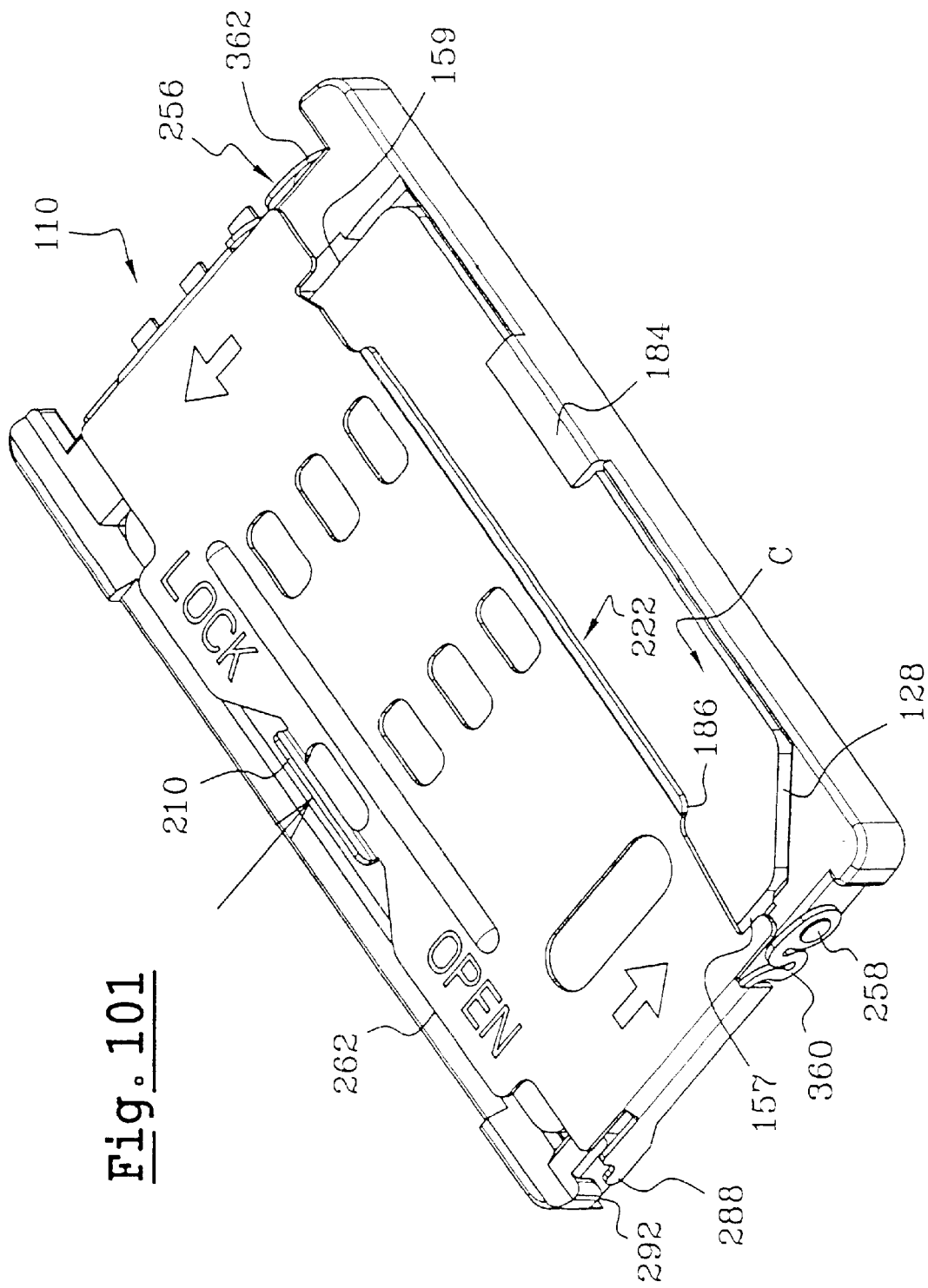
Figure 102:
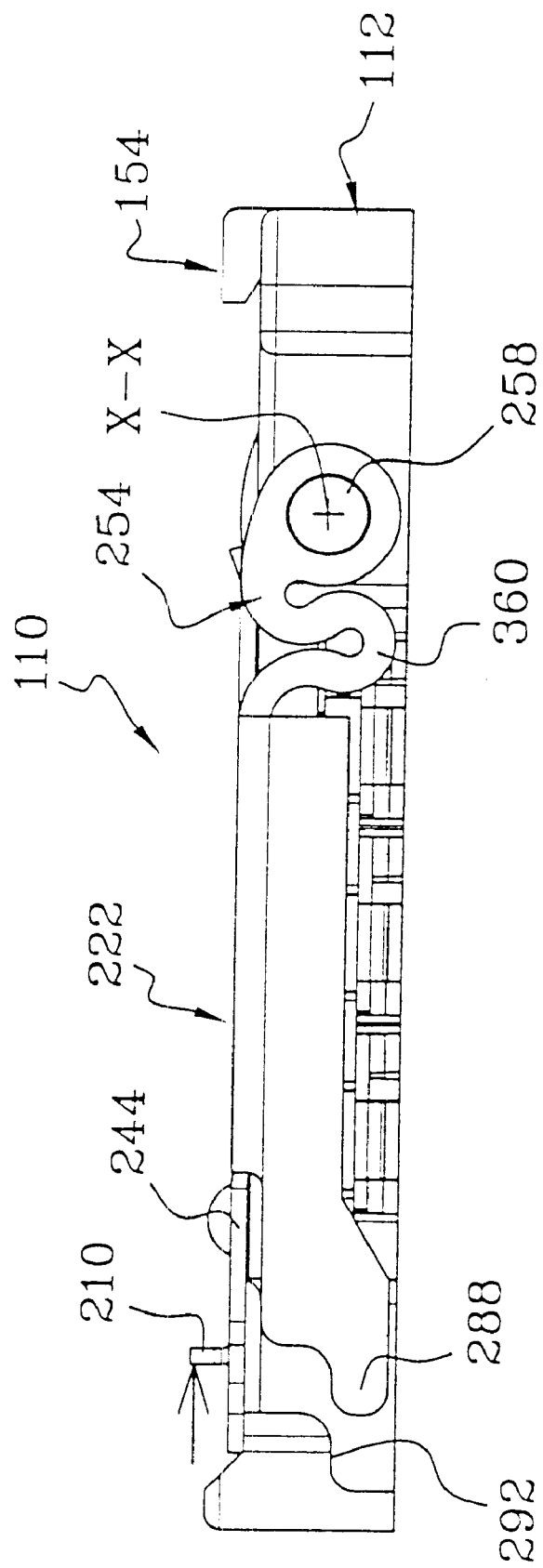
Figure 103:
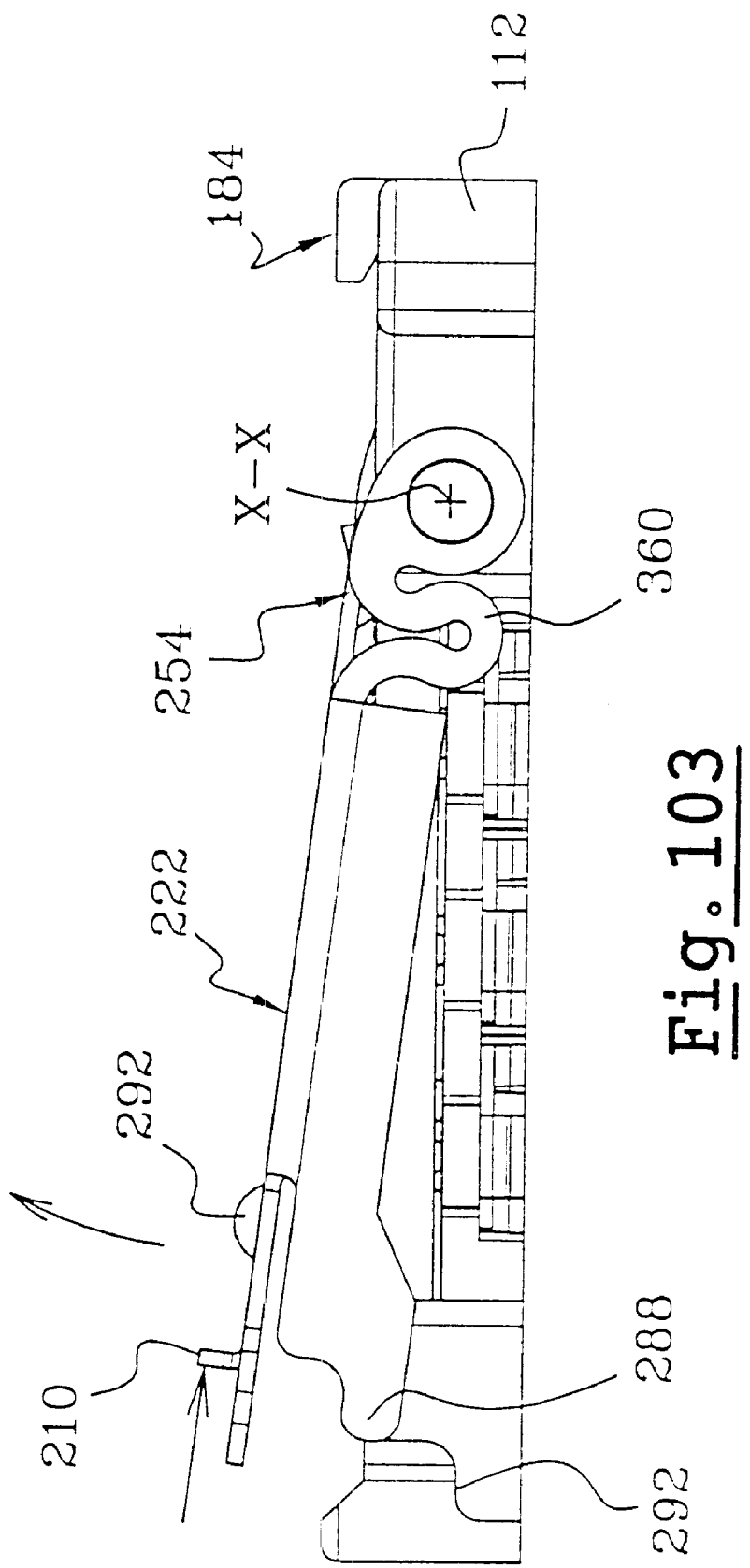
Figure 104:
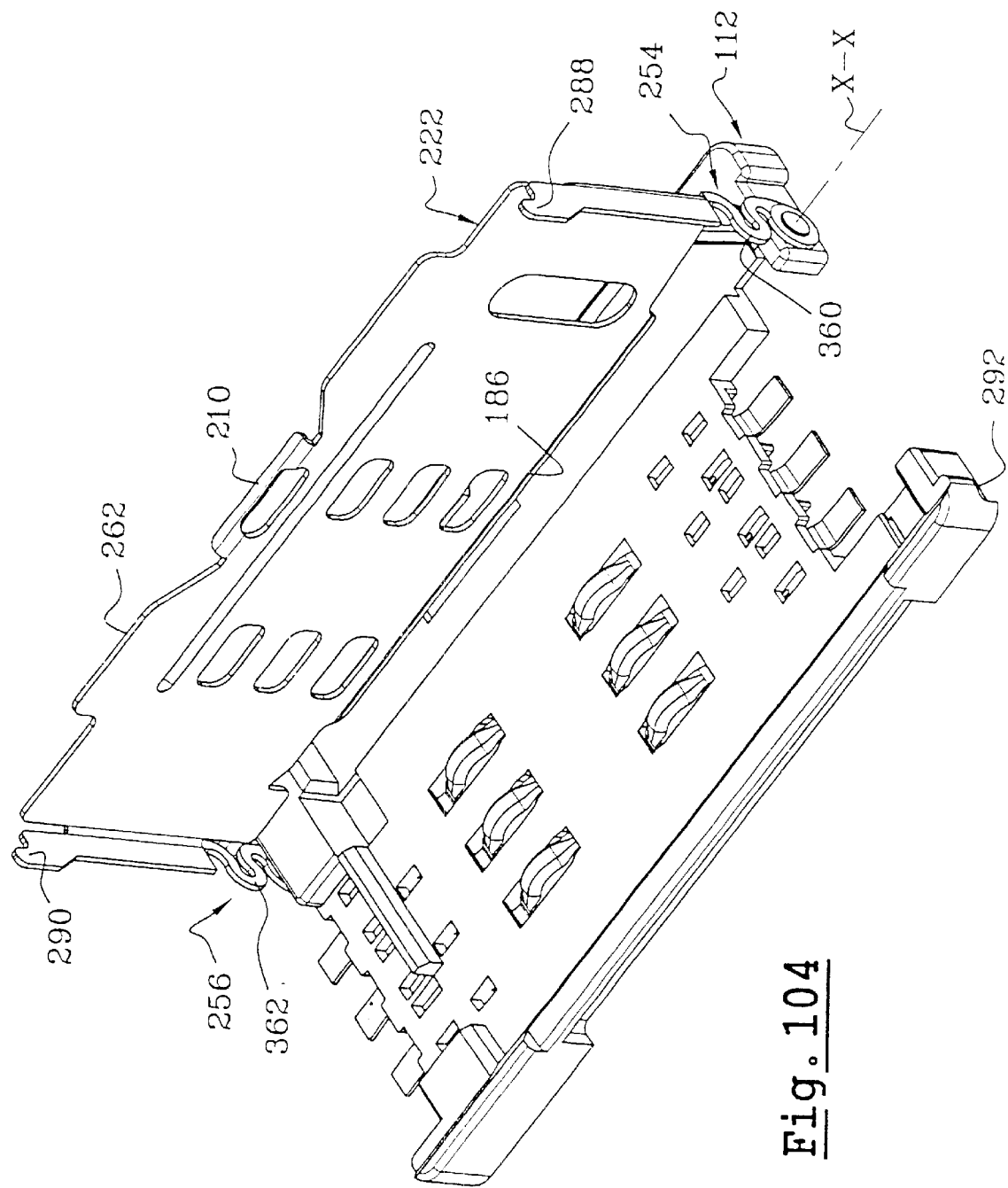
Figure 105:
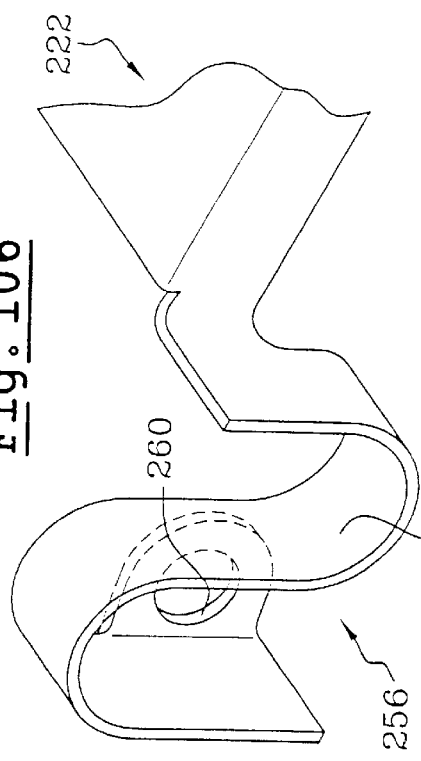
Figure 106:
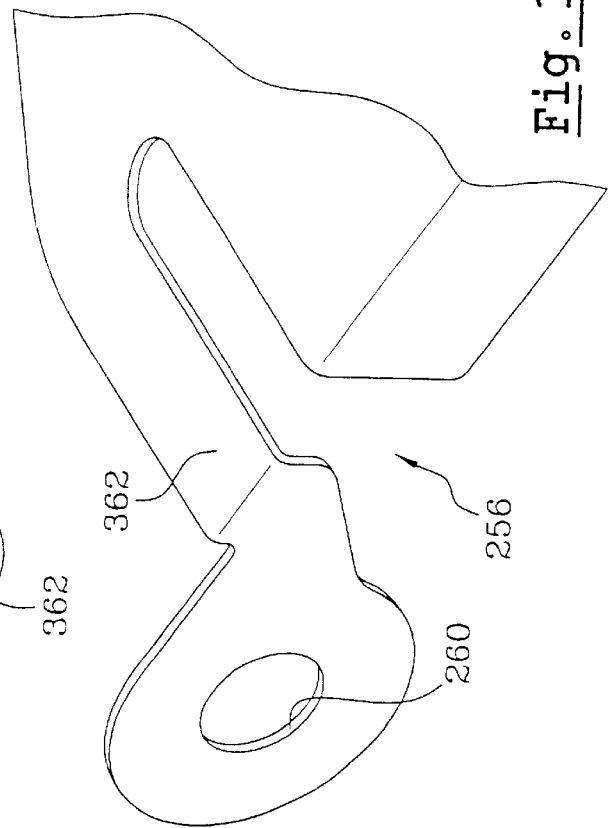
Figure 107:
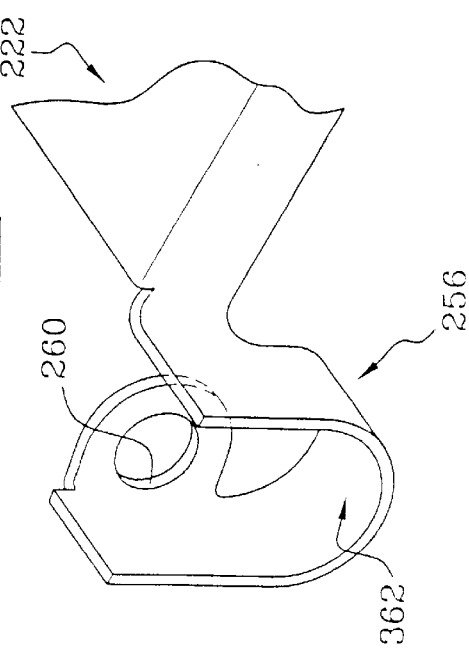
Figure 108:
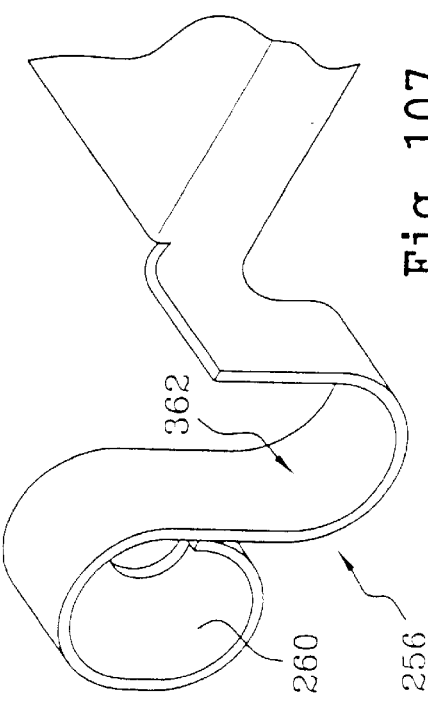
Figure 109:
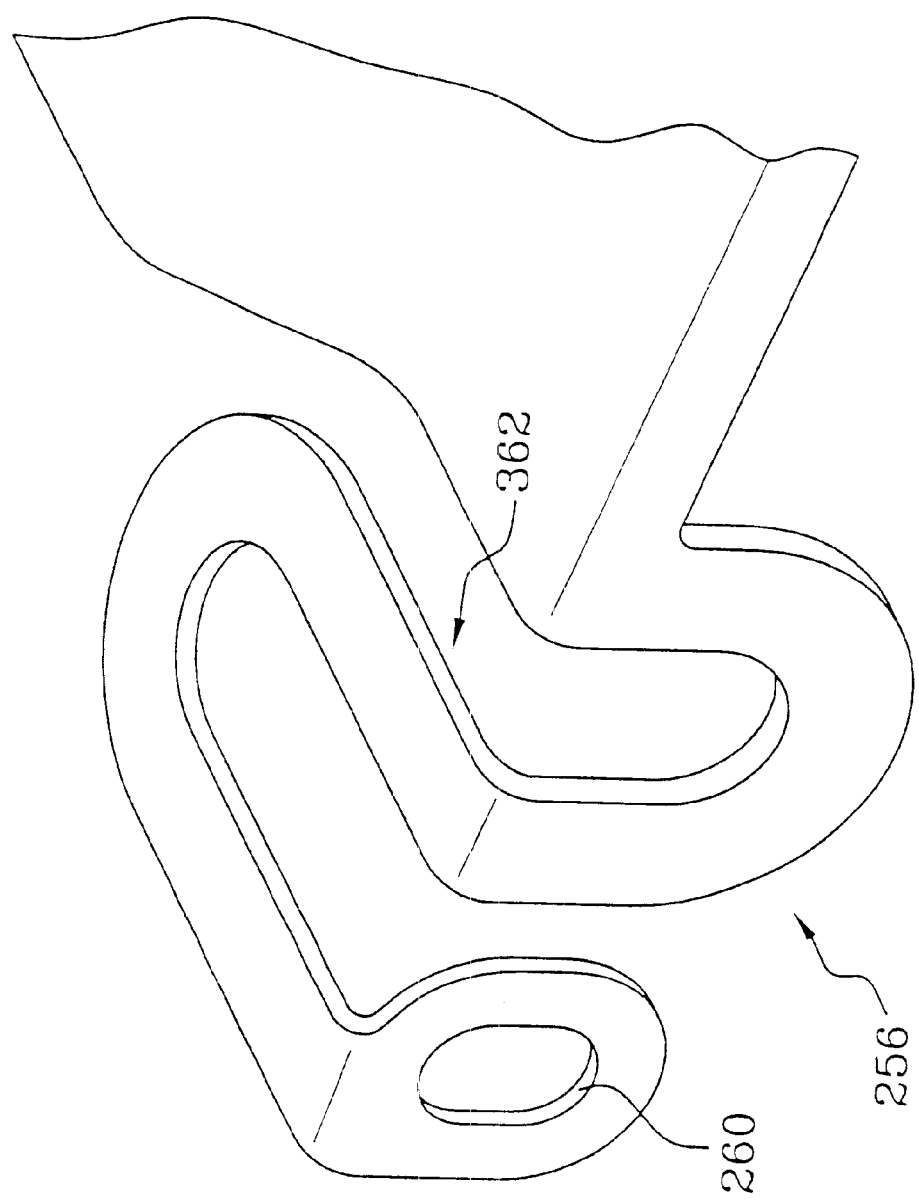
Figure 110:
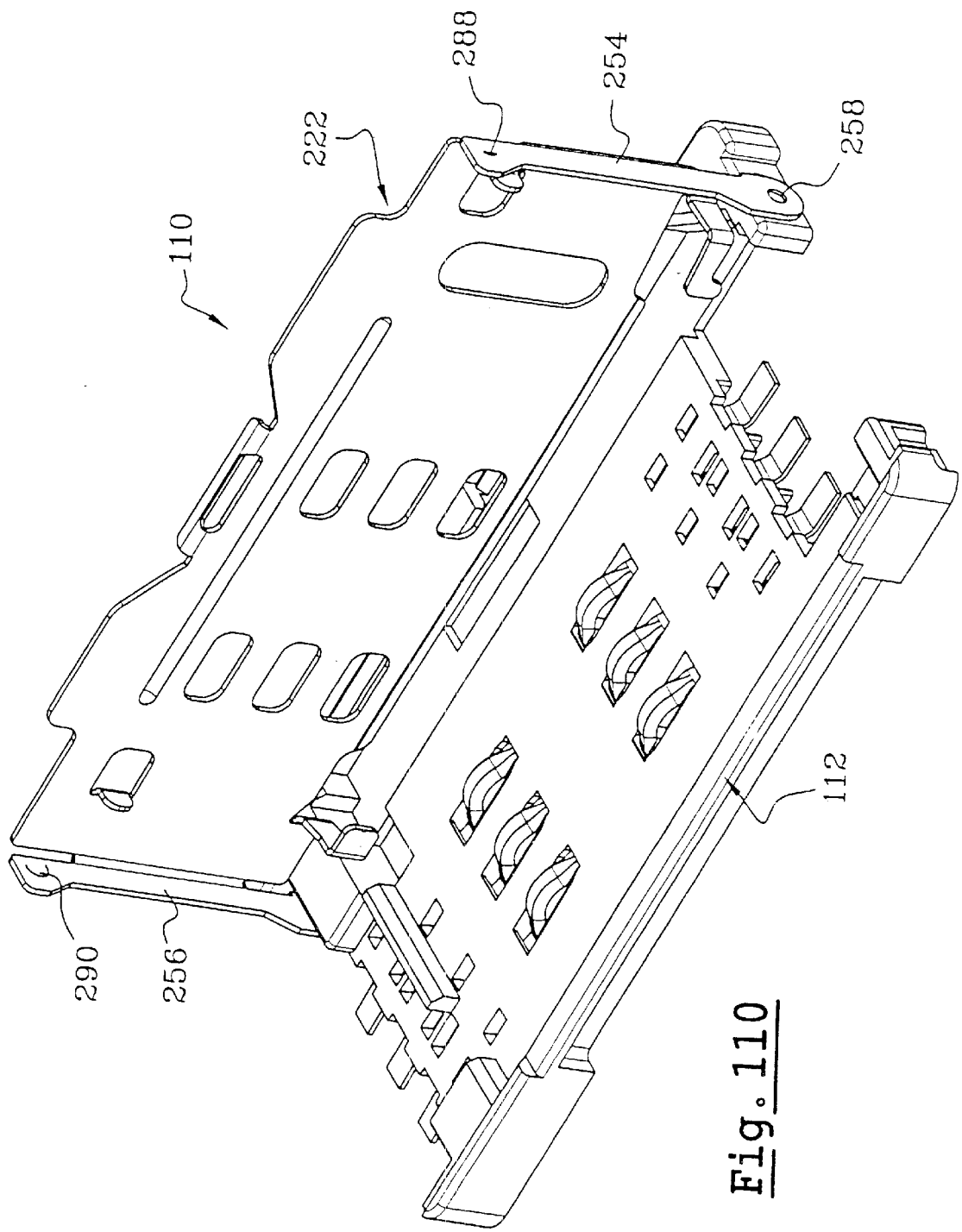

FIGS. 98 and 99 are views similar to those in FIGS. 87 and 89, with a card in the connector, which illustrate a seventh embodiment in which the hinge tabs of the flap are deformable in a vertical plane;

FIGS. 100 and 101 are views similar to those in FIGS. 98 and 99, in which the flap is In the retracted rear unlocking position;

FIG. 102 is a right side elevation view of FIG. 100;

FIG. 103 is a view similar to that in FIG. 102. in which the flap is in the unlocked and slightly open rear position;

FIG. 104 is a top isometric view of the connector without a card and with the closure flap in the completely open position;

FIGS. 105 to 109 are schematic views illustrating alternative embodiments of the spring arms for hinging the closure flap;

FIG. 110 is a view similar to that in FIG. 40, which illustrates an alternative embodiment of the means for locking the flap in the closed position.

In the description which follows, identical, analogous or similar components will be denoted by the same reference numbers.

DESCRIPTION OF THE PREFERRED EMBODIMENTS

The figures show various embodiments of an electrical connector 110 which includes a contact-carrying insulating support element 112 which is a molded plastic part of rectangular general shape. In FIG. 1 lateral directions are shown by arrows M and longitudinal directions are shown by arrow N. Front and rear lateral directions are indicated by arrows F, B (for backward, or rearward). Left and right directions are indicated by arrows L, R. The support element 112 has front and rear sides 114, 116, and has right and left ends 118, 120. The separation of the ends is greater than the separation of the sides. The support element has a downwardly facing lower face 122 and has an upwardly facing horizontal upper face 124.

The support forms an upwardly opening card-receiving cavity 126 in the upper face 124. The cavity has an overall shape complementary to the rectangular general shape of the card C (e.g. FIG. 6) which it receives in the fully-installed, or contact, or use position. In the examples illustrated in the figures, the card C (FIG. 5) is a standardized MICROSIM card, the general outline of which is rectangular and with rounded corners. A MICROSIM card has a length of 25 mm, a width of 15 mm and a thickness of about 0.88 mm. The card has a 45° polarizing chamfer 128 for correctly orienting the card, the chamfer being provided for engaging with a corresponding chamfer 130 on the walls of the cavity 126.

The insulating support element 112 (FIG. 1) carries a series of contacts, or contact blades 132, the figures showing six blades arranged in pairs. Each contact blade has a lead 133 for connection to a conducting track on a printed-circuit board (PCB in FIG. 13) onto which the connector 110 is fixed. Each contact blade has a free contacting end 134 having the general shape of an upside-down spoon, which projects above the horizontal upper face 136 that forms the bottom of the cavity 126. Each contacting end 134 can resiliently deflect downward to ensure contact with the corresponding pads on the card lower face when the card is fully installed and pressed down.

The card-receiving cavity 126 is bounded by right and left ends 140, 142 and by front end rear sides 144, 146.

In the first embodiment illustrated in FIGS. 1 to 6, the connector includes the insulative support element 112 (FIG. 3) and a sheet metal element 150. FIG. 1 shows that the side 144 of the card-receiving cavity is formed by the internal faces at 144 of two vertical tabs 148 of the sheet metal element 150. When the card is in the fully installed contact position, as seen in FIG. 6, a front side or edge 152 of the card bears against the internal faces 144 of the tabs 148. Each tab has a top that is bent 90° from the vertical and forms a horizontal lip 154. The lip lies above the upper face 156 of the card which abuts the lips under the resilient force of the contact blades.

The sheet metal element 150 (FIG. 3) is in the form of a cage having a horizontal apertured bottom plate 160. The bottom plate has a front edge 162 from which the tabs 148 extend, a left edge 164, and a right 165 edge from which a tab 166 extends. This construction allows the sheet metal element to be positioned with respect to the insulating support element 112 by butting against the right transverse edge 118 of the support element. The lower plate or base 160 of the sheet metal element 150 is also bounded by a rear longitudinal edge 188. Tabs 170, 172 have bent upper ends that lie in corresponding support element recesses 174 and 176.

Figure 2:
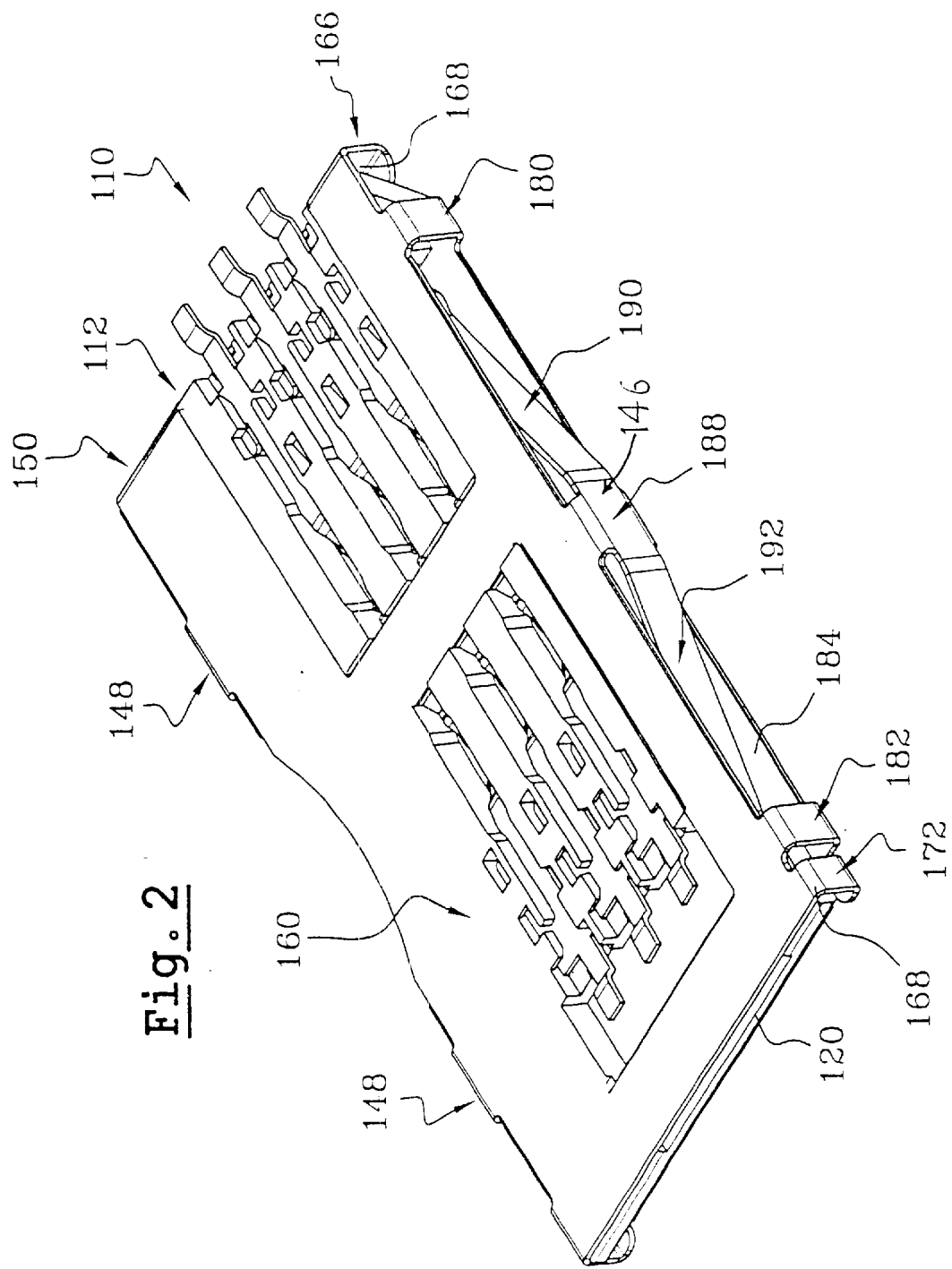
FIG. 2 is a bottom isometric view of the connector of FIG. 1.
Figure 3:
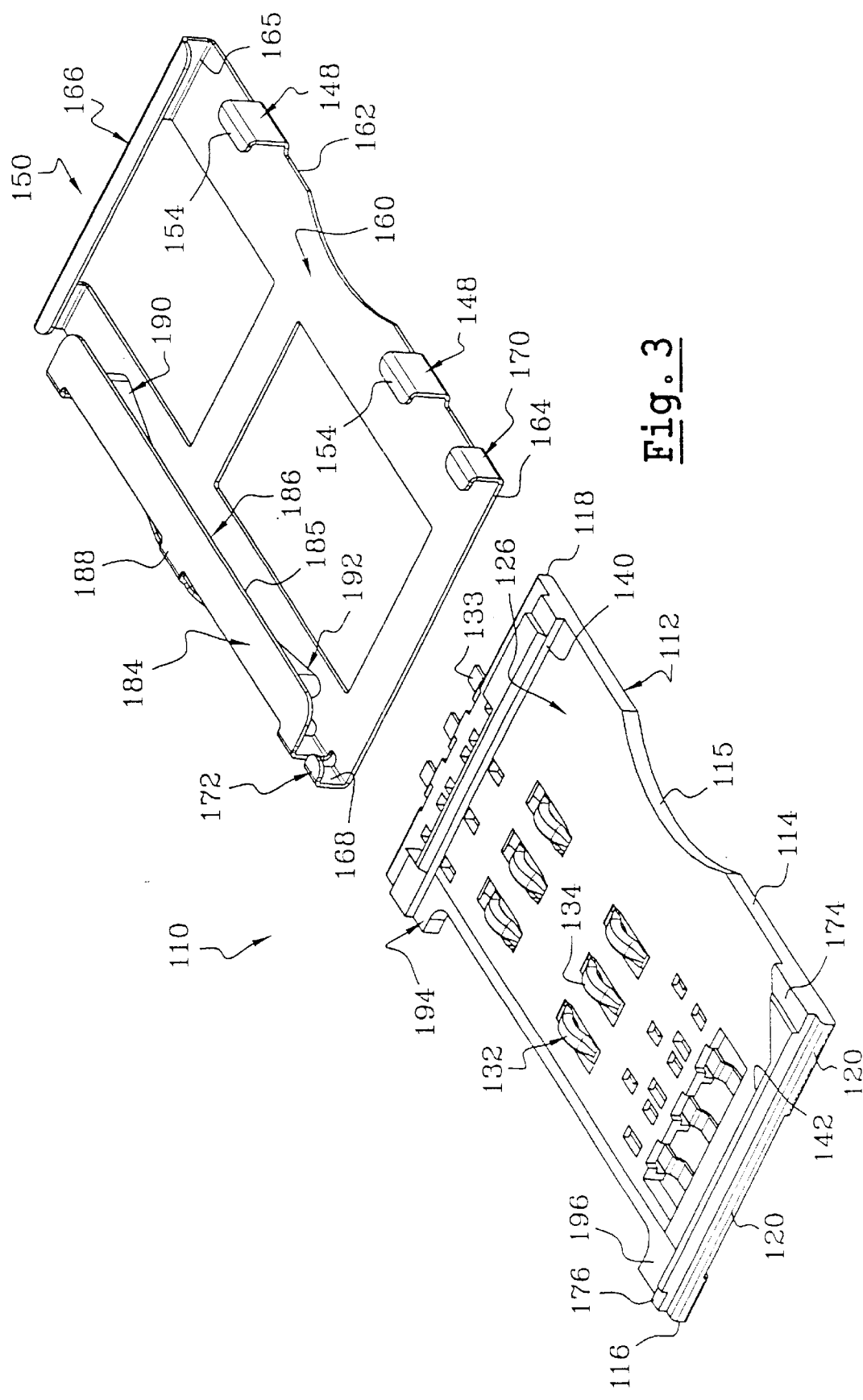
FIG. 3 is an exploded isometric view of the connector of FIG. 1.

As may be seen in FIGS. 2 and 3, the sheet metal element 150 has two right and left vertical tab 180, 182. These tabs extend vertically upwards from the rear edge 168 of the bottom plate 160. Their upper free ends carry a long horizontal rear hold-down tab 184 which extends inward (in a horizontal plane). That is, the tab 184 lies above the insulating support element 112 and above the card-receiving cavity. The tab 184 has a front edge 186.

The rear hold-down tab 184 is joined to the lower plate 160 by a vertical central tab 188 (FIG. 2) as well as by tabs 180, 182. Two spring arms 190, 192 extend longitudinally from the central tab 188. Each spring arm, or beam, has a free end that extends into the card-receiving cavity to engage the card. The inner ends of the arms, at the central tab 188, constitute a stop which abuts the corresponding edge 153 (FIG. 5) of the card. The spring arm free ends bias the card forwardly.

The bottom of the card-receiving cavity 126 (FIG. 1) has a slight recess 194, produced by molding, which extends over the entire longitudinal length of the cavity 126. The horizontal bottom 196 of the recess is downwardly offset from the horizontal plane of the bottom face 136 of the cavity 126, and therefore with respect to the plane of the lower face 138 of the fully installed card C. The recess helps in the installation of the card. The tab rear hold-down 184 extends horizontally in the same plane as the hold-down lips 154. That is, the horizontal lower face 185 (FIG. 3) forms a bearing surface for the upper face 156 of the fully inserted card C when the card is pressed upwards by the contact blades. The front longitudinal edge 114 (FIG. 1) of the support element 112 has a circularly arcuate central indentation 115. The indentation makes it easier for the card to be gripped in order to remove it from the cavity.

Figure 5:
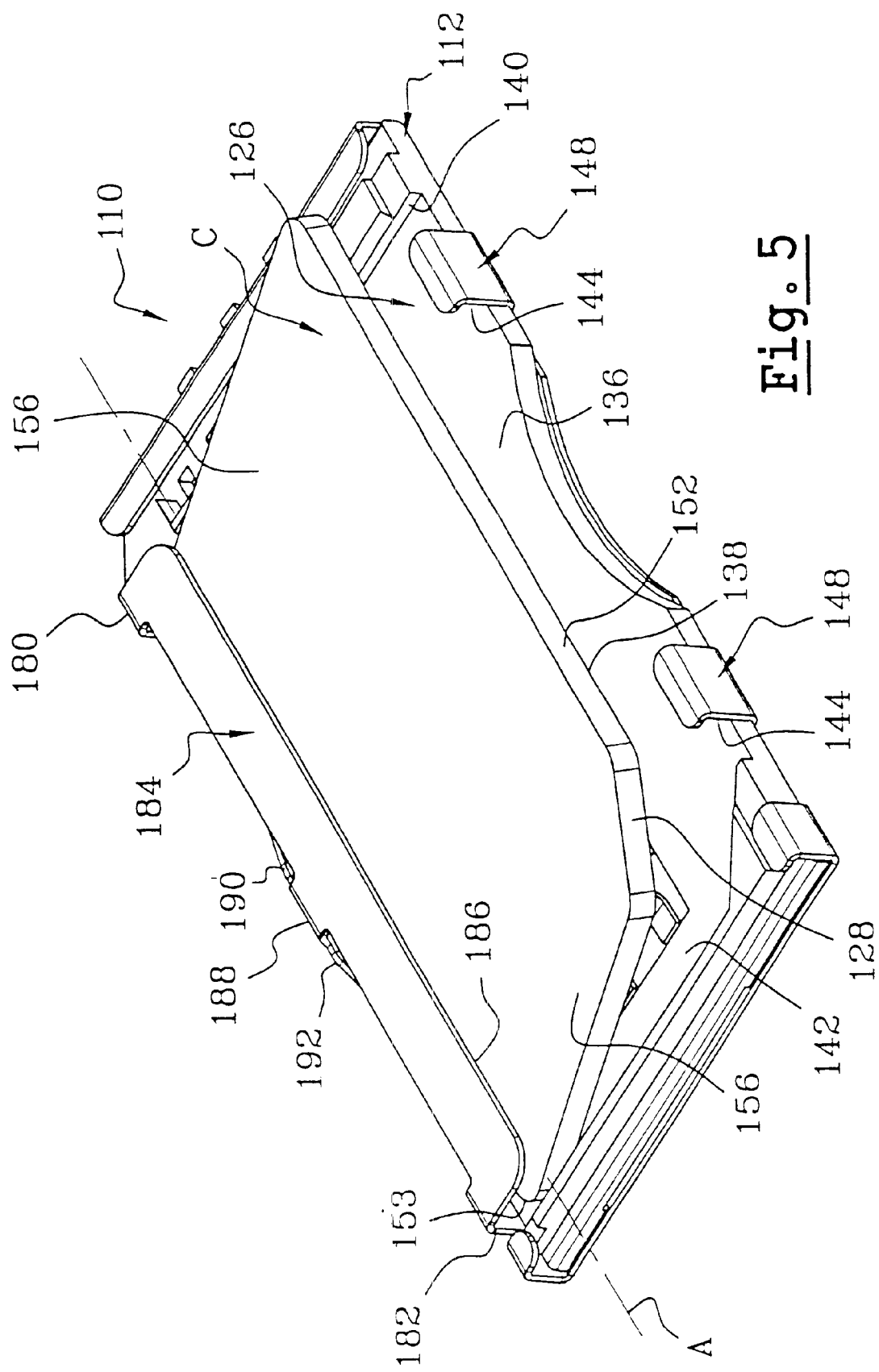
FIG. 5 is a view similar to that in FIG. 1, with a card in the process of insertion.

The method of using the connector 110 will now be described, especially with regard to putting the card C in the housing 126 and for extracting it therefrom. FIG. 5 shows that the card C is inserted at an incline from the horizontal, with the card rear edge 153 inserted under the tab 184. The forward edge 186 of the rear hold-down tab 184 is in contact with the facing part of the upper face 156 of the card C as the incline of the card is reduced. The rear edge 153 of the card C comes into contact with the two elastically deformable arms 190 and 192.

Card installation continues by pivoting the card C about a horizontal axis A, (FIG. 4) and sliding the card C under the edge 186 against the elastic force exerted by the spring arms 190, 192. This combination of pivoting and sliding movement allows the card to be inserted and positioned until it reaches an approximately horizontal position substantially facewise against the cavity bottom at the upper face 136. When the user stops applying force, the card is pressed forwardly by the spring arms 190 and 192. The card then occupies its fully installed use position in which its card front edge 152 (FIG. 5) butts against the internal faces 144 of the tabs 148. The upper face 156 of the fully inserted card C bears against the lower faces of the lips 154 and against the horizontal lower face 185 of the hold-down tab 184. If the user exerts a large force against the spring arms 190 and 192 when inserting and positioning the card, these arms flex and the rear longitudinal edge 153 of the card bears against the vertical faces of the tabs 180, 182 (FIG. 2).

In order to remove the card from the connector, starting from the position illustrated in FIG. 6, the user exerts a rearward force against the card. This is easily achieved because of the indentation 115. The user pushes the card against the force of the spring arms 190, 192 until the front of the card upper face is released from the lips 154. Then the front of the card can be lifted, this lifting being performed almost automatically because of the upward force of the contact blades. Due to the action of the contact blades and spring arms 190 and 492, the card emerges from the cavity at an incline. The user can grasp the card front end and extract it.

FIG. 4 shows that the pivoting axis A of the card, during installation when the card lies against the hold-down tab edge 186, lies above the cavity 126. This makes it possible to obtain satisfactory guiding during the combined pivoting and sliding movement, without correspondingly increasing the total height of the connector. That is, the tab 184 is located at a minimum height. The total height of the connector includes a height of about 0.95 mm for the structure of the insulating support element 112, the standardized thickness of the card of about 0.9 mm, and an overthickness of about 0.2 mm of the retaining tab 184 and of the lips 154.

The design of the insulation and the choice of symmetrical spoon-shaped contacts with a convex domed profile make it possible to ensure that the contact blades are well protected. They are protected from being damaged by catching, even when the longitudinal edge of the card is placed on the bottom 136 between two rows of contact blades. All of this is achieved in a total connector height of about 2 mm.

The second embodiment illustrated in FIGS. 7 to 9 will now be described, by making a comparison with the first embodiment that has just been described with reference to FIGS. 1 to 6.

The connector of FIG. 7 includes a sheet metal element 150 similar to that of the first embodiment, except that it has only a single spring arm 190. However, the element 150 does not have a front part in the form of the abovementioned front hold-down tabs 148 (FIG. 1). Instead, a locking member or lock 200 (FIG. 9) is mounted to slide laterally M on the insulating support element 112 between an open or unlocked position illustrated in FIG. 7 and a closed position illustrated in FIG. 9.

The lock 200 is a sheet metal piece slideably guided by two end tabs including a right end tab 202 and a left end tab 204. Each tab has the shape of a U on its side and slideably receives a corresponding part 204, 205 of the support element 112.

As may be seen in FIG. 8, the walls of the card-receiving cavity include a front edge at 144 that is part of the insulating support element 112. The card is retained in the fully installed horizontal use position in the cavity by the sliding lock 200. The lock includes a horizontal upper tab 208 which has two portions 154. The portions 154 are equivalent to the lips 154 of the first embodiment but the sliding nature of the lock 200 forms retractable means for retaining the card in position in the housing 126.

According to a detail (not shown), means for indexing the sliding lock 200 are provided in its two extreme transverse positions. These means consist, for example, of at least one boss or bump formed in the metal of the lock and which is received alternately in one or other of the two holes or recesses in the insulating support. This solution also provides a tactile sensation of the locking or unlocking.

To make it easier to operate the lock 200, the recessed central part is bent vertically upwards in order to constitute a tongue 210 forming a gripping and operating handle.

When the lock 200 is in its open or unlocked position illustrated in FIG. 7, the rear edges 155 of the lock tab 208, and therefore of the lips 154 are forward. This enables insertion of the card C into the housing 126 against the force of the spring arm 190. When the card reaches its horizontal position and bears against the contacts 132, 134, the user stops applying force on the card. The spring arm 190 pushes the card so its front edge bears against the edge 144 (FIG. 8) of the cavity walls.

In order to ensure that the horizontal card is reliably retained in the cavity 126, the user locks the lock 200 by pushing it rearwards. The lock slides to the position illustrated in FIGS. 8 and 9 in which the tab 208 with the two lips 154, lies above the card. This locks the card in the same way as in the first embodiment in FIG. 6.

In order to remove the card from the connector 110, the user first unlocks the lock 200 by moving it forward F. This brings the lock to the unlocked position of FIG. 7. Due to the upward force of the contact blades, the card is raised so the user is able to take hold of it by hand. Overall, the ergonomics of the connector 110, from the standpoint of putting the card C into position and of extracting it, are analogous to that described previously with reference to FIGS. 1 to 6.

The third embodiment illustrated in FIGS. 10 to 15 will now be described, especially by comparing it with the second embodiment. FIG. 10 shows that the position of the fully installed card is rotated 180° because the chamfer 130 is now near the right rear corner of the support element 112 whereas previously it was near its left front corner. FIG. 11 shows that the front and rear side walls 146 of the card-receiving cavity are molded as part of the support element 112 along with the opposite ends 140, 142. A rear hold-down tab 184 is integrally molded with the support element 112.

The connector 110 includes a laterally sliding lock 200, which is used to lock down a cover, or flap 222 that holds down the card. For this purpose, the parts 204, 205 (FIG. 10) of the insulating support element 112 along which the lock 200 is slideably mounted have a slight overthickness at 220. As a result, the lower face of the lips 154 of tab lock 208 lie in a horizontal plane vertically offset upwards with respect to the plane of the upper face 124 of the support element 112.

According to the third embodiment, the connector 110 is fitted with a hinged flap or cover 222. The cover is formed of sheet metal and includes a main portion in the form of a plate 244 with longitudinally N opposite ends 246, 248 bent perpendicular to the main portion. Each end of the plate has an indentation 250, 252. The opposite ends form tabs 254, 256 for pivotally mounting the cover on the support element 112 to pivot about horizontal axis X—X. The actual mechanical hinge is provided by two bosses 258 and 260 anchored in the support 112 and having pins passing through holes in the bosses.

The hinged flap 222 has a front edge 262, a central indent 264 in line with the tongue 210 (FIG. 11) of the tab 208 of the lock 200, and a rear edge 186 (FIG. 10). The rear edge 186 helps in pivoting the card into position as in the first two embodiments, as will be discussed below. The rear edge 186 is bent slightly upward, as shown in FIG. 12 to make it easier for it to engage the upper face of the card which pivots on the edge.

As shown in FIG. 14, when the flap is fully open it extends primarily vertically, making an angle of about 100° with respect to the horizontal plane of the support element 112.

As in the first embodiment and as shown in FIGS. 12 to 14 the bottom 136 of the card-receiving cavity 126 has a recess 194 at its rear, which is offset downward with respect to the bottom face 136.

The flap 222 (FIG. 10) has cut-outs 270 allowing access to the contacting ends 134 of the contact blades, for carrying out electrical test operations in the absence of a card. Similarly, a cut-out 272 allows access to the right connection leads 134 for the reflow soldering operations.

In the closed position of the flap or cover 222, shown in FIG. 13, the cover lies in a horizontal plane. The lower face 245 (FIG. 10) of the cover plate 244 bears against the facing parts 274 of the insulating support element 112. As shown in FIG. 15, when the cover is closed on a card C, the cover lower face 245 (FIG. 10) retains the card in the cavity 126.

The flap which lies over a majority of the card, not only assures good card hold-down, but avoids a risk of the card deforming when it is exposed to high thermal stress. This can occur when the electronic apparatus which is fitted with the connector and a card, is subjected to high temperatures, for example when it is a mobile telephone left exposed to the sun.

Apart from retaining the card in the fully installed position, the rear edge 186 of the cover 222 forms an edge for the pivoting axis A for the card when positioning the latter, as was explained previously in the case of the first two embodiments. The fact that the cover 222 is mounted so as to be hinged with respect to the insulating support 112 makes it possible, when the flap is open, for the edge 186 to be offset vertically upwards with respect to the bottom of the housing so as to make it easier to position the card.

The edge 186 which is part of the hinged cover or flap, provides an edge that moves with the flap. When the flap is open for installing or extracting the card, the moving edge 186 makes it possible to increase the amount of overhang of the part of the apparatus or equipment located above the card in the working position. This amount of overhang is much greater in cases in which there is only a simple rim molded with the insulating support.

How the card is put into position is illustrated especially in FIG. 14. The card is first put in position C1, shown in phantom lines, in which its rear edge 152 bears against the bottom 196 of the recess 194 while the card upper face 156 bears against the edge 186. The card is slid and pivoted about the edge 186 until it reaches the intermediate position C2. Then, the card upper face is still in contact with the edge 186 and the rear edge 152 of the card bears against the edge 146 of the walls of the cavity 126 and against the bottom 196 of the recess 194. Finally, the user gradually tilts the card until it is entirely in the cavity 126, by passing through another intermediate position C3 illustrated in FIG. 14.

The smart card C shown in FIG. 12 has a longitudinal N length that is about 1.67% of its lateral M width. The recess 196 shown in FIG. 14 into which the rear edge 152 of the card must be placed, is spaced from the open front end of the connector by about the small width of the card. This allows the user to better view the recess 196 and the rear edge of the card. If the entire length of the card had to be inserted into a cavity, then the user's view would not be as clear.

In the position C3 of FIG. 14, the card is held slightly inclined with respect to the bottom of the housing 126 because of the action of the spoon-shaped contacting ends of the contact blades. In order for the user to place the card in its fully installed position, the user closes the flap 222 by making it pivot clockwise with regard to FIG. 14. This brings the flap to its horizontal position illustrated in FIG. 13. Finally, the user locks the flap 222 down by operating the lock 200 to lock the flap 222 in the closed horizontal position illustrated in FIG. 11.

Removal of the card is accomplished by unlocking the lock by sliding it forward. FIG. 14 shows that the flap and card pivot to position C3 wherein they extend at an angle of about 8° with the horizontal. In this position the card can be gripped and removed.

The fourth embodiment illustrated in FIGS. 16 to 39 differs from the third one by the nature of the locking means for retaining the cover or flap in the closed position. The fourth embodiment uses the cover 222 to lock itself down when pivoted down. For this purpose, the cover 222 is mounted so as to slide laterally M in a horizontal plane. That is, the hinge axis X—X of the pivoted-down cover may be slid laterally M between an unlocked rearward position shown in FIG. 23 and a locked forward position shown in FIG. 28.

A pair of bosses 258, 260 (FIGS. 16, 17) of the hinge tabs 254, 256 project into slots 280, 282 formed in end faces 284, 286 of the support element 112.

In order to hold down the cover, the hinge tabs 254 and 256 are formed with hooks 288, 290. The hooks lie at the front end of the flap (they lie at the front end only in the final closed position of the flap). The hooks can be inserted under downwardly-facing shoulders formed in notches 292, 294 in the support element, as illustrated in FIGS. 28, 29 and 31.

In order to make it easier for the hinged flap 222 to be handled, to slide it horizontally between its two extreme positions, the front edge 262 is provided with an indent 264. The front edge also forms a handling tongue 210 in the indentation. The tongue can be directly pulled forward for unlocking.

To make the closure flap 222 stiffer, it is formed with a reinforcing rib 298. The stamped rib 298 forms a profile of the chamfered end of the properly inserted card to indicate to the user the direction in which the card is to be positioned in the connector.

FIGS. 19 and 22 show the shape of the flap 222 with its means for hinging, or pivoting. In its open position the main plate portion of the flap extends approximately 90° with respect to the horizontal plane of the support element 112. Putting the card in position in cavity 126 and closing the flap 222 are basically performed in the same way as that described with reference to the third embodiment.

As shown in FIG. 32, the card is inserted in an inclined orientation with respect to the horizontal and is slid towards the rear side or edge 146 of the cavity 126. During such sliding, the upper face 156 of the card C comes into contact with the edge 186 of the hinged flap 222 which is in the open vertical position as shown in FIG. 32.

As soon as the card is in contact with the edge 146, the remaining movements for completing the positioning operation are identical to those described above, especially by combining a pivoting and sliding movement about the pivoting axis A at the edge 186 when the cover or flap 222 is in its open position.

The flap 222 is closed, by rotating it about the axis X—X and is locked by applying force to the tongue 210 to make the hooks 288 and 290 engage the complementary notches 292 and 294. The flap ends up in the position illustrated in FIGS. 34 to 37.

Placing the card in the cavity is facilitated by the fact that all the edges which form the boundary of the cavity are beveled in the upper face. Furthermore, with regard to the edge 144, two 45° ramps 143, 145 (FIG. 38) are provided at the longitudinal opposite ends of the support element. The two ramps 143, 145 make it possible to slide down a possibly offset card at the end of closure of the flap and terminate the guiding of the card in the cavity 128.

The fourth embodiment is basically a simplification over the third embodiment in so far as the connector now has only two main components. These are the insulating support element 112 and the hinged metal flap 222 attached so as to be pivoted and slideable on the fixed support element 112.

The closure flap 222 produced in the form of a metal plate, in both the third and fourth embodiments, constitutes an electromagnet shield.

The fifth embodiment illustrated in FIGS. 40 to 79 will now be described by comparing it with the fourth embodiment that has just been described. The flap and means for locking it in the closed position are the same in the fourth and fifth embodiments. However, the fifth embodiment differs, in that the closure flap or cover 122 has means for partially and temporarily holding the card C, and in that elastic means are provided for automatically returning the closure flap 222 to its open vertical position.

FIG. 56 shows that the cover, or flap can position a card C between two upper guiding tabs 300, 302 which extend forward (in the vertical position of the flap) and perpendicular to the plane of the main plate portion 244, (FIG. 40). The tabs 300, 302 form two guiding faces 304 end 306 which lie in vertical planes, facing each other and spaced apart longitudinally by a length A' (FIG. 45) which is slightly longer then the card C.

The guiding tabs 300 and 302 (FIG. 40) lie close to the front or top edge 262 of the flap. Two lower guiding tabs 308, 310 are also provided, which lie near the lower or rear edge 186 and are also separated by the distance A'.

Each lower tab 308, 340 has an additional tab end 312, 314 for retaining the lower part of the card. Each tab end lies in a plane parallel to the plate 244 of the flap 222.

The right tab end 312 is also extended downwards by a lip 316. The lower edge 318 of the tab end is designed to engage a free end 320 of a return spring 322.

The return spring 322 is a sheet metal leaf spring attached to the insulating support element. The front end 324 of the spring 322 is fixed to the insulating support and the rear free end 320 lies against the lower edge of the tab end. The spring continually presses the tab end 312 upwards to urge the hinge flap 222 to pivot to the vertical, that is to pivot about axis X—X clockwise with regard to FIG. 43.

Figure 48:
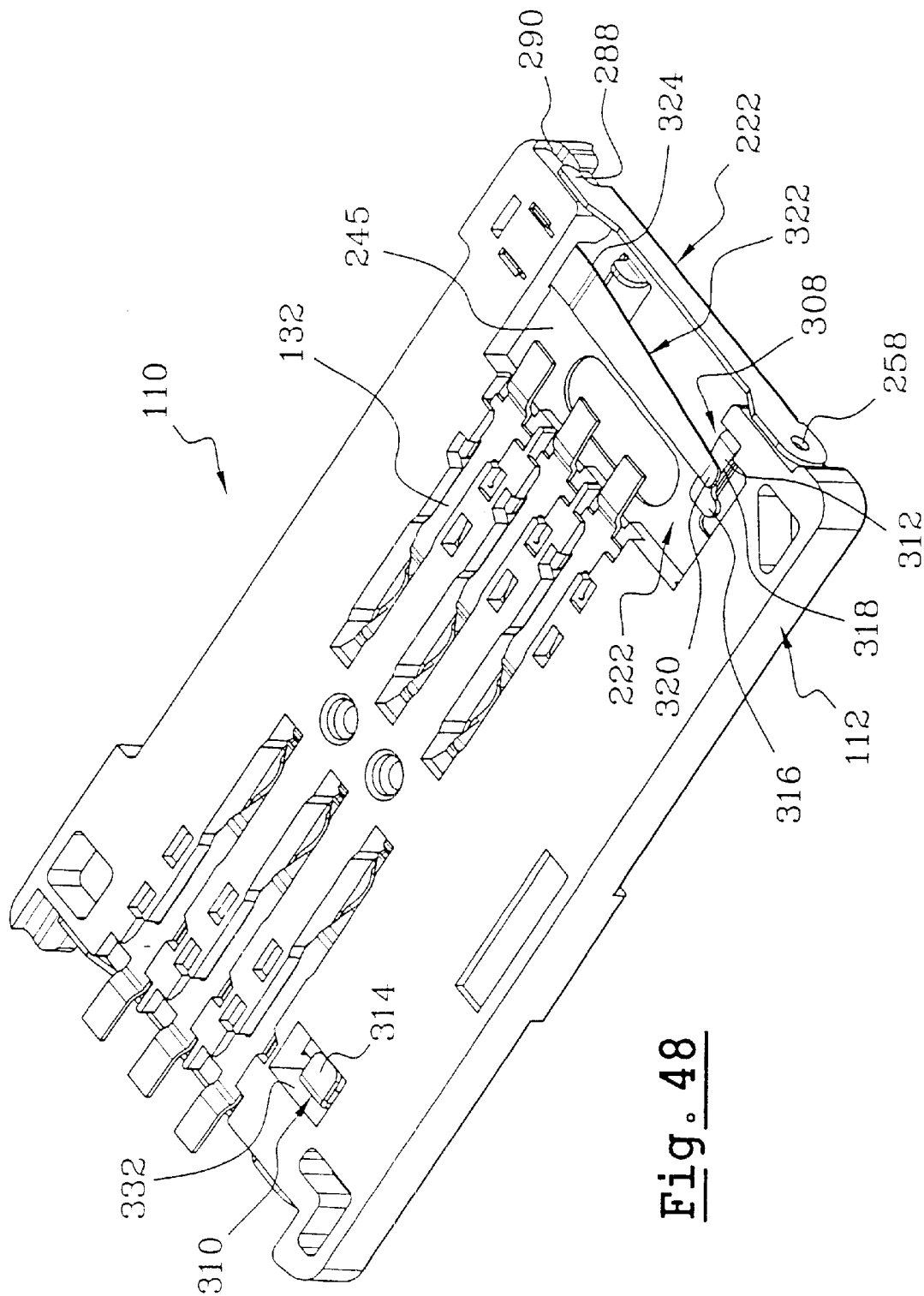
Figure 51:
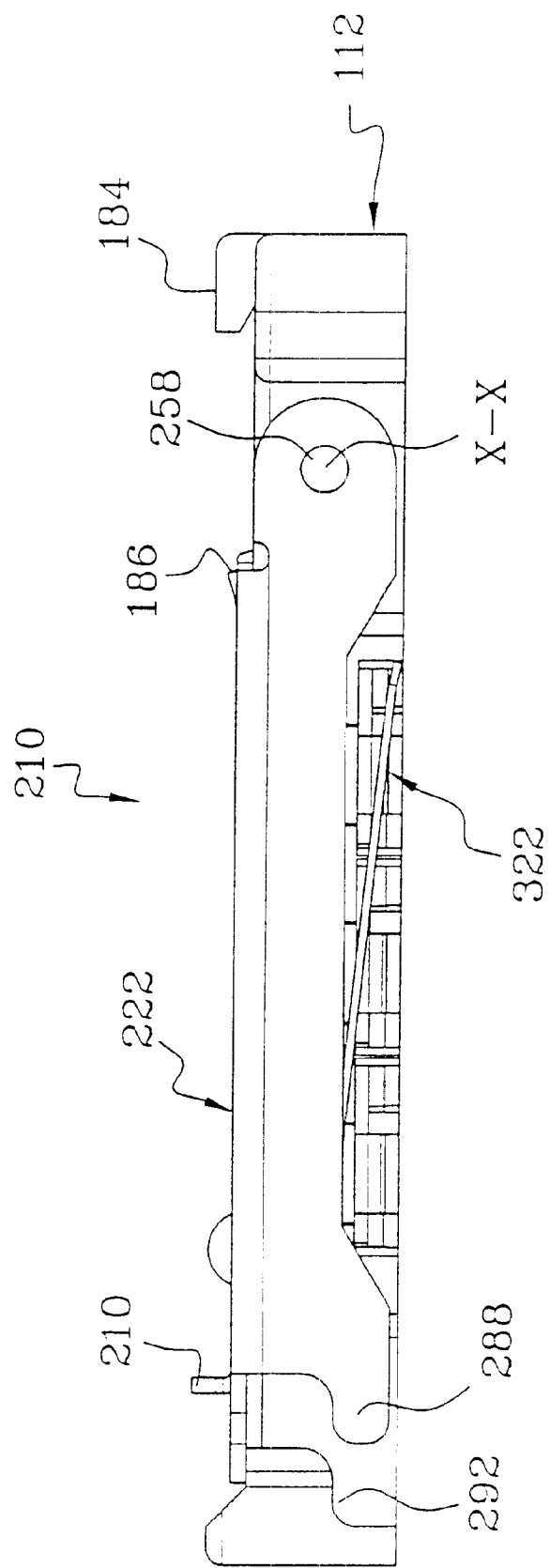

When the flap is in the closed or almost closed horizontal position, the face of the retaining tab 312 engages the spring free end 320, as shown in FIG. 48.

Figure 55:
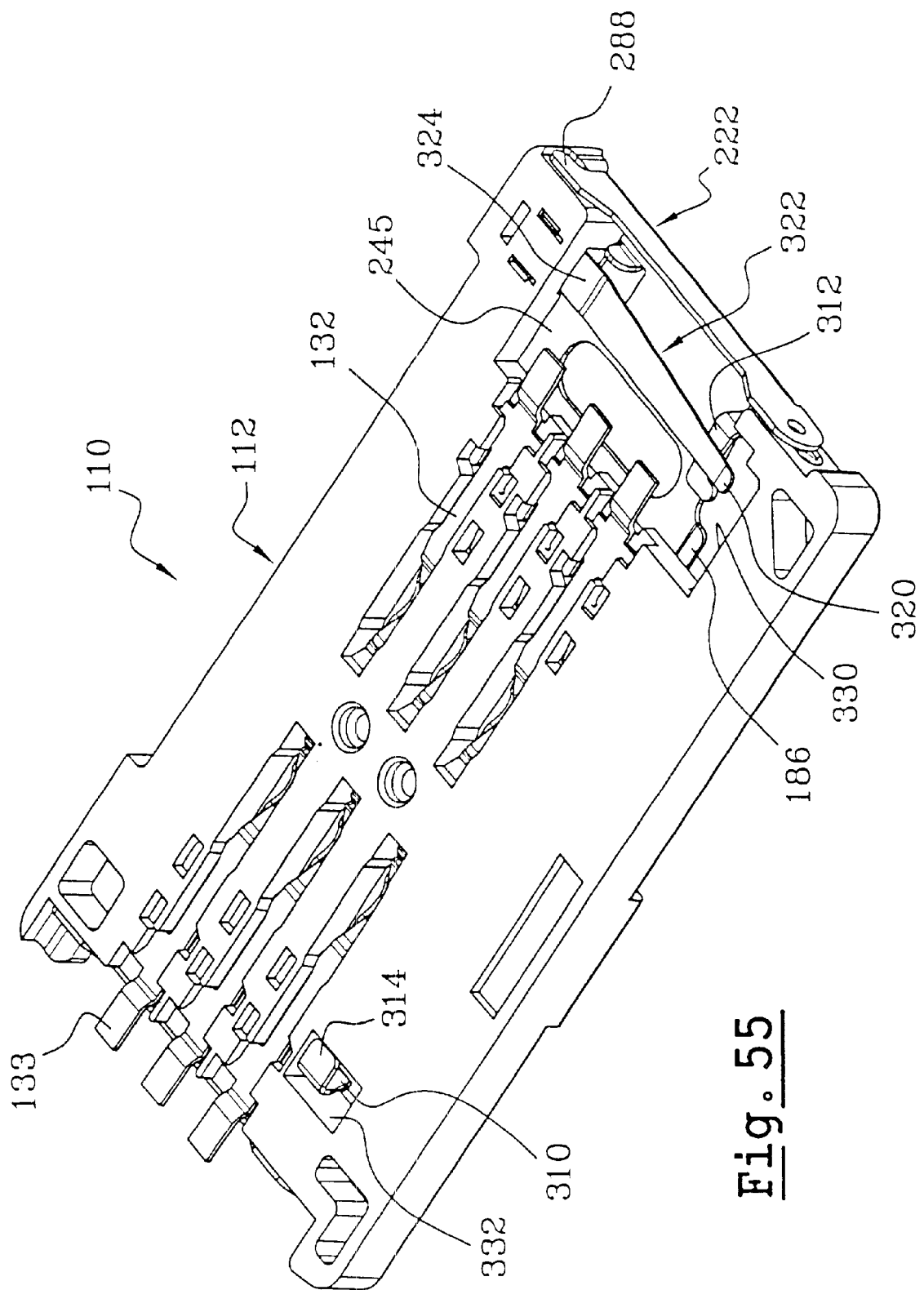

In order to allow "passage" for the lower tabs 308 and 310 when closing the flap, the support element 112 has corresponding openings or recesses 330 and 332 (FIG. 55).

FIG. 56 shows that the tabs 300, 302, 308 and 310 serve to longitudinally position the card C with respect to the closure flap 222 by engaging edges 157 and 159 of the card C.

FIG. 41 shows that the height "h" between the lower edge of the tab 314 and the bottom of the cavity is small. The height is about 0.6 mm, which is less than the thickness of the card (about 0.9 mm) so as to prevent the user from trying to insert the card without positioning it in the flap 222.

In FIG. 56, the flap 222 is held in the open position by the spring 322 and the card is in the process of being inserted vertically between the guiding tabs. The card is in an unstable position with respect to the flap 222, the card upper face 156 being in contact with the inner face 245 of the flap 222.

As shown in FIG. 59, when the card is fully inserted vertically, with the card rear bottom edge bearing against the bottom of the cavity, the two lower retaining tabs 312 and 314 each lies forward of the card. In FIG. 72, the card C is shown in the process of being inserted vertically into the closure flap 222. The rear-bottom edge 152 of the card has not yet reached the bottom 196 of the recess 194 formed in the bottom 136 of the cavity 126. Likewise, the upper forward edge 153 of the card has not yet been pressed against the face 245 of the plate 244 of the flap 222.

In FIG. 73 the card is fully inserted vertically.

FIG. 74 shows that, without moving the closure flap 222 from the vertical, the card C can be tilted away from the flap so that it occupies the position illustrated by the solid lines C1. This is an intermediate card position in which the card is retained by the tabs 312 and 314 and by the cover lower edge 186 (FIG. 75) which engage opposite faces of the card.

This tilting movement, comprising a combination of sliding and pivoting about the edge 186, may be an accidental movement of the unstable vertical card, or may result from the start of the pivoting movement of the flap 222. FIG. 75 shows the card in solid lines in the tilted position C1 and shows the card in an intermediate position in dotted lines. The tilting may also result when the user holds the apparatus in his hand in an imprecise orientation with respect to the vertical and consequently causes the card to automatically tilt when he lets go of it in the connector. In the partially inclined position, the card C no longer engages the upper guiding tabs 300 and 302, When the card is in its tilted stable position illustrated in FIG. 76 in solid lines, the flap may be pivoted down. The combination of flap and card passes through an intermediate position illustrated in FIG. 77 in which the rear part of the card upper end butts against the lower face 185 of holddown tab 184 of the insulating support element 112. The card is still retained by the edge 186 and the tabs 312, 314. The flap makes an angle of approximately 60° to the horizontal. FIG. 78 shows a later position in which the card lower face 138 has landed on the spoons of the rear row of contact blades 132 and is in stable equilibrium at an incline of about 6° to 8°. The closure of the flap may continue by continued pivoting in the anticlockwise direction in FIG. 78. During such pivoting, the lower face 245 of the plate 244 comes into contact with the upper face of the card and presses the card against the contacts until the flap pivots to the horizontal and is ready to be locked.

The flap 222 of the fifth embodiment of FIGS. 40–79 improves the ergonomics of the connector by making it easier for the user to insert the card, which is accomplished by inserting it into the flap 222. Similarly, after unlocking the flap, its design makes it easier for the card to be extracted. The user has to merely open the flap and allow it to pivot to the vertical position of FIG. 79, with the card extending about 50° to the horizontal where it is easy to grasp. All the other advantages inherent in the presence of a meta! closure flap 222 that were mentioned previously are, of course, retained.

The sixth embodiment illustrated in FIGS. 80 to 97 differs from the fourth embodiment (FIGS. 16–39) in the design of the means for hinging and locking the flap 222 with respect to the insulating support element 112. In the sixth embodiment, the bosses 258 and 260 for hinging the flap 222 are carried by rear sections of the hinge tabs 254 and 256. The hinge tabs such as 254 (FIG. 91) are in the form of arms that are elastically deformable because of the slots 340 and 342 formed for this purpose. Thus, as shown in FIGS. 94 and 95 the tabs 254 and 256 with bosses 258 and 260, may move towards the outside of the connector, that is longitudinally to the right and to the left.

Each boss is housed in a groove 280, 282 formed opposite it in a corresponding lateral face 284, 286 of the insulating support element. The shape of the support element differs from that described and illustrated previously by being combined with the hinge tabs which are elastically deformable arms.

The groove 280 will now be described in detail with reference to FIGS. 91 and 95. The groove has a flat front section 340 that lies in a vertical plane, and an inclined rear section forming a ramp 342 which is separated from the front section by a rib 344. As a result, the stable position of the bosses 258 and 260 of the flap 222 is in the front position illustrated in FIGS. 90 and 91 in which they are housed in the flat front sections 340. It may also be seen in FIGS. 80 to 83 that the rounded lower edges of the hooks 288, 290, during the final phase of closing the cap, engage with facing parts 348 and 350 forming a ramp. Each ramp such as 248 elastically deforms each hook outwards so that each then is engaged, by elastic return, in the corresponding notch 292, 294 (FIG. 82) when the flap reaches its closed horizontal position. Thus, when closing the flap, there is no translational movement of the flap with respect to the insulating support, the only relevant movement then being a pure rotational movement about the axis X—X (except for the deflecting hooks such as 288).

To unlock the flap 222, starting from the locked position of FIGS. 90 to 92. the flap 222 must be "retracted", or moved rearward. Such rearward movement elastically deflects the tabs 254 and 256 to release the hooks such as 288 and 290 (FIG. 87). The user can then open the flap slightly by means of the tongue 210 and/or due to the action of the contact blades 132, 134. With the hooks 288, 290 released, then as soon as the user stops applying force, the elastic energy stored by the tabs 254 and 256 causes the flap to return automatically to its upward position.

To prevent the flap from being locked again if the user has not used the tongue 210 forming the handle for slightly opening the flap, provision may be made (according to an alternative embodiment, not shown) for the angle through which the tongue is bent to be less than 90° so that the force component exerted on the latter in order to unlock it causes an upwardly directed vertical force applied on the flap 222.

In this sixth embodiment, it should be noted that there is no state in which the flap is completely closed, but not locked. This therefore provides additional security since there is no risk of the user using the apparatus with the card in a position in which all the contacts have not been engaged.

The seventh embodiment illustrated in FIGS. 98 to 109 is similar to the previous one, it differing therefrom only in the design of the hinge tabs of the flap which here fulfil the function of a spring for returning the flap to its stable locked position and which allow it to be unlocked by their elastic deformation.

Each boss 258, 260 is permanently housed in a complementary hole in which it can rotate, in order for the flap to be hinged about the axis X—X. but from which it can never escape. Each tab 254, 256 is designed to have the shape of an arm with an elastically deformable loop 360, 362 (FIG. 102). This allows each arm to be able to be compressed laterally to allow the flap 222 to be retracted rearwards from its locked stable position illustrated in FIGS. 98 and 99.

The alternative versions shown in FIGS. 105 to 109 illustrate various designs of a spring hinge tab 256. In particular, it may be seen that the bosses can be replaced by holes 260 which house spindle portions (not shown) forming part of the molded insulating support element 112. These figures also show various shapes of the loop 362 or its equivalent.

Among other variants of the invention (which are not shown), it is possible, to place the chamfer 130 in the left front corner of the insulating support in all the embodiments. As in the case of the first two embodiments, this arrangement is compatible with the presence, in the bottom 136 of the housing 426 of four pairs of transversely aligned contact blades. It is also possible to make the edge 166 parallel to one of the short sides 157, 159 of the card. The finger-shaped hooks 288, 290 illustrated especially in FIGS. 60 to 97, may also be replaced by halfmoon-shaped "plunges" or embossments formed in the forward extensions of the lateral hinge tabs 254 and 256. This variant is shown in FIG. 110 in which the complementary shapes and arrangements of the insulating support for engaging with the halfmoons are also shown. A corresponding rib or protuberance, providing a tactile sensation during unlocking, may also be added to the complementary parts of the insulating support.

Although terms such as "horizontal", "vertical", etc. have been used to describe the invention as it is illustrated, the connector can be used in any orientation with respect to the Earth.

Thus, the invention provides a smart card connector which is of simple and compact design, and that facilitates insertion and hold-down of a smart card. Each connector includes a support with a plastic molded support element forming a card-holding cavity with a flat upwardly-facing face and side and end walls that locate a card. A recess at the rear of the cavity can receive the rear edge of the card. The cavity is elongated in a longitudinal direction, along the long length of the card, so the distance from the open front of the connector to the recess is only about the lateral width of the card. A sheet metal cover that holds down the card, has a main plate portion and has longitudinally opposite ends that are bent 90° and form hinge tabs. The hinge tabs not only pivot on the support element, but can slide forward so hooks on the cover move under downwardly-facing shoulders at the front of the support to lock down the cover.

What is claimed is:

1. A smart card connector for receiving a smart card that has a predetermined thickness, a lateral width greater than said thickness, a longitudinal length greater than said width, and opposite faces including a lower face with contacts pads, said card having laterally opposite front and rear side edges extending along said length, wherein the connector includes a support with a molded plastic support element having rear and front laterally spaced support sides and longitudinally spaced ends, said support having walls forming a card-receiving cavity with laterally spaced front and rear cavity sides and forming a flat upwardly-facing support face, said connector including a plurality of contact blades mounted on the support element and having resilient contact ends projecting above said support face, and a card hold-down that presses down the upper face of a fully installed card, wherein the support rear side has an elongated card-edge-receiving recess that is recessed below said support face for receiving a lowermost edge of an inclined initially inserted card that is to be fully installed by pivoting the card until it is largely horizontal, and wherein said front side of said cavity is open to receive a card inserted from above said front side, wherein:

said cavity is elongated in a longitudinal direction and said card-edge-receiving recess extends along substantially the full longitudinal length of said rear side of said cavity, whereby to facilitate a user viewing the recess during initial card insertion.

2. The smart card connector described in claim 1 wherein:

said card hold-down comprises a sheet metal cover that has a rear cover side that is pivotally connected to said support at said rear side of said cavity, said cover having an opposite front cover side that is latchable to said support so said cover can press down said card against said contact ends.

3. The smart card connector described in claim 2 wherein:
said support has rear and front laterally opposite sides;
said rear cover side is laterally slideably on said support as well as being pivotable on said rear support side, and said cover has a front side with at least one latch;
said support front side has at least one latch-engaging shoulder, said latch on said cover sliding under said shoulder when said cover slides forward toward said support front side.

4. The smart card connector described in claim 2 wherein said smart card has four corner regions, with one of said corner regions having a polarizing chamfer, and said support has a corresponding polarizing chamfer to assure that the card can be inserted only in the proper orientation into said cavity, and wherein:
said sheet metal cover is bent to form a reinforcing rib that includes the outline of said support polarizing chamfer, said outline lying above said support polarizing chamfer.

5. The smart card connector described in claim 2 wherein:
said cover of sheet metal has a planar main portion lying in a first plane and has longitudinally opposite edge portions bent at right angles to said first plane, said cover being pivotal between a horizontal orientation wherein said planar main portion lies parallel to said support upper face and a largely perpendicular vertical orientation, said edge portions of said planar main portion extend toward said front side of said support when said cover lies in said vertical orientation.

6. The smart card connector described in claim 2 wherein:
said cover has a plate-shaped main portion that is pivotal between primarily vertical and horizontal positions, and said cover has a cutout forming a tab with a shoulder that faces primarily downward when the plate-shaped main portion is vertical; and including
a leaf spring that has a spring front end fixed to said support front side, and that has a spring rear end that bears upwardly against said tab shoulder to bias said cover toward the position wherein said planar main portion is vertical.

7. The smart card connector described in claim 2 wherein:
said cover has a plate-shaped main portion that is pivotal between primarily vertical and horizontal positions, said main portion has a plurality of cutouts forming at least two tabs at longitudinally opposite end portions of said plate-shaped main portion, said tabs having inner ends bent at right angles to said plate-shaped main portion to longitudinally position a card between them.

8. The smart card connector described in claim 7 wherein:
said tabs include at least two upper and two lower tabs, wherein said lower tabs have outer tab portions bent to extend toward each other, the distance between said lower tab inner ends and said outer tab portions being at least 125% of the thickness of said smart card, to allow the card to be tilted as it is inserted between said lower tabs and said plate-shaped main portion.

9. The smart card connector described in claim 1, including:
a sheet metal element which has a bottom plate that lies under said support and which has sheet metal sides that forms a front hold-down that holds a front side of a card to said support, said sheet metal element having at least one leaf spring (190, 192) at said rear side of said support for engaging a rear side of a card to bias the card toward said front side of said support and under said hold-down.

10. The smart card connector described in claim 1, including:
a sheet metal element which has a bottom plate that lies under said support and sides that extend around said support to hold said element to said support, said sheet metal element including a tab that lies above said rear side of said support and that forms a rear card hold-down;
a lock that lies at said front side of said support and that is slideable away from said rear side of said support to allow the smart card to be pushed down, and that is slideable toward said rear side of said support to lie over a front side of the card to hold it down.

11. A smart card connector for receiving a smart card that has a predetermined thickness, width and length, and opposite faces including a lower face with contacts pads, said card having opposite side edges, wherein the connector includes a support with a molded plastic support element having rear and front laterally spaced support sides and longitudinally spaced ends, said support having walls forming a card-receiving cavity with laterally spaced cavity sides and forming a flat upwardly-facing support face, said connector including a plurality of contact blades mounted on the support element and having resilient contact ends projecting above said support face, and a card hold-down that presses down the upper face of a fully installed card, wherein:
said card hold-down comprises sheet metal flap that has a rear flap side that is pivotally connected to said support at said rear side of said cavity, and that has an opposite front flap side that is latchable to said support so said plate can press down said card against said contact ends.

12. The smart card connector described in claim 11 wherein:
said flap rear side is laterally slideable as well as pivotable on said support rear side, and said flap has a front side with at least one latch;
said support front side has at least one latch-engaging shoulder, said latch on said flap sliding under said shoulder when said flap slides towards said support front side.

13. The smart card connector second in claim 12 wherein said smart card has four corner regions, with one of said corner regions having a polarizing chamfer, and said support has a corresponding polarizing chamfer to assure that the card can be inserted only in the proper orientation into cavity, and wherein:
said sheet metal flap is bent to form a reinforcing rib that includes the outline of said support polarizing chamfer, said outline lying above said support polarizing chamfer.

14. The smart card connector described in claim 12 wherein:
said sheet metal flap has a main plate portion lying in a first plane and has longitudinally opposite flap edge portions bent at right angles to said first plane, said flap edge portions being pivotally connected to said support.

15. The smart card connector described in claim 12 wherein:
said flap has a plate-shaped main portion that is pivotal between primarily vertical and horizontal orientations, and said flap has a cutout forming a tab with a shoulder that faces primarily downward when the plate-shaped main portion is vertical; and including
a leaf spring that has a spring front end fixed to said support front side, and that has a spring rear end that bears upwardly against said tab shoulder to bias said cover toward said vertical orientation.

16. The smart card connector described in claim 12 wherein:

said flap has a plate-shaped main portion that is pivotal between primarily vertical and horizontal orientations, and said flap has a plurality of cutouts forming at least two tabs at longitudinally opposite end portions of said plate-shaped main portion, said tabs having inner ends bent at right angles to said plate-shaped main portion to longitudinally position a card between them.

17. The smart card connector described in claim 16 wherein:

said tabs include upper and lower tabs at each of said end portions of said plate-shaped main portion wherein said lower tabs have outer tab portions bent to extend toward each other, the distance between said plate-shaped main portion and said outer tab portions being at least 125% of the thickness of said smart card, to thereby allow said smart card to be tilted as it is inserted between said lower tabs and said plate-shaped main portion.

18. A smart card connector, comprising:

a molded plastic support element that has rear and front laterally opposite sides and first and second longitudinally opposite ends, said support element having cavity walls forming a card-receiving cavity, said walls including an upwardly facing support face;

a plurality of contacts mounted on said support element and having contact ends lying at and extending above said support face;

a sheet metal cover that has a main plate-shaped portion, said cover being pivotally mounted on said rear side of said support element;

said cover having opposite bent ends that are each bent at right angles to said plate-shaped portion, said bent ends having mount parts that are lowermost when said plate-shaped portion extends vertically and that are pivotally connected to said support element opposite ends.

19. The smart card connector described in claim 18 wherein:

said mount ends are laterally slideable on said support element ends and said cover has at least one latch that is latchable to said support element at said front side of said support element when the cover is slid toward said front side.

20. The smart card connector described in claim 18 wherein:

said sheet metal cover has a plurality of tabs that are longitudinally spaced by about the longitudinal length of a smart card to receive a smart card between said tabs.

* * * * *